(12) United States Patent
Burkle

(10) Patent No.: US 9,803,623 B2
(45) Date of Patent: Oct. 31, 2017

(54) DIRECT WIND ENERGY GENERATION

(71) Applicant: EIP TECHNOLOGIES, INC., Yachats, OR (US)

(72) Inventor: Steve Burkle, Yachats, OR (US)

(73) Assignee: EIP TECHNOLOGIES, INC., Yachats, OR (US)

( * ) Notice: Subject to any disclaimer, the term of this patent is extended or adjusted under 35 U.S.C. 154(b) by 0 days.

(21) Appl. No.: 15/327,307

(22) PCT Filed: Jul. 20, 2015

(86) PCT No.: PCT/US2015/041204
§ 371 (c)(1),
(2) Date: Jan. 18, 2017

(87) PCT Pub. No.: WO2016/011454
PCT Pub. Date: Jan. 21, 2016

(65) Prior Publication Data
US 2017/0175711 A1 Jun. 22, 2017

Related U.S. Application Data

(60) Provisional application No. 62/026,561, filed on Jul. 18, 2014.

(51) Int. Cl.
*F03D 9/25* (2016.01)
*F03D 3/00* (2006.01)
(Continued)

(52) U.S. Cl.
CPC .............. *F03D 9/25* (2016.05); *F03D 3/005* (2013.01); *F03D 3/061* (2013.01); *F03D 13/20* (2016.05);
(Continued)

(58) Field of Classification Search
CPC ........ Y02E 10/725; Y02E 10/72; Y02E 10/74
(Continued)

(56) References Cited

U.S. PATENT DOCUMENTS 299,563 A * 6/1884 Martin ............................ 416/44
1,586,914 A * 6/1926 Palm ..................... F03D 3/0418
415/150
(Continued)

FOREIGN PATENT DOCUMENTS

WO     2014048468 A1    4/2014

OTHER PUBLICATIONS

Thomas, S., Authorized Officer, U.S. Patent and Trademark Office, International Search Report and Written Opinion, PCT/US2014/041204, Oct. 23, 2015, 9 pages.

*Primary Examiner* — Tulsidas C Patel
*Assistant Examiner* — Charles Reid, Jr.
(74) *Attorney, Agent, or Firm* — Perkins Coie LLP

(57) ABSTRACT

Methods, systems, and devices are disclosed for wind power generation. In one aspect, a wind power generator includes a support base; inductors positioned over the support base in a circular array; an annulus ring track fixed to the base support and providing a circular track around which the inductors are located; an annulus ring rotor placed on the annulus ring track and engaged to rollers in the circular track so that the annulus ring rotor can rotate relative to the an annulus ring track, in which the annulus ring rotor include separate magnets to move through the circular array of inductors to cause generation of electric currents; and a wind rotor assembly coupled to the annulus ring rotor and including wind-deflecting blades that rotate with the rotor and a hollow central interior for containing a wind vortex formed from deflecting wind by the blades to convert into the electric energy.

24 Claims, 31 Drawing Sheets

(51) Int. Cl.
*F03D 3/06* (2006.01)
*F03D 13/20* (2016.01)
*H02K 1/14* (2006.01)
*H02K 3/18* (2006.01)
*H02K 3/28* (2006.01)
*H02K 7/08* (2006.01)
*H02K 7/18* (2006.01)
*H02K 21/24* (2006.01)

(52) U.S. Cl.
CPC ............... *H02K 1/141* (2013.01); *H02K 3/18* (2013.01); *H02K 3/28* (2013.01); *H02K 7/085* (2013.01); *H02K 7/183* (2013.01); *H02K 21/24* (2013.01); *F05B 2240/211* (2013.01); *F05B 2240/301* (2013.01); *F05B 2240/50* (2013.01); *H02K 2213/06* (2013.01)

(58) Field of Classification Search
USPC ..................................................... 290/55, 44
See application file for complete search history.

(56) References Cited

U.S. PATENT DOCUMENTS

| | | | | |
|---|---|---|---|---|
| 4,520,273 A * | 5/1985 | Rowe | .................... | F03B 17/063 290/52 |
| 5,463,257 A * | 10/1995 | Yea | ....................... | F03D 3/0418 290/44 |
| 6,404,089 B1 | 6/2002 | Tomion | | |
| 6,943,461 B2 * | 9/2005 | Kaploun | ................ | H02K 7/183 290/43 |
| 7,385,302 B2 * | 6/2008 | Jonsson | ................. | F03D 3/068 290/42 |
| 7,780,411 B2 * | 8/2010 | Yan | ......................... | F03D 3/067 415/1 |
| 7,816,802 B2 * | 10/2010 | Green | ..................... | F03D 3/005 290/44 |
| 7,942,624 B1 * | 5/2011 | Erb | ......................... | F03D 3/068 415/4.2 |
| 8,829,704 B2 * | 9/2014 | Grigg | ..................... | F03D 3/002 290/44 |
| 9,115,685 B2 * | 8/2015 | Ross | ..................... | F03B 13/264 |
| 2002/0109358 A1 * | 8/2002 | Roberts | ................ | F03D 3/0409 290/54 |
| 2003/0122380 A1 * | 7/2003 | Harbison | ................. | F03D 3/02 290/55 |
| 2006/0076782 A1 * | 4/2006 | Yeh | ......................... | F03D 3/005 290/55 |
| 2006/0275105 A1 * | 12/2006 | Roberts | .................... | F03D 3/02 415/4.2 |
| 2008/0309089 A1 * | 12/2008 | Lin | ........................ | F03B 17/065 290/54 |
| 2010/0148515 A1 | 6/2010 | Geddry et al. | | |
| 2012/0119504 A1 | 5/2012 | Vigaev | | |
| 2013/0049372 A1 | 2/2013 | Lagerweij et al. | | |
| 2014/0021723 A1 * | 1/2014 | Christy | ................... | F03D 9/007 290/55 |
| 2014/0086749 A1 * | 3/2014 | Grigg | ..................... | F04D 13/028 416/98 |
| 2014/0112606 A1 | 4/2014 | Greenfield et al. | | |

\* cited by examiner

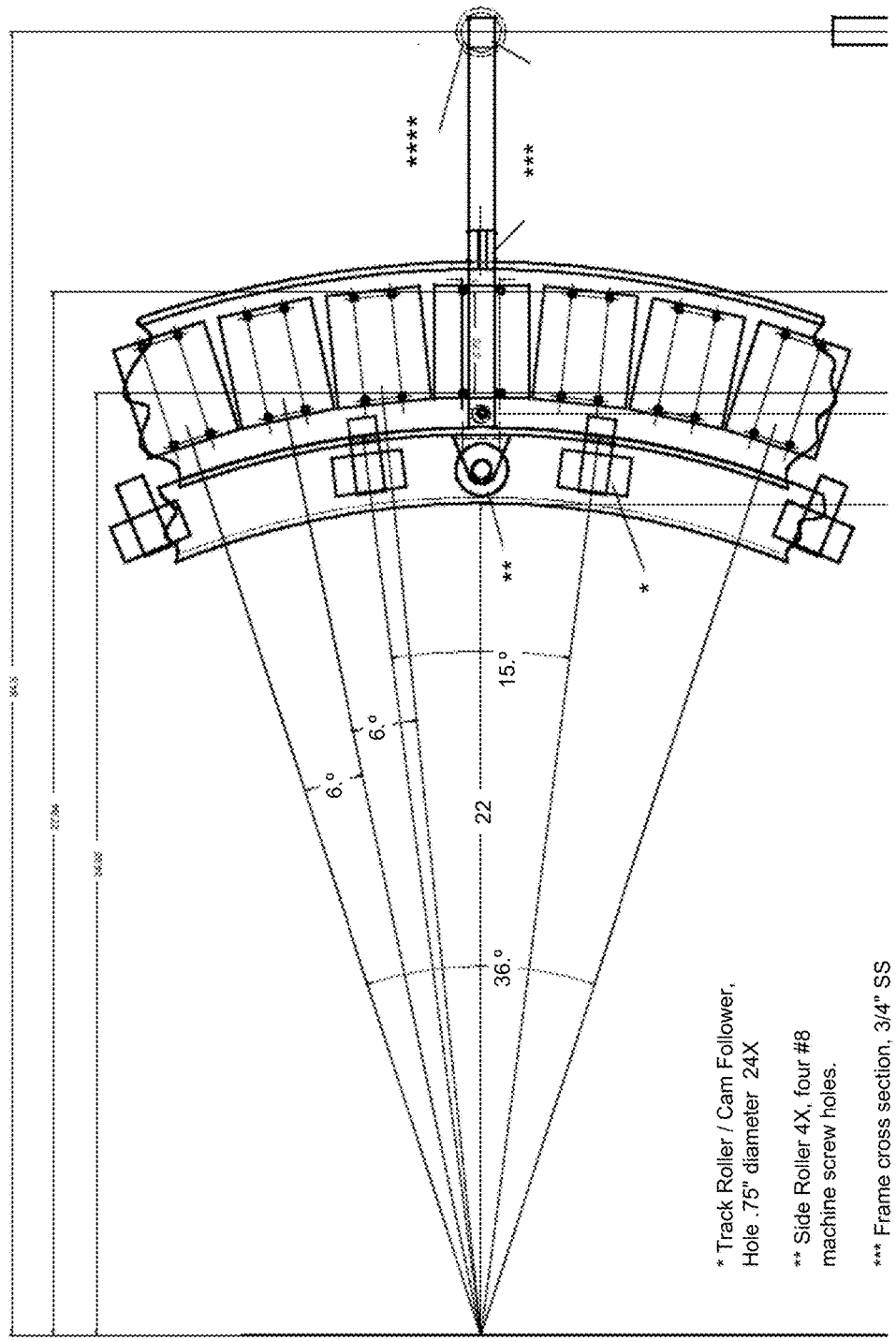
FIG. 3E-1 (upper portion of FIG. 3E)

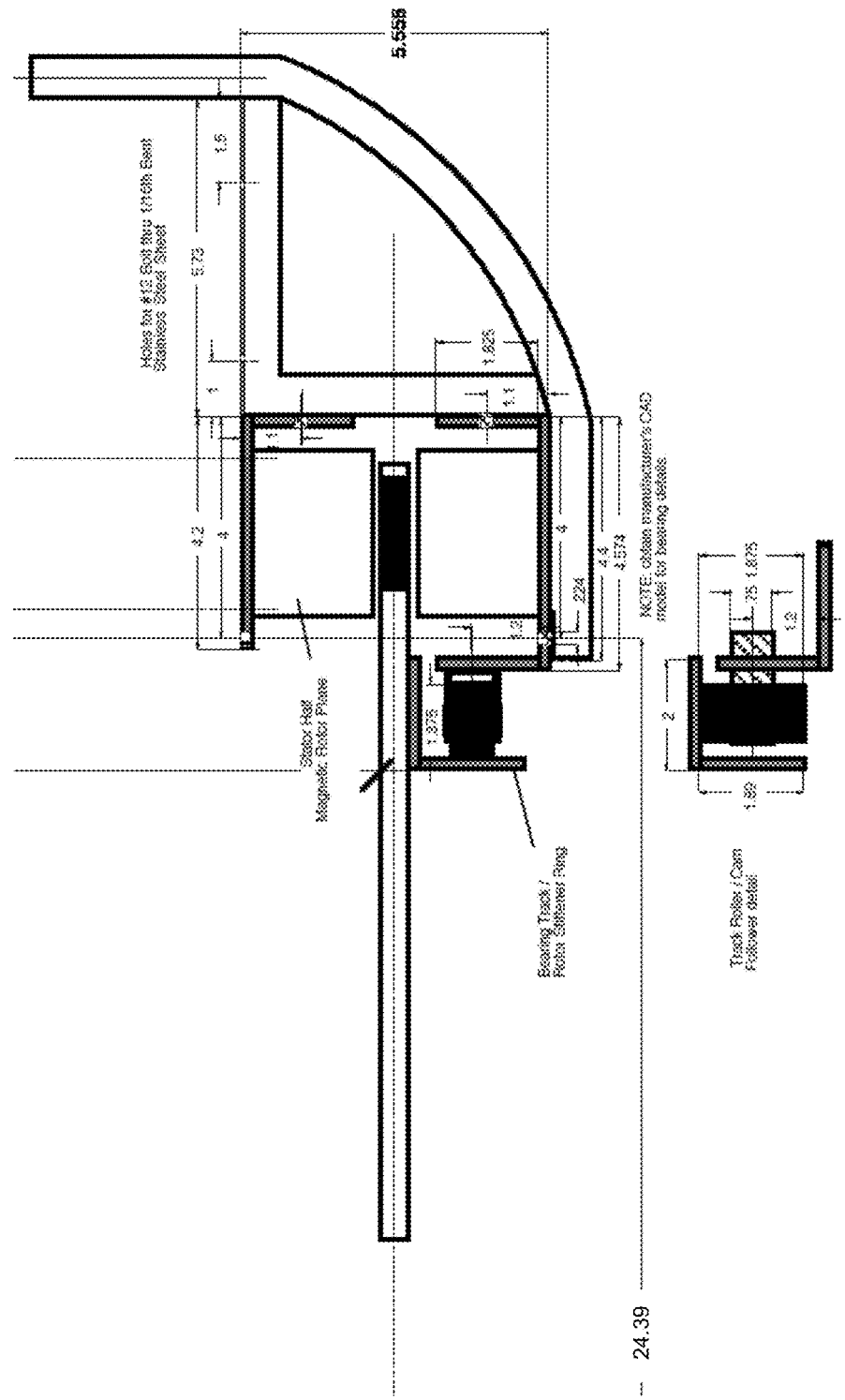
FIG. 3E-1 (lower-right portion of FIG. 3E)

DIRECT WIND ENERGY GENERATION

CROSS-REFERENCE TO RELATED APPLICATIONS

This patent document is a 35 U.S.C. §371 National Stage application of PCT Application No. PCT/US2015/041204, entitled "DIRECT WIND ENERGY GENERATION", filed on Jul. 20, 2015, which claims the benefits and priority of U.S. Provisional Patent Application No. 62/026,561, entitled "DIRECT WIND ENERGY GENERATION", filed on Jul. 18, 2014. The entire content of the aforementioned patent applications is incorporated by reference as part of the disclosure of this application.

TECHNICAL FIELD

This patent document relates to systems, devices, and processes that generate energy from wind power.

BACKGROUND

Wind power is the conversion of wind energy into a useful form of energy. Some examples of wind power conversion use wind turbines to produce electrical power, windmills for mechanical power, and windpumps for water pumping or drainage. Wind power is being employed as an alternative to fossil fuels, offering several advantages to fossil fuels including availability and renewability as an energy source, capability of being widely distributed, and lack of greenhouse gas or pollutant emissions, among others. For wind power energy solutions to be further adopted, new types of systems that can be scaled on a local level are needed.

SUMMARY

Techniques, systems, and devices are disclosed for wind power generation.

In one aspect, a wind power generator for converting wind power into electricity includes a support base; inductor coils fixed in position over the support base in a circular array; an annulus ring track fixed to the base support and configured to provide a circular track around which the circular array of inductor coils is located; rollers placed in the circular track of the annulus ring track to roll in the circular track to move around the annulus ring track; an annulus ring rotor placed on the annulus ring track and engaged to the rollers in the circular track of the annulus ring track so that the annulus ring rotor can rotate relative to the an annulus ring track by operation of rolling motion of the rollers in the circular track without having a rotary shaft in the center of the annulus ring rotor for rotating the annulus ring rotor, the annulus ring rotor structured to include separate magnets evenly spaced from one another on an outer peripheral of the annulus ring rotor to move through the circular array of inductor coils as the annulus ring rotor rotates with respect to the annulus ring track so that the relative motion between the magnets and the inductor coils causes generation of electric currents in the inductor coils; and a cylindrical wind rotor assembly located above and fixed to the annulus ring rotor to form a unified assembly to rotate with the annulus ring rotor relative to the annulus ring track, the cylindrical wind rotor assembly structured to include wind-deflecting blades that are spaced from one another and arranged in a circle around the cylindrical wind rotor assembly to form a hollow central cylindrical interior space for containing a wind vortex formed from deflecting of the received wind by the wind-deflecting blades, to convert received wind from any direction into a rotation of the unified assembly relative to the annulus ring track, thus causing conversion of the wind energy into the electric currents in the inductor coils.

In another aspect, a wind power generator for converting wind power into electricity includes a support base; an inductor stator assembly that is fixed to the support base and includes inductor coils fixed in position to form a circular array, each inductor coil including a first half inductor coil part that includes a first magnetic core and a first conductor wire coil that winds around the first magnetic core and a second half inductor coil part that includes a second magnetic core and a second conductor wire coil that winds around the second magnetic core, in which the first and second half inductor coil parts are positioned adjacent to each other to form a gap there between; an inductor rotor assembly that includes an annulus ring and separate magnets evenly spaced from one another to form a magnet ring on an outer peripheral of the annulus ring and is configured to position the magnets between the gaps of the circular array of inductor coils, the inductor rotor assembly being structured to rotate relative to the inductor stator assembly so that the relative motion between the magnets and the inductor coils causes generation of electric currents in the inductor coils; a cylindrical wind stator assembly fixed in position relative to the inductor stator assembly and including stator wind-receiving fins arranged in a circle to form a hollow cylindrical interior in which the inductor stator assembly and the inductor rotor assembly are located, the stator wind-receiving fins being structured to direct receive and direct wind from any direction into the hollow cylindrical interior at a slanted direction from a radial direction of the cylindrical wind stator assembly; and a cylindrical wind rotor assembly enclosed inside the hollow cylindrical interior of the cylindrical wind stator assembly and fixed in position to the inductor rotor assembly as a unified assembly to rotate together with the magnet ring on the annulus ring relative to the cylindrical wind stator assembly, the cylindrical wind rotor assembly structured to include wind-deflecting blades that are spaced from one another and arranged in a circle to form a hollow central cylindrical interior space for containing a wind vortex formed from deflecting of the received wind by the wind-deflecting blades, in which the stator wind-receiving fins and the wind-deflecting blades are structured to collectively and efficiently direct the received wind to cause rotation of the cylindrical wind rotor assembly for conversion of the wind energy into the electric currents in the inductor coils.

In another aspect, methods for generating electricity from wind include placing the wind power generator, such as those described above, on a roof top of a building to receive wind to cause the cylindrical wind rotor assembly to rotate so that the rotation of the cylindrical wind rotor assembly causes the inductor rotor assembly to rotate to generate electric currents in the inductor coils.

Those and other aspects, features and implementations are described in greater detail in the drawings, the detailed description, and the claims.

DETAILED DESCRIPTION

Figure 1A:
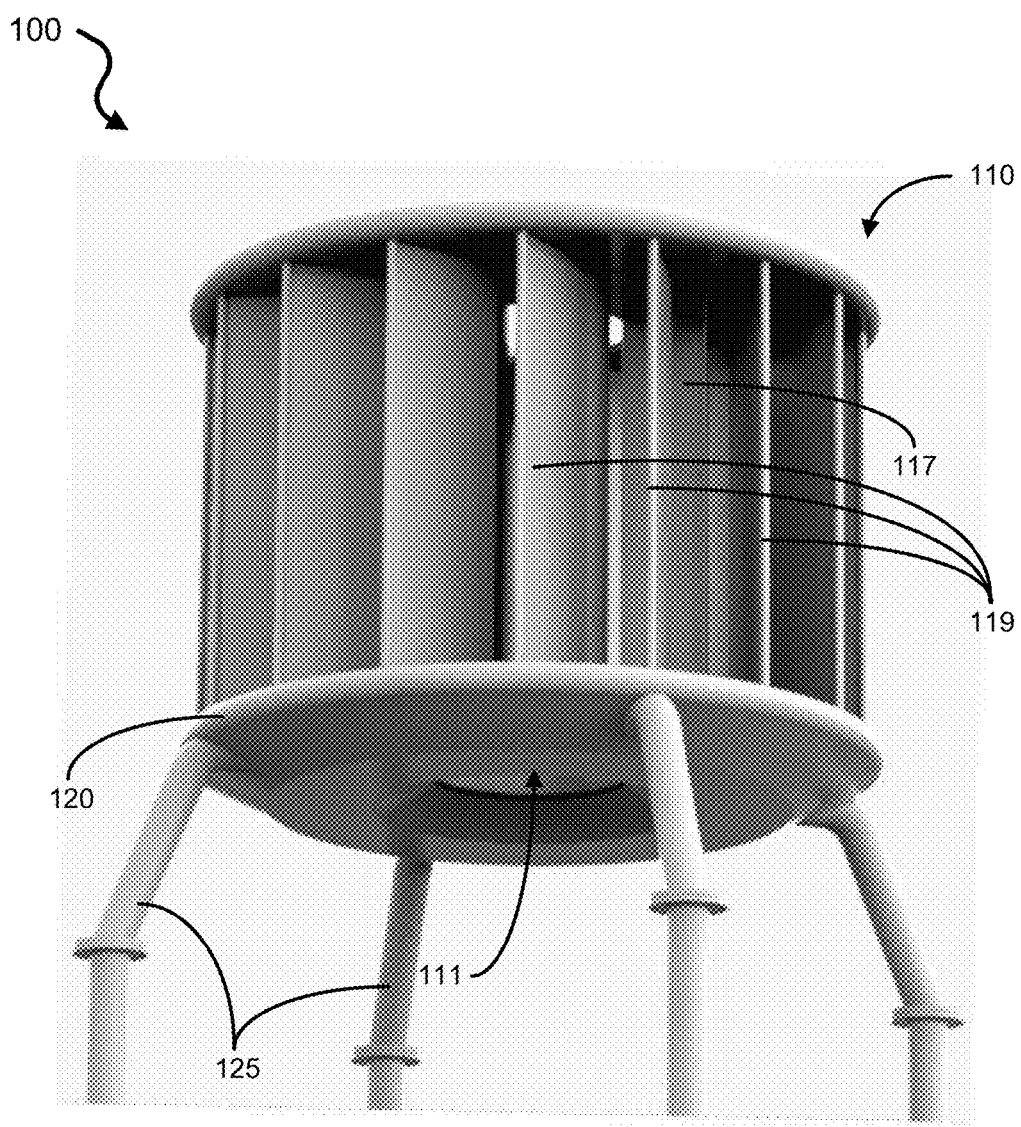
FIGS. 1A and 1B show three-dimensional schematics of an exemplary wind power generator, referred to as the electronic inertial power (EiP) wind machine.

Techniques, systems, and devices are disclosed for wind power generation.

The disclosed wind power generators are scalable on a local scale. For example, the disclosed wind power generators can be employed on an individual building such as a business or home to provide sufficient electrical power to the building.

In some implementations of the disclosed wind power generators, modularized components and mechanisms are used. For example, the modularity of exemplary wind power generators is advantageous for their deployment on the local scale, such as assembling the wind power generator on a rooftops of a building.

In one aspect, a wind power generator for converting wind power into electricity includes a support base; inductor coils fixed in position over the support base in a circular array; an annulus ring track fixed to the base support and configured to provide a circular track around which the circular array of inductor coils is located; rollers placed in the circular track of the annulus ring track to roll in the circular track to move around the annulus ring track; an annulus ring rotor placed on the annulus ring track and engaged to the rollers in the circular track of the annulus ring track so that the annulus ring rotor can rotate relative to the an annulus ring track by operation of rolling motion of the rollers in the circular track without having a rotary shaft in the center of the annulus ring rotor for rotating the annulus ring rotor, the annulus ring rotor structured to include separate magnets evenly spaced from one another on an outer peripheral of the annulus ring rotor to move through the circular array of inductor coils as the annulus ring rotor rotates with respect to the annulus ring track so that the relative motion between the magnets and the inductor coils causes generation of electric currents in the inductor coils; and a cylindrical wind rotor assembly located above and fixed to the annulus ring rotor to form a unified assembly to rotate with the annulus ring rotor relative to the annulus ring track, the cylindrical wind rotor assembly structured to include wind-deflecting blades that are spaced from one another and arranged in a circle around the cylindrical wind rotor assembly to form a hollow central cylindrical interior space for containing a wind vortex formed from deflecting of the received wind by the wind-deflecting blades, to convert received wind from any direction into a rotation of the unified assembly relative to the annulus ring track, thus causing conversion of the wind energy into the electric currents in the inductor coils.

In another aspect, a wind power generator for converting wind power into electricity includes a support base; an inductor stator assembly that is fixed to the support base and includes inductor coils fixed in position to form a circular array, each inductor coil including a first half inductor coil part that includes a first magnetic core and a first conductor wire coil that winds around the first magnetic core and a second half inductor coil part that includes a second magnetic core and a second conductor wire coil that winds around the second magnetic core, in which the first and second half inductor coil parts are positioned adjacent to each other to form a gap there between; an inductor rotor assembly that includes an annulus ring and separate magnets evenly spaced from one another to form a magnet ring on an outer peripheral of the annulus ring and is configured to position the magnets between the gaps of the circular array of inductor coils, the inductor rotor assembly being structured to rotate relative to the inductor stator assembly so that the relative motion between the magnets and the inductor coils causes generation of electric currents in the inductor coils; a cylindrical wind stator assembly fixed in position relative to the inductor stator assembly and including stator wind-receiving fins arranged in a circle to form a hollow cylindrical interior in which the inductor stator assembly and the inductor rotor assembly are located, the stator wind-receiving fins being structured to direct receive and direct wind from any direction into the hollow cylindrical interior at a slanted direction from a radial direction of the cylindrical wind stator assembly; and a cylindrical wind rotor assembly enclosed inside the hollow cylindrical interior of the cylindrical wind stator assembly and fixed in position to the inductor rotor assembly as a unified assembly to rotate together with the magnet ring on the annulus ring relative to the cylindrical wind stator assembly, the cylindrical wind rotor assembly structured to include wind-deflecting blades that are spaced from one another and arranged in a circle to form a hollow central cylindrical interior space for containing a wind vortex formed from deflecting of the received wind by the wind-deflecting blades, in which the stator wind-receiving fins and the wind-deflecting blades are structured to collectively and efficiently direct the received wind to cause rotation of the cylindrical wind rotor assembly for conversion of the wind energy into the electric currents in the inductor coils.

In another aspect, methods for generating electricity from wind include placing the wind power generator, such as those described above, on a roof top of a building to receive wind to cause the cylindrical wind rotor assembly to rotate so that the rotation of the cylindrical wind rotor assembly causes the inductor rotor assembly to rotate to generate electrical energy (e.g., electric currents) in the inductor coils. In some implementations, the method can further include supplying the generated electrical energy to a power system of the building, or the power grid. The method can further include storing the generated electrical energy in an energy storage unit electrically coupled to the wind power generator.

These aspects and other features are described in further detail below, and in the drawings and the claims.

Implementations of the wind power generator as described in the Claims section of this patent document can optionally include the following exemplary features.

For example, the underside of the bottom annulus of the wind receiving fin assembly can be the support base for two stainless steel rings: (i) the upper ring, which bolts directly to the underside, contains the first half of inductor array; and (ii) the lower ring contains the second half of the inductor array and sites for bearings, which attaches to solid stainless steel frame struts inserted into every other fin pipe around the circumference and bolted to the underside. The frame struts and inductor rings and bearings maintain the gap between inductor faces under strong magnetic forces from the rotor.

Also, for example, for the annulus ring rotor, the rotor base can be an annulus made of aluminum (or any non-magnetic alloy) of magnet thickness. On the underside a stainless steel ring (the bearing "track") is attached that provides a horizontal and vertical surface for bearings, e.g., one surface for bearings supporting the weight of the rotor, and the other controlling side to side movement. The track ring also acts as a stiffener for the magnetic rotor annulus to prevent warping of the aluminum under strong magnetic attraction to inductors and heavy wind gusts on the windblades to maintain an equal gap between magnets and inductors above and below. The cylindrical wind blade assembly attaches to the topside of the annulus. When fully assembled, the outer periphery of the rotor annulus passes between the upper and lower inductor arrays while the wind blades spin freely.

Also, for example, with regards to the bearings, the fault tolerant bearing architecture can include various types, e.g., one for supporting the rotor weight and magnetic gaps, the other for controlling side to side movement. Both types can be "poly roller" bearings with a maintenance-free core and poly wheel. Instead of one central bearing on a shaft, for example, there are redundant bearings provided near the rotor periphery. To function in a minimal way, for example, there can be at least one support bearing for every one eighth of circumference. Double this amount is the nominal number. For absolute fault tolerance three times is recommended, as an example. A minimum of four side to side bearings are required, one for each axis. Twice that number is the nominal and fault tolerant quantity, since they bear no weight, as another example. Bearings can fail without disruption to power production, and replaced during a convenient service interval.

Also, for example, with regards to the vortex, the central vortex can be a wake vortex, which solves a major efficiency problem with VAWTs, e.g., operating in their own wake vortex, providing a way for expended wind energy to exit the turbine from the center above and below and carried away in the wind flow, enhancing rotor motion.

Also, for example, speed and vibration in high winds is self-regulating, e.g., requiring no pitch or yaw controls, or shutdown, simply a rotor that spins no faster when wind drag opposing motion equals wind power behind the blades, maintaining balance instantly in response to strong wind gusts. Rotor height and diameter determine the stall speed, selected to suit wind conditions at the installed location.

Also for example, with regards to the pipe or rod of each stator wind-receiving fin (e.g., having a curved outer edge as an interface of the wind power generator with the received wind), the pipe is an important design element. For example, every other pipe around the circumference has the end of a frame strut inserted into it, which lends strength to the wind receiving fin assembly under strong gust forces. The other pipes are available for attachment to rooftop mounting structures and electrical conduit for lighting and instrumentation (e.g., wireless network antenna or pitot tube for wind speed measurement).

Also for example, with regards to the metal or metallic alloy, generally, aluminum is utilized for the wind assemblies and magnetic rotor but the entire machine is made from non-magnetic metals, except for the C cores. For example, stainless steel is utilized for inductor and bearing ring support, where high strength is required. A mil-spec version could be made entirely of titanium, for example.

Also, for example, with regards to the radial dimension, the generator can be configured such that the radius of the hollow center is one third of the outer fin annulus, the wind rotor assembly is two thirds, in which these exemplary proportions apply to all sizes of machine.

Also for example, with regards to the outer diameter, the generator can be configured to be a taller machine than windblade length. For example, the exemplary design naturally supports machines that are wider than taller, which can tolerate extreme wind conditions better. Expanding the rotor radius provides and exponential increase in wind swept area (a cylinder), while blade length provides a linear increase, for example.

Also, for example, with regards to the wind deflecting blades, the generator can be configured such that there is an "even" number of wind deflecting stationary blades greater than the "odd" number of wind receiving rotor blades. The even/odd relationship between fins and rotor blades allows rotor motion to start in the least amount of wind.

Also for example, with regards to the respective currents, these can be synchronous currents. Synchronous generation means that current flow exactly tracks magnetic flux transitions, producing a sinusoidal voltage that increases with frequency. Steel inductor cores concentrate flux from rotor magnetic fields, focused in the axial direction by the placement and polarity of magnets passing between. An elemental synchronous design is one of the ways to ensure maximum electrical conversion efficiency.

Also for example, with regards to the inductor coils in the connection to form a 3-phase inductor module, such connection of how the coils connect can be a Wye connection. For example, a Wye connection means that one end of each inductor is attached in common, while the other ends attach to 3-phase U, V, and W terminals. The 3-phase can also be wired in "delta" where each end of the inductors connects in a triangular way with U, V, and W on the corners.

Also for example, with regards to the DC output voltage, this can include a DC output voltage equal to peak AC voltage. For example, a maximum electrical conversion efficiency can include a 3-phase modularity. For example, a single phase rectifiers may produce a DC voltage that is half the peak AC voltage.

Also for example, with regards to the mode-switching circuit, this can include a voltage sourced converter (VSC). For example, adding a high speed switching transistor, like an insulated gate bipolar transistor (IGBT) in parallel with each of the six diodes in the linear rectifier creates a controlled 3-phase rectifier. The rapid switching of transistor gates in certain patterns in the VSC supports "four-quadrant" operations. For example, in a graph of motor torque vs. speed in both forward and reverse directions, above the speed axis to the right of the torque axis is quadrant I, below the right speed axis is quadrant II, left of the torque axis and below the speed axis is quadrant III, and the upper left is quadrant IV. Motor operating modes are summarized below for each quadrant:

Quadrant I: Leading power factor inverter for forward motoring.

Quadrant II: Lagging power factor inverter for forward braking.

Quadrant III: Leading power factor rectifier for reverse motoring.

Quadrant IV: Lagging power factor rectifier for reverse braking.

In this application, for example, since the wind rotor always moves in the forward direction, only quadrants I and III may be used for regulating rotor speed and DC output voltage, with QI operations accelerating the rotor while reducing DC output voltage, and QIII operations slowing the rotor while raising the DC voltage. These work in conjunction with random and uncontrollable external forces on the rotor: wind and electrical loading. Wind accelerates the rotor while raising the DC voltage, and loading decelerates the rotor while lowering DC voltage. An exemplary design element for maximum electrical conversion efficiency can include the placement of motoring thrust force at the edge of the rotor, where torque is amplified by the rotor radius. This can allow for smaller inductors and magnets to produce much greater torque than a rotary equivalent during motoring operations, and greater power output while generating.

Also, for example, with regards to the sensing circuit, a synchronous 3-phase magnetics design allows the VSC to directly sense rotor speed on the DC output, e.g., because it generates clean sine wave AC into which harmonics created by high-speed transistor switching are superimposed without interference from rotor harmonics. Post 3-phase rectifier DC content contains steady ripple currents based on fundamental AC output and transistor harmonics which are analyzed by digital signal processing to provide direct control of motoring torque and speed without external sensors that can fail (another fault-tolerant feature).

Also, for example, with regards to the opposite magnetic orientations, each magnet can be polarized on the narrow dimension so that axial flux is maximized when placed in opposite orientations in the rotor.

Also, for example, in the exemplary wind energy generators, electrical components are located where airflow is greatest, and the wind is blowing faster when power is greatest. So, the modular architecture allows the hottest parts (e.g., inductors and semiconductors) to be placed directly on the metallic annulus base of the wind stator assembly, which acts as a large heatsink. This allows much more power from multiple smaller cores and embedded electronics than a monolithic generator and controller.

0. Outline of the Patent Document

The disclosed wind power generators are also referred in this patent document to as the electronic inertial power (EiP) wind machine. The EiP wind machine includes a direct drive vertical axis wind turbine for electrical generation from wind. The EiP wind machine provides a platform for direct generation, storage, and stabilization of electric power from a single moving mass. The EiP wind machine is ideally suited for wind conditions on the urban rooftop, including turbulence.

The disclosure of this patent document is organized with the following top-level headings:

Section 1: Introduction. This section includes a general overview of the EiP wind machine and exemplary applications.

Section 2: Operation Principles. This section includes a description of how the disclosed technology works, and presents mathematical models for various aspects of operation.

Section 3: Mechanical and Aerodynamic Specification. This section includes a description of exemplary embodiments of the EiP wind machine physical form and function.

Section 4: Exemplary Electronics Hardware Specification. This section includes a description of exemplary embodiments of the EiP electronic architecture.

Section 5: System Architecture. This section includes a description of exemplary system integration and networking concepts.

Section 6: Exemplary Programming Specification. This section includes a description of an exemplary EiP wind machine software interface.

1. Introduction

Disclosed are electronic inertial power generation devices, systems, and methods that produce electrical energy from environmental sources such as wind, waves, and other 'clean' or 'green' energy sources. Various embodiments and implementations of the disclosed electronic inertial power generation technology (or EiP technology) are described, particularly wind power generators that are scalable on a local scale, e.g., referred to as the EiP wind machine. The EiP wind machine includes a direct drive vertical axis wind turbine with an impulse rotor. The rotor is surrounded by stationary vertical fins, in a sturdy structure that concentrates wind from all directions toward vertical rotor blades. The EiP wind machine is able to convert wind to electrical energy from a rooftop with no tower, handling a wide range of wind conditions without mechanical adjustment. EiP technology adapts direct electrical generation to the impulse rotor, so power can be extracted from sudden changes in wind speed (gusts) in random directions (turbulence), as well as steady winds.

Conventional impulse turbines deliver high working torque, but have proven to be poor electrical generators. Since the rotor naturally moves no faster than wind speed, a mechanical gearbox is required to spin a generator fast enough to convert rotor torque to electromagnetic torque; tens of rotations must be converted to thousands. This amplifies magnetic drag from the generator, hindering rotor movement. Mechanical transmissions in all wind machines are the most common point of catastrophic failure in exposure to the elements, requiring continuous maintenance.

Alternatively, vertical axis wind turbines that directly drive a permanent magnet generator at rotor speed follow a "single mass" model that is simple and reliable. However, for enough electromagnetic torque the generator must have many magnetic poles, along with corresponding amounts of steel core and copper windings. The generator radius must be large enough to accommodate all the poles, so shearing forces on the central shaft limit instantaneous electromagnetic torque. Also, distributed copper windings around the armature pick up stray magnetic fields that cause electrical inefficiency and noise.

Generally, all direct drive wind generators must compromise power output for less than optimal electromagnetic torque. As size and power increase, the generator fails to keep up with wind rotor torque resulting in less efficiency. Since wind is an overabundant and free resource, the simplicity of direct generation from a single mass is preferred. However, power productivity over the generator lifetime is low.

The EiP wind machine offers the solution for direct power generation from a slow and heavy vertical rotor. This new type of electrical machine is presented here, with a modular structure that is adaptable and scalable to a larger rotor and greater power. The EiP wind machine represents a quantum leap forward in power production directly from the wind, converting a wide variety of wind conditions to stable and useful power.

The EiP wind machine is ultra-reliable and fault-tolerant by design. By decentralizing or eliminating all of the parts that cause the most downtime, the EiP wind machine produces more power over its operating life than any other design. Through a modular architecture, component failures cause only reduced power output while the machine keeps running Failed components can be quickly replaced during scheduled service intervals, reducing total downtime.

1.1 EiP Wind Machine Overview

The EiP wind machine is an energy conversion device, which efficiently transforms mechanical torque with high inertia to electromagnetic torque, producing useful power in a fraction of rotation. The EiP wind machine includes a permanent magnet generator with many poles and core windings. EiP technology supports a generator radius greater than the wind rotor radius, where generator magnetics populate the circumference. With no central shaft and main bearing, unlimited electromagnetic torque response is possible. The EiP wind machine includes a unique vertical axis wind turbine design of the disclosed EiP technology that efficiently transforms mechanical torque with high inertia to electromagnetic torque, and produces electrical energy from wind passing into the EiP wind machine.

Figure 1B:
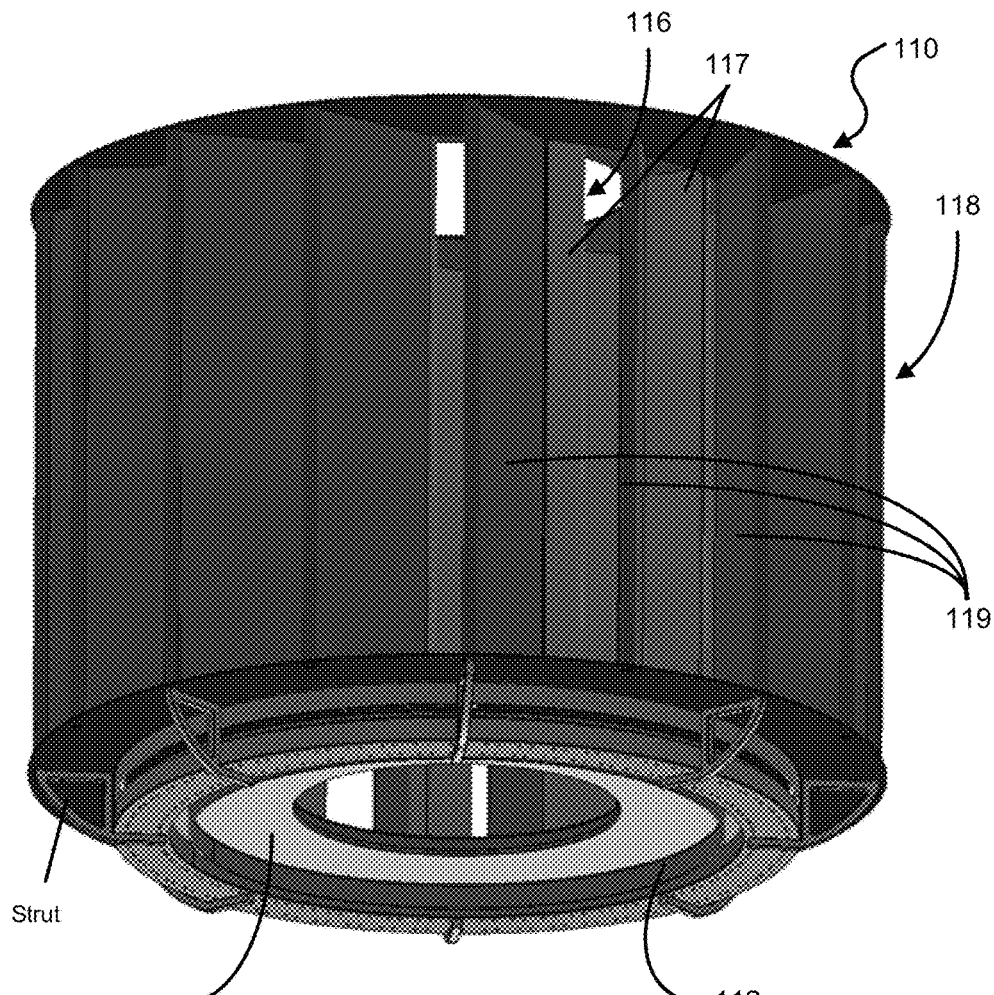
Figure 1C:
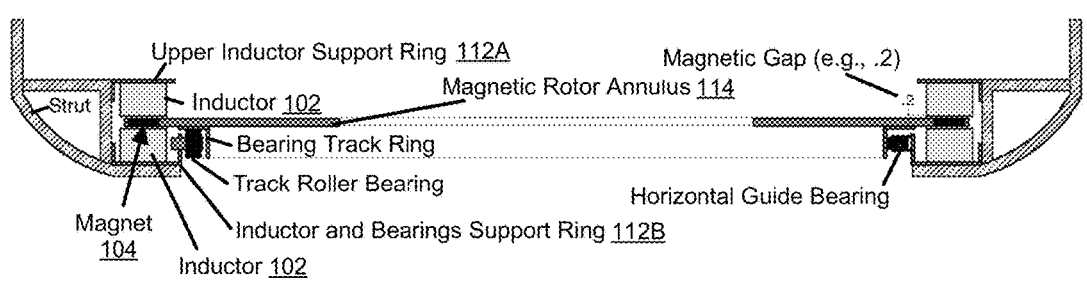
FIG. 1C shows a cross sectional diagram depicting the lower portion of an exemplary EiP wind machine.

FIGS. 1A and 1B show three-dimensional views of an exemplary EiP wind machine 100. FIG. 1C shows a cross-sectional diagram of the lower portion of the EiP wind machine 100. The EiP wind machine 100 includes a support base 120 to support an electronic inertial power generation unit 110 of the disclosed technology. The support base 120 can include a plurality of struts positioned along the outside region of a base frame, which supports the electronic inertial power generation unit 110. In some implementations, for example, the support base 120 can include a plurality of legs 125 to raise the support base 120, and thereby the EiP wind machine 100, to a desired height. The electronic inertial power generation unit 110 includes an annulus ring track 112 able to attach to the base support 120 and structured to provide a circular track around which a circular array of inductors 102 (e.g., inductor coils) is located. For example, the inductors 102 of the array are fixed in position in the annulus ring track 112 over the support base 120 in a circular array. The electronic inertial power generation unit 110 includes rollers (e.g., track roller bearings) placed in the circular track of the annulus ring track 112 to roll in the circular track to move around the annulus ring track 112. In some embodiments, for example, the annulus ring track 112 includes an upper inductor support ring 112A that contains the upper half of the inductor array, and the annulus ring track 112 includes a lower inductor and bearings support ring 112B, which contains the lower half of the inductor array. In some implementations, for example, the struts of the support base 120 are attached to the upper and lower support rings 112A and 112B to provide a gap (e.g., a fraction of an inch (e.g., ⅛ in) to a half of an inch, such as 0.2 in.) for a magnetic rotor annulus to rotate between the upper and lower inductors contained in the upper and lower support rings 112A and 112B.

The electronic inertial power generation unit 110 includes an annulus ring rotor 114 placed on the annulus ring track 112 and engaged to the rollers along the circular track of the annulus ring track 112. For example, in some implementations as shown in FIG. 1C, the annulus ring rotor 114 is configured between the upper support ring 112A and the lower support ring 112B of the annulus ring track 112, in which the lower support ring 112B includes the rollers (e.g., track roller bearings) that support a bearing track ring of the annulus ring rotor 114. For example, the bearing track ring can be structured to have two faces perpendicular to one another, such that one face is engaged with the rollers (e.g., track roller bearings) of the annuls ring track 112, and the other perpendicular face extends downward from the annulus ring rotor 114's lower surface. For example, the annulus ring track 112 can include horizontal rollers (e.g., horizontal guide bearings) that engage the perpendicular portion of the bearing track ring (e.g., roll about the perpendicular track of the bearing track ring) to guide the rotation of the annulus ring rotor 114 to maintain its position in the x-y plane as it rotates with respect to the inductor arrays of the annulus ring track 112. The annulus ring rotor 114 can rotate relative to the an annulus ring track 112, e.g., by operation of rolling motion of the rollers in the circular track, without having a rotary shaft in the center of the annulus ring rotor for rotating the annulus ring rotor 114. The annulus ring rotor 114 is structured to include separate magnets 104 evenly spaced from one another on the annulus ring rotor 114 (e.g., on an outer peripheral of the annulus ring rotor 114) to move through the circular array of inductor coils (e.g., between the upper and lower inductor arrays) as the annulus ring rotor 114 rotates over the annulus ring track 112, e.g., so that the relative motion between the magnets and the inductor coils causes generation of electric currents in the inductor coils.

The electronic inertial power generation unit 110 includes a cylindrical wind rotor assembly 116 located above and coupled to the annulus ring rotor 114, e.g., which forms a unified assembly, to rotate with the annulus ring rotor 114 relative to the annulus ring track 112. The wind rotor assembly 116 is structured to include a plurality of wind rotor blades 117 (e.g., wind-deflecting blades) that are spaced from one another and arranged in a circle around the wind rotor assembly 116 to form a hollow central cylindrical interior space for containing a wind vortex formed from deflecting of the received wind by the wind-deflecting blades 117. The wind rotor assembly 116 is operable to convert received wind, e.g., received from any direction, into a rotation of the unified assembly relative to the annulus ring track 112, thus causing conversion of the wind energy into the electric currents in the inductor coils, and thereby producing electrical energy. For example, in some implementations of the wind rotor blades 117, the wind-deflecting blade can have a structure including a curved blade portion to deflect the received wind into a wind vortex inside a hollow central region of the cylindrical wind rotor assembly. For example, the curved blade portion in each wind-deflecting blade can have a geometry of a portion of a cylinder. For example, the curved blade portion in each wind-deflecting blade can include a geometry of one third of a cylinder.

As shown in the diagrams of FIGS. 1A and 1B, the electronic inertial power generation unit 110 can include a cylindrical wind stator assembly 118 that is configured in a fixed position relative to the support base 120 and the annulus ring track 112. The wind stator assembly 118 includes stator wind-receiving fins 119, e.g., arranged in a circle that is outside of and encloses the cylindrical wind rotor assembly 116. The stator wind-receiving fins 119 are structured to direct received wind from any direction inwards and towards the wind-deflecting blades 117 of the cylindrical wind rotor assembly 116. The stator wind-receiving fins 119 and the wind-deflecting blades 117 are structured to collectively and efficiently convert the received wind into a rotation of the cylindrical wind rotor assembly. In some embodiments of the wind stator assembly 118, for example, the stator wind-receiving fin 119 include a pipe or rod having a curved outer edge as a first interface of the wind power generator with the received wind. For example, the stator wind-receiving fin can include a fin portion that is slanted in orientation with respect to a radial direction of the cylindrical wind stator assembly and is configured to receive and direct wind into the wind-deflecting blades of the cylindrical wind rotor assembly. For example, the fin portion can be configured to be slanted in orientation with respect to a radial direction of the cylindrical wind stator assembly at 45 degrees.

For example, the stator wind-receiving fins 119 can include a fin portion formed of a metal or metallic alloy, e.g., such as an aluminum fin portion. In some embodiments, for example, the stator wind-receiving fins 119 and the wind-deflecting blades 117 are configured so that a radial dimension of the cylindrical wind stator assembly 118, a radial dimension of the cylindrical wind rotor assembly 116, and a radius of the hollow central cylindrical interior space 111 in the center of the cylindrical wind rotor assembly 116 are substantially the same. For example, the cylindrical wind stator assembly 118 can be configured to have an outer diameter greater than a length of the cylindrical wind stator assembly along a cylindrical axis of the cylindrical wind stator assembly. In some embodiments, for example, the number of the stator wind-receiving fins 119 of the cylindrical wind stator assembly 118 can be configured to be greater than a number of the wind-deflecting blades 117 of the cylindrical wind rotor assembly 116. In some embodiments, for example, each wind-deflecting blade 117 includes a curved blade portion, and the stator wind-receiving fins 119 are slanted in orientation with respect to respective radial directions of the cylindrical wind stator assembly 118 to direct received wind towards a concave side of the curved blade portion of each wind-deflecting blade 117.

Referring to FIG. 1C, for example, the electronic inertial power generation unit 110 can be structured such that the inductor coils in the circular array of inductor coils are configured into independent inductor modules that operate independently from one module to another, in which example, each inductor module can include (1) three adjacent inductor coils that are connected to one another to form a 3-phase inductor module to so that the phases of the three adjacent inductor coils are separated by one third of a cycle to collectively produce an AC output current from three currents respectively generated by the three adjacent inductor coils, and (2) a rectifier circuit coupled to receive the AC output current and to produce a DC output voltage. For example, the rectifier circuit of an inductor module can include a three-phase diode bridge rectifier circuit formed of six diodes.

In some implementations, for example, the electronic inertial power generation unit 110 can be structured such that the inductor coils in the circular array of inductor coils are configured as independent inductor modules that operate independently from one module to another, in which each inductor module includes (1) three adjacent inductor coils that are connected to one another to form a 3-phase inductor module to so that the phases of the three adjacent inductor coils are separated by one third of a cycle to collectively produce an AC output current from three currents respectively generated by the three adjacent inductor coils, and (2) a rectifier circuit coupled to receive the AC output current and to produce a DC output voltage; and in which the inductor modules are configured as independent inductor module groups where each inductor module group includes 3 or more inductor modules, the inductor modules within each inductor module group are coupled to produce an inductor module group output, and different inductor module groups are separated and operate independently from one to another.

For example, each inductor module group can include a mode-switching circuit in a selected inductor module in the inductor module group and coupled to a rectifier circuit of the selected inductor module to inactivate the rectifier circuit to allow the selected inductor module to operate in an AC mode for producing an AC output or to activate the rectifier circuit to allow the select inductor module to operate in an DC mode for producing an DC output, and a control circuit coupled to the mode-switching circuit to control the operation the mode-switching circuit in switching the selected inductor module between the AC mode and the DC mode. For example, each inductor module group can include a sensing circuit coupled in the selected inductor module in the inductor module group that senses a rotation condition of the cylindrical wind rotor assembly based on timing and magnitudes of currents in the inductor coils within the selected inductor module and, based on the sensed rotation condition, the control circuit is configured to control the AC mode operation of the selected inductor module in response to the received wind condition to accelerate or decelerate the rotation of the cylindrical wind rotor assembly so that the rotation of the cylindrical wind rotor assembly varies dynamically with received wind condition to maximize an efficiency in converting the received wind power into electricity.

In some implementations, for example, each inductor coil can include a first half inductor coil part that includes a first magnetic core and a first conductor wire coil that winds around the first magnetic core, and a second half inductor coil part that includes a second magnetic core and a second conductor wire coil that winds around the second magnetic core, in which the first and second half inductor coil parts are positioned at opposite sides of a plane in which the magnets in the outer peripheral of the annulus ring rotor rotate to position the magnets between the first and second half inductor coil parts. In some implementations, for example, each of the first and second half inductor coil parts can include a C shaped magnetic core having two terminal ends that interface with the magnets in the outer peripheral of the annulus ring rotor, and two adjacent magnets in the outer peripheral of the annulus ring rotor are placed in opposite magnetic orientations with respect to each other. For example, the C shaped magnetic core can be configured to have the two terminal ends spaced from each other by a spacing of two adjacent magnets in the outer peripheral of the annulus ring rotor.

In some implementations, for example, the control circuit can include a digital signal processor that is programmed with software to control, based on the sensed rotation condition from the sensing circuit, the AC and DC modes of operation of the selected inductor module in the inductor module group. In some implementations, for example, the control circuit can be configured to control the inductor coils within the selected inductor module to cause the rotation of the cylindrical wind rotor assembly to be in a coasting mode which maintains a constant speed of the rotation of the cylindrical wind rotor assembly at a given received wind condition and produces a DC output of the wind power generator, a motoring mode which speeds up the rotation of the cylindrical wind rotor assembly while reducing a DC output of the wind power generator, or a generating mode which slows down the rotation of the cylindrical wind rotor assembly while increasing the a DC output of the wind power generator. In some implementations, for example, the control circuit is configured to control, based on the sensed rotation condition from the sensing circuit, the selected inductor module to operate in or switch to one of the coasting mode, the motoring mode, or the generating mode to dynamically synchronize operation of the wind power generator to the received wind condition and a load condition that draws power from the wind power generator.

In a quiet, strong, and unimposing form, the EiP wind machine 100 converts wind (e.g., rooftop wind) into stable electric power, from a single moving mass rotating inside a stationary one. Wind enters the machine 100 from all sides, and exits through the top and bottom of the hollow core 111. The electronic inertial power generation unit 110 of the EiP wind machine 100 has no central shaft or mechanical connections other than wind, only electrical and networking interfaces.

Rapidly rotating lines of magnetic flux from permanent magnets in the rotor generate electric power as they pass between stationary inductors. In some embodiments, for example, the EiP wind machine 100 can be configured to be approximately six feet in diameter, supporting eighty magnetic pole pairs (160 magnets). Figures in this patent document are based on this exemplary design, which demonstrates and proves the disclosed technology. This exemplary embodiment represents a minimum practical size of EiP wind machine. EiP technology is scalable to much larger size and power.

1.1.1 Adapting Electrical Generation to Simple Mechanics

Exemplary embodiments of the EiP wind machine can include simple mechanical components and devices, with integrated electrical generation. In general, there is one moving part: the wind/magnetic rotor (e.g., the wind rotor assembly 116 shown in FIGS. 1A and 1B). The wind swept area is effectively a cylinder of rotor blade height. In some embodiments of the EiP wind machine, for example, the wind rotor is attached on top of the magnetic rotor, which contains a ring of magnets positioned near the outer edge. Stationary vertical fins encapsulate the rotor in a sturdy structure that directs wind toward the center, e.g., which can provide a framework for stationary inductors (stators). Instead of one massive steel core with distributed windings, stator segments are modular "C" cores wound with copper and equally spaced around the rotor magnets, paired above and below. As the rotor slowly spins, magnetic flux circulates at high speed through stator pairs, generating pure sinewave AC power, with voltage and frequency increasing with rotor speed (synchronous power). Synchronous power is combined and regulated by integrated EiP oscillator electronics in a modular array of stators.

1.1.2 Utilizing the Inertia of a Massive Rotor

A larger radius wind rotor increases the wind swept area and energy potential, although at slower rotation speed. Inertia and mechanical torque increase with the square of the radius, along with overall weight, like a large and heavy flywheel. The large flywheel is an excellent storage and regulation device for mechanical torque, but too slow moving for direct electrical generation on a shaft. In most wind turbines, the rotor needs to be superlight to spin faster than wind speed to directly run a generator shaft. EiP technology converts high mechanical torque at slow speed directly into useful electric power at the edge, not the center, maximized and stabilized at low speed by the large radius and enhanced mass of the wind rotor.

Energy storage flywheels typically use a rotor of small radius and operate at high speed, since energy storage potential increases exponentially with speed. In EiP technology, the flywheel is a heavy rotating cylinder; at a certain speed accumulated inertia becomes significant, magnifying the energy potential in small changes of angular velocity. EiP technology recirculates power from excess inertia toward controlling rotor speed, further enhancing the flywheel storage time.

High inertia delivers peak power output resembling a massive battery bank. EiP wind machines eliminate the need for batteries and other temporary storage. Where long-term storage is required, like in off-grid applications, the battery bank could be replaced by fuel cells.

1.1.3 Modular Architecture

The disclosed EiP technology enhances power production from less weight and cost of materials, through massive parallelism with a modular architecture. Breaking down a massive amount of magnets, iron, copper, and silicon into optimized modules produces more power from the equivalent material mass of the monolithic approach. EiP technology provides a new type of three-phase generator module, stacked around the rotor edge, where thrust force is multiplied by the rotor radius for total torque. In other words, the equivalent electrical input for a rotary machine is amplified by the radius upon which the module operates to deliver greater torque from the same amount of copper, steel, and magnets.

In some implementations, for example, each generator module is a linearized three-phase machine that receives excitation from the magnetic track around the wind rotor, instead of a rotary shaft. Using three split inductors, half above and half below the rotor, with respect to eight rotor magnets passing between at any moment, EiP technology includes a specific physical layout for magnets and stators that enforces three-phase synchronous operation between any three adjacent stators. Since each module is synchronous, standard three-phase electronic rectifiers and industrial drives are available off-the-shelf for DC conversion and motoring control.

In a minimal configuration, for example, three modules are arranged around the rotor one hundred twenty degrees apart. For more power, four can be arranged ninety degrees apart in quadrature. Six can form a star configuration with sixty degrees of separation. The number can be expanded geometrically, until the entire circumference of the EiP machine is fully populated with generator modules.

1.1.4 Direct Conversion of Electromagnetic Torque to Power

In some implementations, for example, EiP technology uses a sensorless technique that reads timing cues directly from synchronous power, using digital signal processing. Electromagnetic torque control occurs faster than changes in wind speed, so energy from wind gusts is smoothly absorbed from rotor torque changes.

Smooth torque control gently speeds up the rotor, storing excess energy as inertia, which accumulates dramatically with speed. Generator modules operate as motors and generators at the same time, while EiP technology responds faster than the wind, and even faster to changes in load.

Essentially, for example, the EiP machine contains many smaller electrical machines sharing and combining power on a DC network. For speed control, one module acts as a motor while two or more generate. The motoring module maintains speed under load by injecting bursts of thrust applied to the rotor radius. At a certain speed, energy from inertia exceeds the load and electrical/mechanical overhead, creating a condition referred to as "overhauling", from which power is harvested by reverse motoring, when the motoring module becomes a generator.

1.1.5 Energy Storage by Electronic-Mechanical Oscillation

EiP technology combines energy from wind and inertia with electronic actions, to spawn the EiP oscillation. Rotational inertia allows the rotor to resist changes in speed: acceleration with a sudden gust of wind, or deceleration under changes in electrical load. The EiP oscillation amplifies inertial effects in a positive direction: increasing the uptake of wind power from a heavy rotor while reducing slowdown from peak loading. In effect, for example, multiplying rotor flywheel energy storage time using only the tiny amount of power required to keep electronics running.

1.1.6 Cleaner and More Efficient Power Generation

When all of the windings of a large conventional generator are stitched together, they pick up stray magnetic fields leaking out of the rotor. The resulting AC output is ragged, full of rotor harmonics, which produce heat not useful power. The synchronous generator produces pure sine waves. EiP technology breaks up and isolates core elements as compact segments, using a novel electronic/magnetic design that concentrates stray magnetic fields. The result is a modular synchronous power with low harmonic content, efficiently converted to DC and combined with other modules.

1.2 Urban Rooftop Wind Power

EiP wind machine aerodynamics and slow rotation speed make it ideally suited for the rooftop. The EiP wind machine can be placed on the rooftop for maximum wind exposure, with no tower. Wind flows in from all around, extracting maximum instantaneous wind force from gusts in any direction. The rotor is quiet because it spins so slowly, with a hollow center that enhances windflow through the machine. Neighboring EiP wind machines combine on the locally shared grid, to create an urban wind farm that derives its resource potential from windflows and turbulence that occur near rooftops.

1.2.1 Power From Wind Gusts

Conventional wind machines require steady non-turbulent wind conditions, which rarely occur in the urban setting. More often, high wind energy appears in brief and powerful gusts. EiP technology converts power from the impulse rotor within a fraction of rotation, much faster than wind speed changes. Instead of a ten-minute interval, EiP technology captures power in milliseconds.

The EiP wind machine is ultra-reliable and sturdy enough to handle extremely high wind gusts, which normally destroy wind machines on tall towers. Immediate repairs are not required for single component failures, through a redundant architecture that spreads the electrical and mechanical load, allowing continued operation at reduced power. Failed parts are identified during runtime, and replaced during regular service intervals, for low overall downtime.

1.2.2 Power from No Wind

With a tiny amount power from the grid, the EiP wind machine rotor stays spinning without help from the wind. In "standby" mode, rotor inertia and aerodynamics plus electronic speed control hyper-sensitize the uptake of energy from light random wind gusts and rooftop heat convection. While power from the grid trickles in, the EiP wind machine delivers power backed by rotor inertia and electronics, with vast surge potential. High surge power stabilizes peaks and dips in local grid service, and assists directly connected solar panels and fuel cells in delivery of solid grid-quality power without batteries.

1.2.3 EiP Wind Machine and Rooftop Solar

In some implementations of the disclosed EiP technology, the EiP wind machine can be integrated with rooftop solar systems to provide an expansive multi-sourced renewable ("green" or "clean") energy solution, e.g., in urban or rural settings. Rooftop solar works great during daylight hours on sunny days, in places where structures are unshaded by trees and tall buildings. Rooftop solar fails to deliver energy output over the course of a 24-hour day. However, rooftop solar is a great way to extract power from the urban landscape, with zero maintenance and fuel costs in the long term.

The EiP wind machine is the ideal urban rooftop energy source, generating power for local consumption, in a quiet, sturdy, and architecturally pleasing form, in daylight or total darkness. The EiP wind machine takes up very little roof space with respect to total power output, with low impact on the urban landscape, no towers or guy wires, no sharp edges or exposed windblades. The EiP wind machine is stand-alone. Just place it on a sturdy rooftop platform, and hook it up to the grid. A network interface (wired or wireless) provides setup, monitoring, and control functions from any location. In combination with rooftop solar, the EiP wind machine provides backup storage and surge power as a low-speed high inertia flywheel, providing an alternative to battery banks.

1.3 High Reliability Scalable Modular Design

One of the greatest failings of wind turbines is scalability to larger size. Smaller models seem to work great in the lab, but when the radius is expanded the speed of rotation slows and mechanical torque increases to a point where efficient electric power production is impossible. In the EiP wind machine, electric power generation naturally expands with rotor size. Slowness is not a problem, since the larger radius allows space for a greater number of power generating parts.

EiP design principles are scalable, expandable for maximum energy uptake and power output for an EiP wind machine of very large size.

The optimal EiP wind machine size matches the resource potential for the installed location. The height and radius of a modular "windzone" is selected, which defines total mechanical power. A larger windzone radius supports more generator poles required to produce maximum power at the average speed of rotation. Modular EiP electromagnetic components are added to interact with permanent magnets embedded around the rotor circumference, for optimized power output.

1.3.1 Fault Tolerant Mechanical Design

For reliability, the EiP wind machine has only one moving part, where mechanical systems are replaced with magnets, coils, and electronics. Direct drive requires no mechanical gearboxes, slip rings, or commutation. For example, main bearing failure causes the most downtime in conventional wind machines. The hollow center of the disclosed EiP technology eliminates the main bearing, e.g., using multiple smaller bearings that spread the load around the rotor circumference, where stresses are least. For example, if a bearing should fail, overall operation is unaffected.

1.3.2 Generator Modules

For example, the second highest source of downtime is generator failure. The EiP wind machine splits the generator into discrete inductors, organized as three-phase modules sharing a common DC connection. Integrated rectifiers convert three-phase AC into DC, isolating each generator module from the next. If one should fail, the machine keeps running under reduced power output, not total shutdown.

The EiP windzone, where wind is converted to mechanical energy, has one moving part that spins inside a stationary one. Overall height and radius define the total wind swept area, the surface area of a cylinder. Also, for example, options for architectural considerations like color, height restrictions, and roof space, can also be selected, and combined for a specific EiP wind machine configuration.

1.3.3 Low Cost and Manufacturable Design

Through EiP technology, the size of all electromagnetic elements are optimized, fine-tuned for maximum power production at least weight and cost, and replicated in a modular design. The EiP wind machine can be built from common materials, e.g., like stainless steel, aluminum, copper, and magnets, found in any high efficiency front load washing machine. Structural parts can be fabricated from laser cut plate stock. Other parts, like magnets, inductor cores, coils, electronics, and bearings, can be selected from a wide range of original equipment manufacturer (OEM) sources. A prime advantage of EiP technology is to build locally, assembling the EiP wind machine near the place of installation, using non-exotic facilities, skills, and fabrication techniques.

1.4 EiP Spontaneous Networking Technology

EiP technology specifies a network interface (e.g., wireless, wired, or fiber optic) for monitoring and control of the EiP wind machine from a convenient location. Using this interface, for example, multiple EiP wind machines can operate as "spontaneous" networks, linked by location and real-time power demands. Power conditioning is a byproduct of EiP wind machine architecture, stabilizing delivery of renewable energy at a local level. In an illustrative example, EiP wind machines on spontaneous networks in over populated areas capture waves of power as gusts propagate around town. Every EiP wind machine on the network is able to share status to all others, tapping into a real-time stream of wind and grid conditions, through which all EiP wind machines synchronize power storage and regulation. As excess power is created by one machine, another can instantly absorb it, working with all other EiP wind machines on the grid segment to locally balance power demands.

1.4.1 Grid Intertie that Satisfies Local Power Demand

Unfortunately, the existing power grid is essentially an energy wasting system, with wind power integration considered to be a nuisance. Losses from hundreds of miles of copper wire, combined with the heating of magnetic steel in transformers that regulate power for delivery, cancel out power coming onto the grid from the wind. For the grid to remain on at all times, powerplants must be running at full power to maintain the magnetic fields required for grid regulation, and wind farms must be backed by "flexible" hydro or fossil fuel generation. Local energy production and conservation simply reduce power bills but in the big picture, no actual power is generated for the grid. Grid intertied renewable energy is just a gimmick that simply moves the meter backward, where excess renewable energy is simply dissipated into the service transformer as heat.

EiP wind machines offer the ideal solution for generation and resale of rooftop power for the local grid. For billing and power management, a private encrypted channel on the EiP spontaneous network, provides remote management of all EiP wind machines in the utility domain. The private channel accurately reports network-wide renewable uptake vs. grid delivery, in a true net metering architecture. Widespread use of EiP wind machines offers a way to eliminate the sidecar powerplants that backup all large wind and solar farms, and all of the wasted power for grid regulation, which cannot be sold to subscribers.

1.4.2 Self Organizing Local Positioning System

On the spontaneous network, a constant flow of information indicates instantaneous energy conditions. In each EiP wind machine real-time data is mapped to the local terrain (both physical and electrical), creating a framework for power sharing focused on local demands. Since all EiP wind machines generate power near where power is used, and operate more quickly that wind and load changes, each anticipates and adjusts for surges and sags that ripple through the network, e.g., capable of adding just enough surplus power at the right moment for regulation. For example, since location is key, this framework creates the side effect of a self-organizing local positioning system, which is totally ground-based, requiring no satellites or transoceanic fiber.

1.5 EiP Technology and Sustainable Grid Systems

The hallmark of a sustainable energy system is the production of excess renewable energy, producing always in excess of what is needed, dumping excess energy to maintain balance. In times of low energy production, like a dark cloudy day when using solar, temporary storage is required which allows a limited time of use until power shuts down. Once power has failed, the true meaning of sustainability is revealed: produce more than you use, or take a break.

The grid is unsustainable, requiring massive energy input greatly in excess of anticipated demands, regardless of natural limits. EiP technology opens the pathway to a sustainable grid, where many EiP wind machines provide localized power generation, storage, and regulation, sharing excess power at the right moment, with extreme efficiency. Long distance power lines and step-up transformers are eliminated, along with sidecar powerplants for wind farms.

1.5.1 Local Solution for Backup and Energy Storage

Spontaneous EiP wind machine networks can be operated to transparently take over when grid power sources falter.

For example, the heavy rotor provides enough inertia to ride through temporary power disturbances. For example, the sturdy structure of the EiP wind machine resists failure under hurricane-force winds, so local service is maintained even though long distance power lines have been severed. In the urban setting, for example, EiP technology delivers the solution for sharing locally generated renewable energy, with low cost and minimal impact. Widespread adoption of EiP technology eliminates the need for large distant power-plants, huge transformers, and long inefficient transmission systems. When many EiP wind machines are combined on the network, their combined electromagnetic torque represents tremendous instantaneous power capacity to meet load demands, or back down gently when resources are low.

1.5.2 Pathway to 100% Renewable Power Grid

EiP technology embeds power generation under high-speed electronic control into the large flywheel. Networks of EiP wind machines across the urban landscape can create a wind farm with enough inertia to power a fast and efficient capture, storage, and regulation system that instantly converts the ebb and flow of rooftop resources into steady consumer power. For example, if distant hydropower, wind farms, and transmission systems fail, distributed local generation and distribution systems based on EiP technology operate without disruption, backed by the engineered design of the EiP wind machine; the missing ingredient for 100% renewable power.

2 Operation Principles

EiP technology includes a specific arrangement of magnetics plus embedded electronic control for a modular linear synchronous machine. Modules are combined around the rotor circumference to form a large synchronous permanent magnet machine. The magnetic circuit design guarantees three-phase excitation for any three adjacent stators, for example, which can be equally spaced around a magnetic track in the rotor. Integrated EiP oscillator electronics combine power on a common DC connection (DC link). Each module generates power from high mechanical torque at slow rotor speed, from rotor magnetic fields at fast electrical speed. Three modules form a minimal EiP machine, duplicated around the rotor in groups for massive electromagnetic torque potential. Total power is the sum all modules, for example, like locomotives on a circular track, except that each one multiplies its torque by the rotor radius. When fully populated, for example, the EiP machine delivers electromagnetic torque more quickly and powerfully than conventional generators and transmissions.

2.1 EiP Machine: Ultra High Efficiency Axial Flux Generator

Axial magnetic flux, in parallel with the center of the rotor, powers many common vertical axis wind machines. Many use stators without an iron core, only copper coils with steel mounting plates holding surface mounted magnets that rotate around. This reduces the effects of magnetic drag from attraction to inductor cores, reducing the minimum wind speed for startup. However, this design fails to concentrate rotor flux toward electric power production.

EiP technology provides a new electrical energy generation machine: a modular high torque slow speed axial flux generator, with interior permanent magnetic poles, and no central shaft. EiP technology advances the axial flux generator design far beyond normal limits, concentrating all magnetic flux to synchronous power, maximizing electromagnetic torque from the least amount of copper and steel, unlimited by shearing stress on a central shaft.

The EiP machine combines three-phase modular magnetics with embedded EiP oscillator electronics, to convert sudden fluctuations in mechanical torque to stable electric power backed by rotor inertia. The modular approach provides the best way to adapt efficient power generation to a large and slow-moving wind rotor.

2.1.1 No Drive Shaft, Unlimited Torque

One primary difference between the EiP machine and other large generators is greater electromagnetic torque potential because of no central shaft, where shear strength limits thrust on a large radius. The EiP technology includes modular magnetics that match mechanical torque at the rotor's edge with overwhelming thrust force, e.g., instead of twisting and breaking a shaft. Also, for example, the bearing load is spread around rather than centralized, for fault-tolerance and high-reliability.

2.1.2 Load Controlled Rotor Speed

EiP technology includes regulation of the rotor speed by electrical loading on the DC link, or reverse generating (motoring). Loading slows the rotor, while wind speeds it up, all at random times. Using instantaneous bursts of forward and reverse motoring, total inertia is maintained as speed changes occur in a controlled fashion.

2.1.3 Enhanced Flywheel Storage Through EiP Oscillator Electronics

The EiP magnetic rotor represents the ideal flywheel for high torque at slow speed, naturally bolstering wind power uptake. Embedded EiP oscillator electronics inject thrust response to random changes in a fraction of rotation, faster than mechanical speed. This converts a wide dynamic range of wind conditions to gradual rotor speed changes.

When load is less than wind plus inertia, electronic interactions extend inertial storage time beyond the flywheel storage effect. As rotor speed goes up and down in a relaxation oscillation, it directs power from wind and inertia toward electrical loads plus rotor speed regulation. A small change in rotor speed corresponds to a large change in energy potential.

For even greater storage time, for example, clusters of EiP wind machines linked by EiP spontaneous networking bounce power from excess inertia between machines. Over a wide geographical area, storage time through oscillation expands, providing the foundation for 100% local renewable power.

2.2 Magnetics Design

Compromises in generator magnetics design are required by direct drive wind machines to overcome the following limitations to efficiency. For example, slow rotor speed means more magnetic poles, so the generator radius must be larger. Stator cores must be near the poles; magnetic attraction acting on a large radius creates excessive cogging force, forcing higher start up wind speed. Stator windings and monolithic core must encapsulate the rotor circumference, which produces an excessively heavy machine. Long stator windings generate harmonics from magnetic rotor leakage flux. Massive electromagnetic torque acting on a large radius can destroy a central shaft.

EiP magnetics design conquers these limitations without reducing efficiency. Cores are segmented and arranged to form discrete permanent magnet synchronous machines. The arrangement of cores vs. magnets reduces the cogging force. Segmented cores exhibit less heat loss from eddy currents at higher frequency than a monolithic core. Synchronous power is clean, producing pure sinewave output. In some embodiments, for example, an exemplary EiP modular design specifies a three-phase magnetics architecture with integrated electronics that isolates and concentrates stray rotor flux. Magnetic flux rotates between core elements using a linear design requiring no driveshaft or gearbox.

2.2.1 Permanent Magnet Synchronous Power

A synchronous generator produces sine wave AC power, of increasing voltage with rotor speed (n). The frequency (f) increases as well; how quickly depends on the number of magnetic poles (p), as shown in the following Equation 2-1: Synchronous Power Frequency and Magnetic Poles:

$$f=pn/60 \qquad \text{(Eq. 2-1)}$$

In the exemplary EiP machine, pairs of magnets are embedded with alternating polarity, to form one generator "pole pair". Using the above formula on the exemplary EiP wind machine rotor, e.g., with 160 magnets forming 80 pole pairs, spinning at one revolution per second (60 RPM), produces AC power at 80 Hz (three quarters rotor speed=60 Hz). At 1.5 revolutions per second, the nominal operating frequency is 120 Hz. Since each stator interacts with two pole pairs, four magnets pass between in one cycle, doubling the frequency of the induced voltage. While the mechanical angle between stators and magnets is 30 degrees, the electrical angle is 60 degrees. This is an advantageous design choice, which doubles the electrical excitation of the stators at slow rotor speed.

The exemplary EiP magnetics design partitions a massive steel core into isolated silicon steel cores, with thin laminations to reduce eddy current loss, organized as modular three-phase machines around the rotor. The synchronous design guarantees production of smooth pure sine waves (non-trapezoidal) in proper phase by concentrating all magnetic flux, axial, transverse, and leakage, toward the fundamental generator frequency, for low losses. Electronic rectifiers isolate stator windings that share a common DC link. Distributed core elements with integrated rectifier, and modular three-phase format, present a new magnetic design, e.g., for maximum power with highest efficiency, at the finest level of control possible. Modules can be combined to match the EiP wind machine configuration.

2.2.2 EiP Permanent Magnet Linear Synchronous Machine (PMLSM)

When rotary four-pole three-phase stators and magnets are laid out inline, the EiP permanent magnet linear synchronous machine (PMLSM) is defined. Relative size and placement of magnets and stator cores minimize cogging torque and enforce three-phase operation between any three adjacent stator pairs, drawing excitation from rotating magnetic fields of eight magnets passing between. In the rotary and linear models, a thirty-degree mechanical relationship between inductor core faces and pole pairs produces an electrical angle between phases of sixty degrees. Wye connection between the stators provides one hundred twenty degree three phase operation.

Figure 2A:
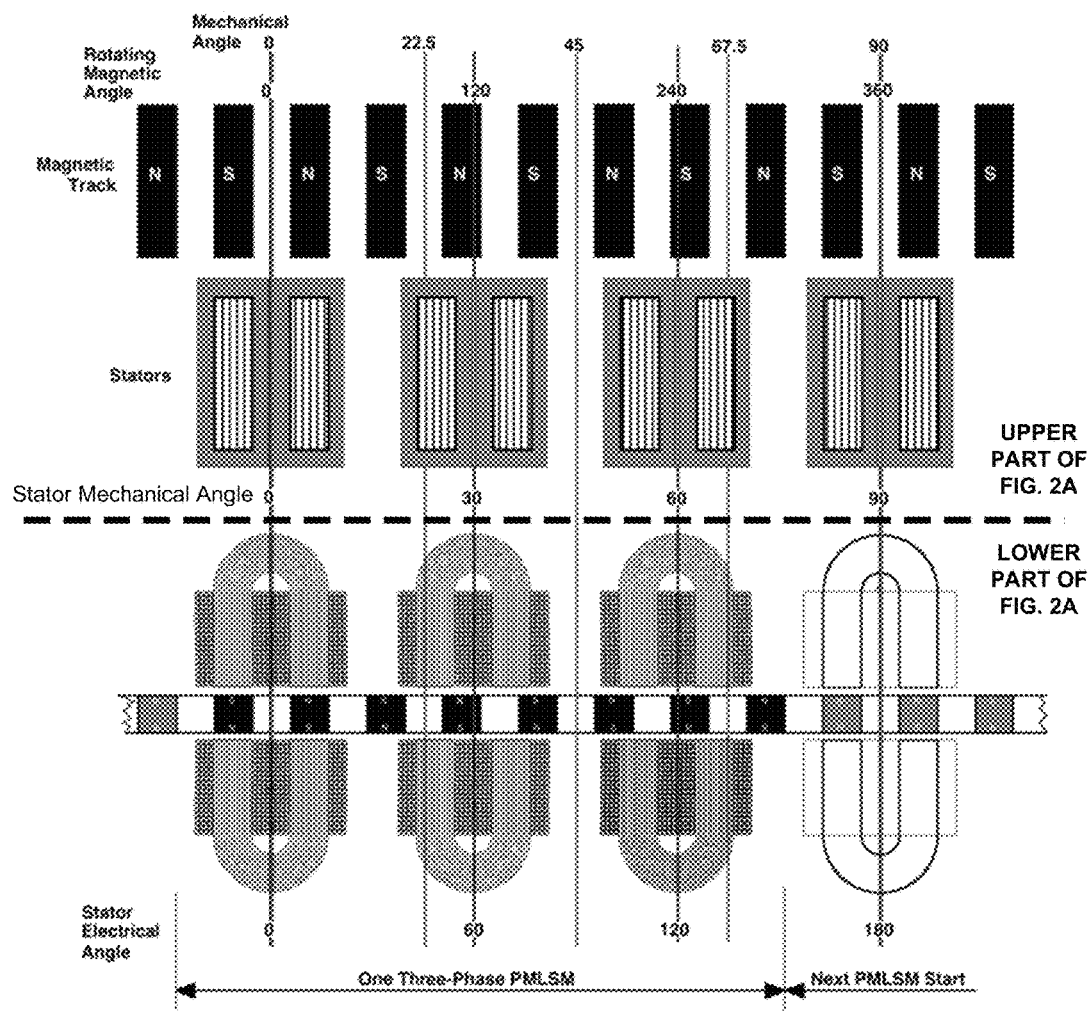
FIG. 2A shows a diagram of an exemplary EiP Permanent Magnet Linear Synchronous Machine (PMLSM).

FIG. 2A shows the relationships between magnets and stationary inductors (stators) depicting the magnetic vs. mechanical cycle of a three-phase grouping. The diagram of FIG. 2A shows how the physical layout of this exemplary embodiment translates to dynamic three-phase operations. The upper half of the diagram shows the top layer of stators opened up like book pages to indicate the pattern of magnetic poles to stator legs. The lower half shows the view at the rotor edge. The physical placement of stators vs. magnets is compact, with a narrow mechanical angle. The electrical angle fits the three-phase model, twice the mechanical angle because magnetic poles are built from oppositely polarized pairs of magnets. Excitation from rotating magnetic fields with respect to stator cores is twice the electrical angle, for full three-phase wye operation.

For example, each EiP PMLSM is like a linear positioner optimized for power production, with 3 stators forming the "mover", and four magnetic poles embedded in slots around the rotor circumference acting as the "track". Permanent magnets are equal in width and thickness, in alternating axial polarity, separated by magnet width. Stators pole faces match the footprint of two magnets, on "C" cores made from 3% silicon steel laminations. Two C cores on opposite sides of the rotor, with equal windings on each leg, wired in series above and below the rotor magnets, form one stator. A given rotor circumference supports a certain number of stators and magnets equally spaced around the rotor, partitioned into three-phase groups. Magnet size defines stator dimensions, and the total number that fit around the magnetic track. The ratio of four magnetic poles to three inductor cores, evenly spaced, minimizes cogging (torque ripple), where magnetic pull on one inductor/pole pair is balanced by three magnet pairs pulling on two inductor cores.

2.2.3 EiP Synchronous Generator Magnetic Circuit

The exemplary EiP magnetic circuit uses C cores to concentrate magnetic fields from rotor flux to synchronous AC power. Rotor harmonics reinforce the fundamental frequency, for optimum efficiency. The C cores are basically a split transformer core, with an extended gap to accommodate the magnetic rotor in between.

Figure 2B:
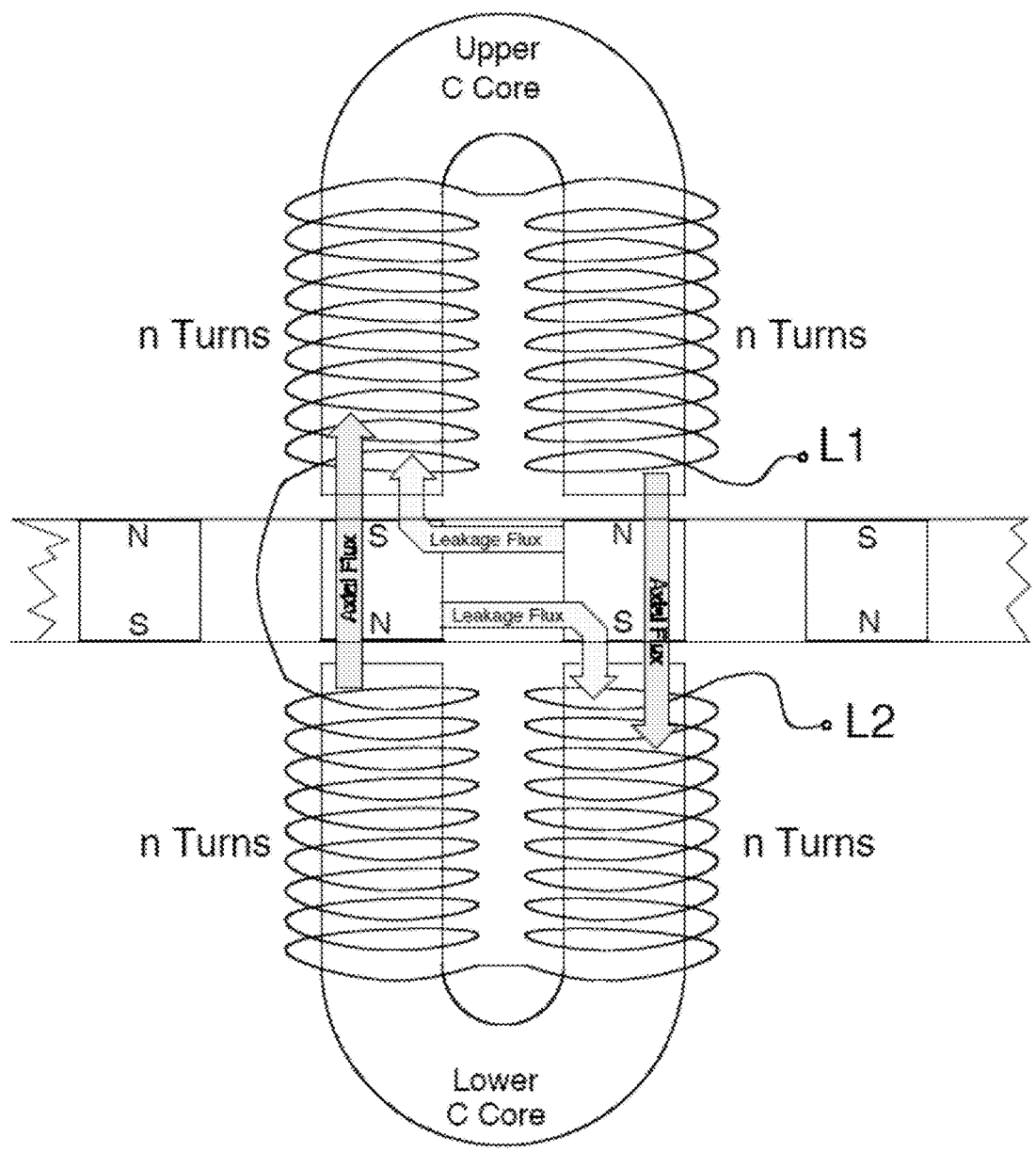
FIG. 2B shows a diagram of an exemplary EiP synchronous generator magnetic circuit.

FIG. 2B shows a diagram of an exemplary EiP synchronous generator magnetic circuit of the present technology, as viewed from the side. In the figure, magnetic lines of flux from permanent magnets follow the path of least resistance from north (N) to south (S). Axial flux is conducted by magnetic steel, strengthening as core faces line up, eventually to saturation. Embedded rotor magnets of opposite axial polarity, separated by a distance equal to width and thickness, provide a secondary magnetic circuit for leakage flux. In combination with the relative motion of C cores, this secondary circuit concentrates rotor leakage magnetic fields toward synchronous power.

At minimum gap, e.g., where core faces line up with magnets, maximum flux density saturates upper and lower core halves through four coils, wired in series for maximum voltage at leads L1 and L2. L1 connects to one leg of the three-phase wye (U, V, or W), L2 is the common connection (C). Each coil is wound with an identical number of insulated motor wire turns, of gauge and length appropriate for a given winding area. Voltage drops to zero as the core lines up with space between magnets, then full negative as cores align with magnets of opposite polarity, producing one AC cycle.

In this exemplary design, the C core saturates easily in direct proximity with a magnetic pole pair, flipping rapidly with rotor motion. This means a narrow magnetic gap is not required for full voltage, which allows for looser mechanical constraints on rotor motion. This enhances the fault tolerance of the EiP wind machine, and reduces manufacturing costs.

2.2.4 Trapping and Concentrating Stray Rotor Flux

Peak axial flux linkage occurs at the moment of core saturation. Magnetic attraction between adjacent magnets produces a weaker magnetic field in both radial directions that traps radial flux at the rotor edge. Once the rotor is moving, leakage from fringing flux around the gap is swept up in this magnetic field by the C cores passing by, in phase with axial flux. Track curvature also creates a slight amount of transverse flux. C core laminations of different length oriented perpendicular to the movement of magnets, concentrates this relatively small amount of transverse flux. All leakage flux components, radial, fringing, and transverse, combine in sync with axial flux on every cycle, eliminating rotor harmonics at the magnetic circuit level. Magnetic fields synchronous with magnet poles rotate with respect to stator cores. Each C core in the stator pair concentrates flux and completes the magnetic circuit with respect to magnet pairs, producing pure three-phase sinewave AC with no harmonics.

Unlike other large PM machines with distributed windings, stray rotor magnetic fields and harmonics are not an issue when PMLSMs are combined because they connect electronically. All rotor flux is concentrated at the PMLSM level, allowing the construction of a very large PM generator by adding modules, unlimited in efficiency by induction of stray magnetic fields.

When motoring, switchmode electronic inverting produces a waveform that is not purely sinusoidal. However, the aluminum rotor that holds the magnets is conductive, and a low-current non-sinusoidal potential exists between wind rotor and stator, which increases with speed. A contact is required that dynamically connects the entire windzone (rotor and fins) during all operations. The exemplary EiP wind machine uses conductive support roller bearings to create an electrical connection between wind rotor and base. This allows all non-sinusoidal motoring currents to follow the common ground path away from DC power output.

2.2.5 Three-Phase Magnetic Circuit

Figure 2C:
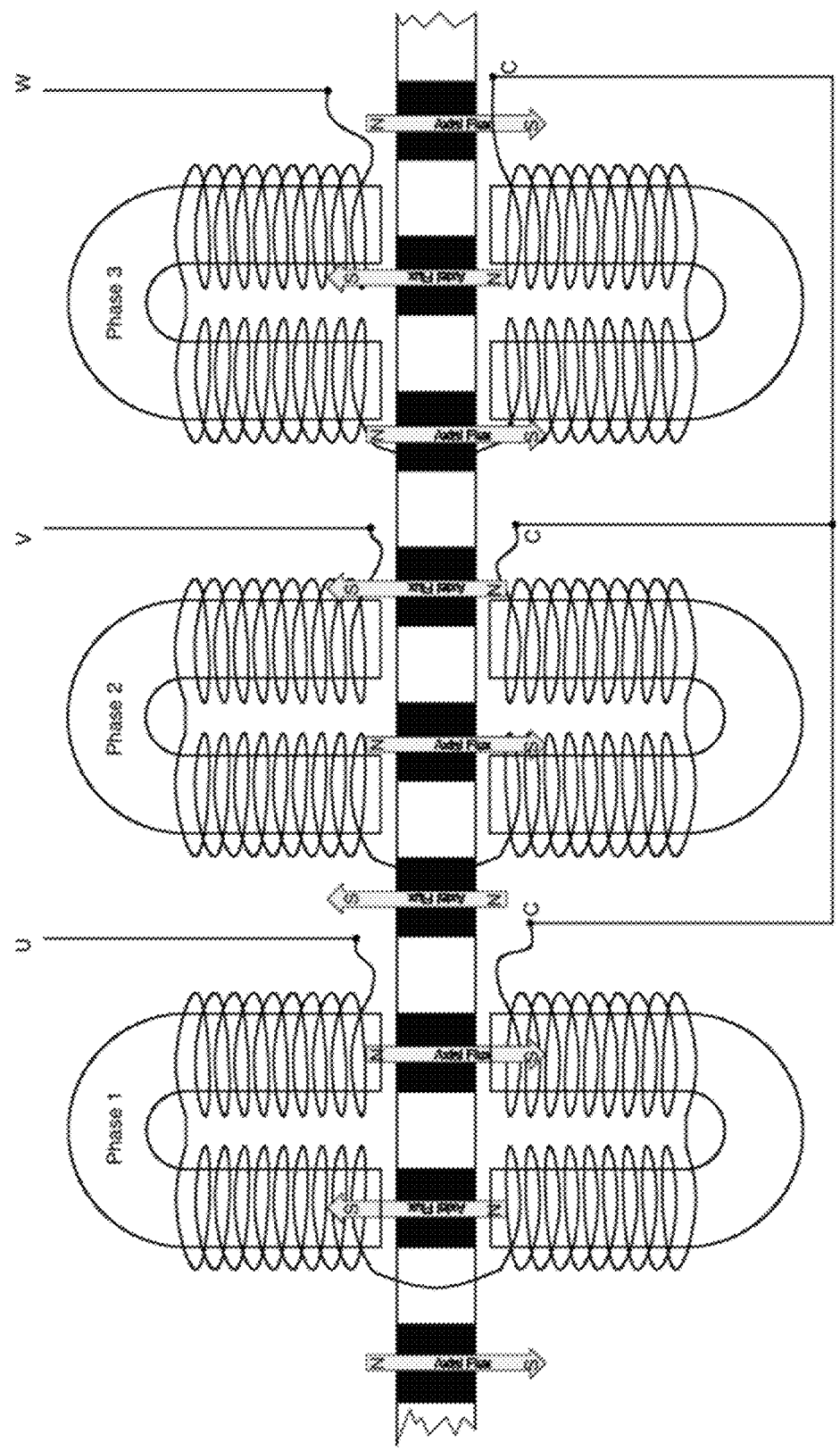
FIG. 2C shows a diagram of an exemplary PMLSM three-phase magnetic circuit.

FIG. 2C shows a diagram of an exemplary PMLSM three-phase magnetic circuit of the present technology. The diagram of FIG. 2C shows how three adjacent stators connect as a wye to form one PMLSM, and how they line up with axial rotor flux. The lower leg of each magnetic circuit is connected to a common point (C). Each upper leg of the wye (U, V, and W), attaches to EiP oscillator electronics (e.g., also refer to Section 4 for schematics).

2.3 EiP Wind Machine Sizing and Expansion

EiP technology is naturally scalable to produce a very large interior permanent magnet generator. Self-similarity in structure at the modular, machine, and networked machine levels, supports a fractal pathway to expansion. This section describes some exemplary design rules for EiP wind machine components, where a finite number of parts are replicated in certain patterns for expansion of EiP wind machine size and power. A key aspect of EiP technology is cost minimizing by simplification: producing more power from a small set of parts, replicated in specific ways to build the EiP wind machine. The most dramatic increase in power can occur when the radius is expanded. So, the EiP wind machine can be configured to be typically wide and of low profile, which is ideal for rooftop installation.

2.3.1 Modular Power Expansion

Figure 2D:
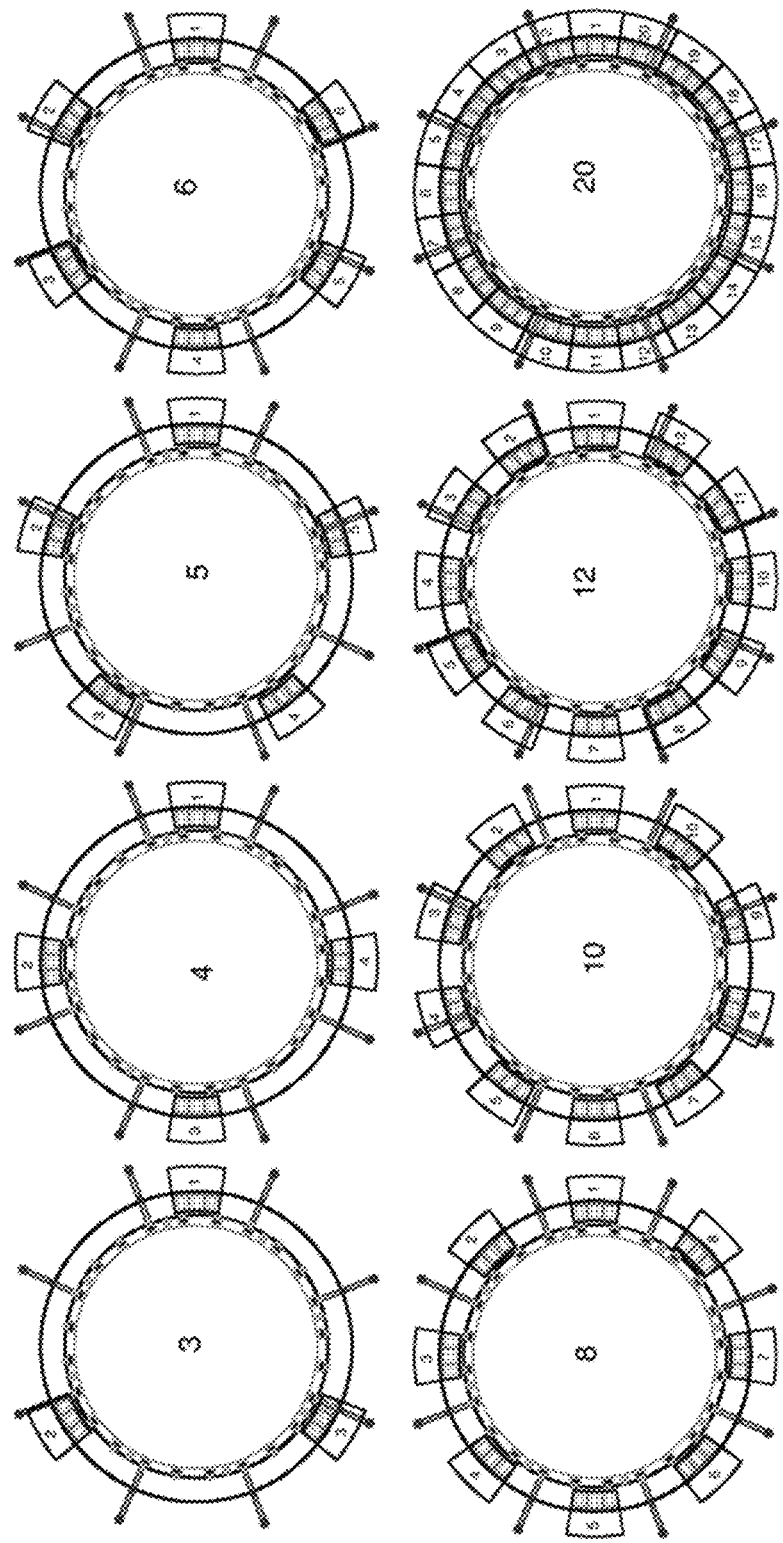
FIG. 2D shows a diagram depicting exemplary PMLSM modular combinations for exemplary EiP machine radius.

Each PMLSM is a modular linear three-phase machine with integrated power electronics. If one PMLSM is capable of producing one kilowatt of power, the EiP wind machine configurations can be created for three, four, five, six, eight, ten, twelve, and twenty kilowatts, e.g., up to sixty pairs of inductors as shown in FIG. 2D. FIG. 2D shows a diagram depicting exemplary PMLSM modular combinations for an example EiP machine radius. The example combinations shown in FIG. 2D include, but are not limited to, three, four, five, six, eight, ten, twelve, or twenty PMLSMs in an EiP wind machine.

In addition to electrical power expansion, another advantage of adding PMLSMs is enhanced instantaneous torque thrust, which acts upon the rotor radius for mechanical power expansion. The power of each module is multiplied by the radius, then added to the total. For example, as radius expands, the circumference enlarges to fit more modules, each multiplying its power by a larger number. The massive amount of peak power potential easily accommodates the strongest wind gusts. Section 4 of this patent document provides more information on modular configurations and electronics.

2.3.2 Magnet and C Core Sizing

The selection of magnet dimensions affects the size of EM components, which determines electrical power for one PMLSM. The rotor radius affects the number of magnetic poles for a given size of magnet. A rotor contains a certain number of magnets and layout, for example, for which EiP technology specifies the following example design rules.

1. Eight magnets per three C cores, above and below.
2. C core faces match the footprint of one magnet pair.
3. The minimum length of core legs is three times the space between.
4. The space between magnets around the rotor circumference equals magnet width.
5. Minimum magnet length is three times the width.
6. Magnet thickness equals width (and thickness of the magnetic rotor plate).
7. Magnets are polarized through their thickness, arranged in opposite axial pairs.

For example, the exemplary EiP wind machine can include a magnetic track built using 160 NdFeB magnets. The magnet size is 2 inches long polarized through ½ inch thickness, embedded around the rotor separated by ½ inch. C core faces are 2 by ½ inch, with ½ inch between 1½ inch legs. The arrangement of magnets results in a rotor diameter of 55 inches, supporting enough inductors for 20 three-phase PMLSMs. Section 3 of this patent document provides more information on the magnetic rotor physical characteristics.

For example, both magnets and C cores are commodity items, chosen for lower cost rather than optimal motor magnetics. The EiP magnetic design captures and concentrates leakage and fringing flux that results from using low cost magnetics, with optimum efficiency.

2.3.3 Inductor Core Windings and Fill Factor

The number of stator core windings can be determined by the absolute amount of insulated copper wire that can be fit around C-core legs. For example, using mean length of turns (MLT) method for a given wire type, total inductance (and power) is determined by number of windings, the length of each defined by core dimensions. Long wire length at a certain thickness offers higher DC resistance, which impedes magneto-motive force. To reduce these effects, a larger gauge wire must be chosen. Since the winding area is finite, the optimum number of windings depends on the fill factor: the relative amount of bare copper in the winding window divided by the window cross-sectional area.

Figure 2E:
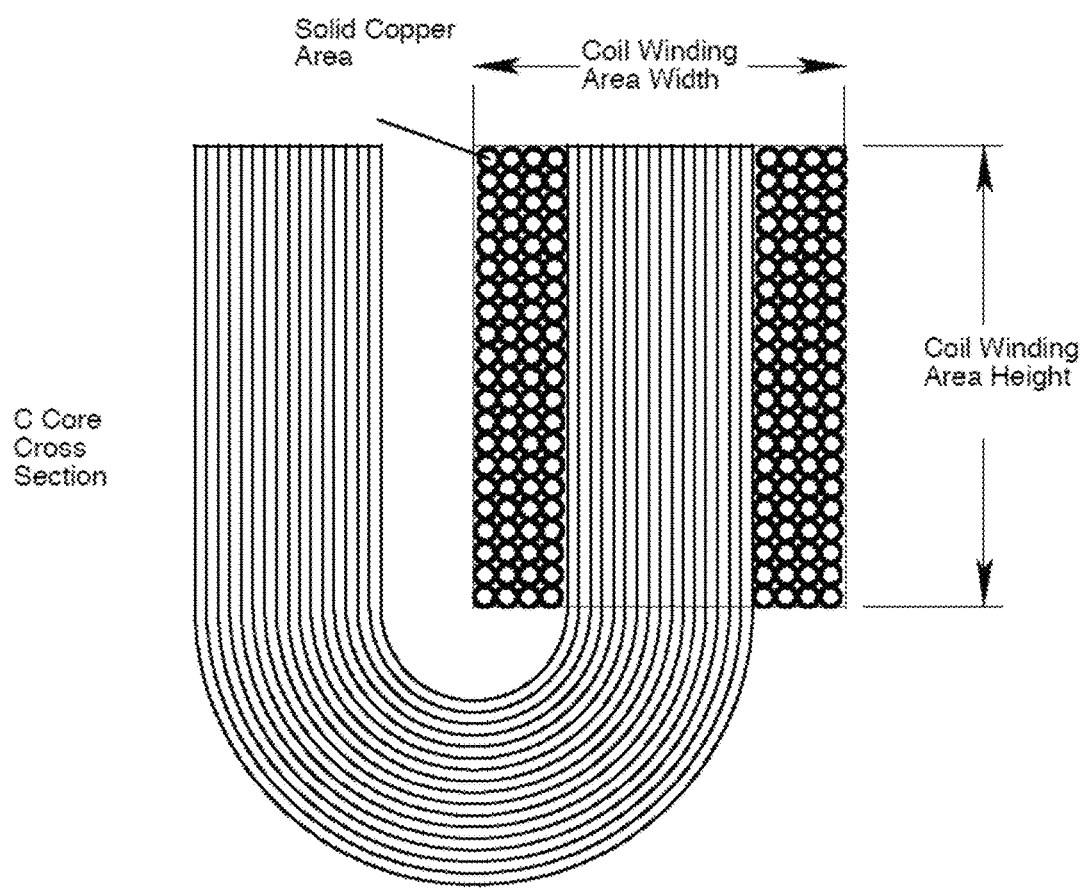
FIG. 2E shows a diagram of exemplary C core and fill factor.

In such implementations, for example, a fundamental design rule is to expose the maximum amount of bare copper at any given instant to rotor magnetic fields. Each gauge and type of insulated motor wire offers a certain fill factor for a given core size. Using the cross-sectional area of the wire and insulation from its data sheet, divided into the available winding window area reveals how may half turns. Multiply the amount of bare copper in the wire cross-section by this number, and divide that by the window area, for the fill factor. Calculating for a range of wire types and gauge, compare all the combinations and select the highest fill factor with the lowest DC resistance, and the maximum corresponding number of turns. This guarantees maximum performance from the coil, for a certain size C core. FIG. 2E shows a shows a diagram of exemplary C core and fill factor, illustrating a cross section of C core laminations and one coil, and the winding cross-sectional area:

For some exemplary embodiments of the EiP wind machine using 16-gauge wire, the fill factor is 0.66 (⅔) for a total number of windings of 96 per C core leg. If 14-gauge square wire is used, the fill factor is 0.85 with 60 turns per leg. The one with the highest fill factor and lowest DC resistance (DCR), which exposes the maximum amount of copper to rotor magnetic fields, is best for generating. However, the one with the highest number of windings and lowest fill factor is best for motoring. Since EiP technology involves motoring and generating, the optimum formula for a given core size may be found through testing of the two best designs. The following table shows the various combinations of wire size that fit the exemplary C core legs, along with corresponding wire turns, fill factor, and total DCR.

TABLE 2-1

Wire Size and Fill Factor Combinations

| Wire Gauge and Type | # Turns per Leg | Fill Factor | DCR |
|---|---|---|---|
| #10 | 25 | .70 | .0294 Ω |
| #12 Square | 32 | .72 | .0560 Ω |
| #12 | 32 | .56 | .0672 Ω |
| #14 Square * | 60 | .85 | .150 Ω |
| #14 | 60 | .66 | .166 Ω |
| #16 ** | 96 | .66 | .404 Ω |
| #18 | 148 | .65 | 1.02 Ω |
| #20 *** | 205 | .62 | 2.6 Ω |

* Lowest DCR with highest fill factor.
** Highest winding number with lowest DCR.
*** Maximum windings for best MMF using this example core size

2.3.4 Radial Expansion

Figure 2F:
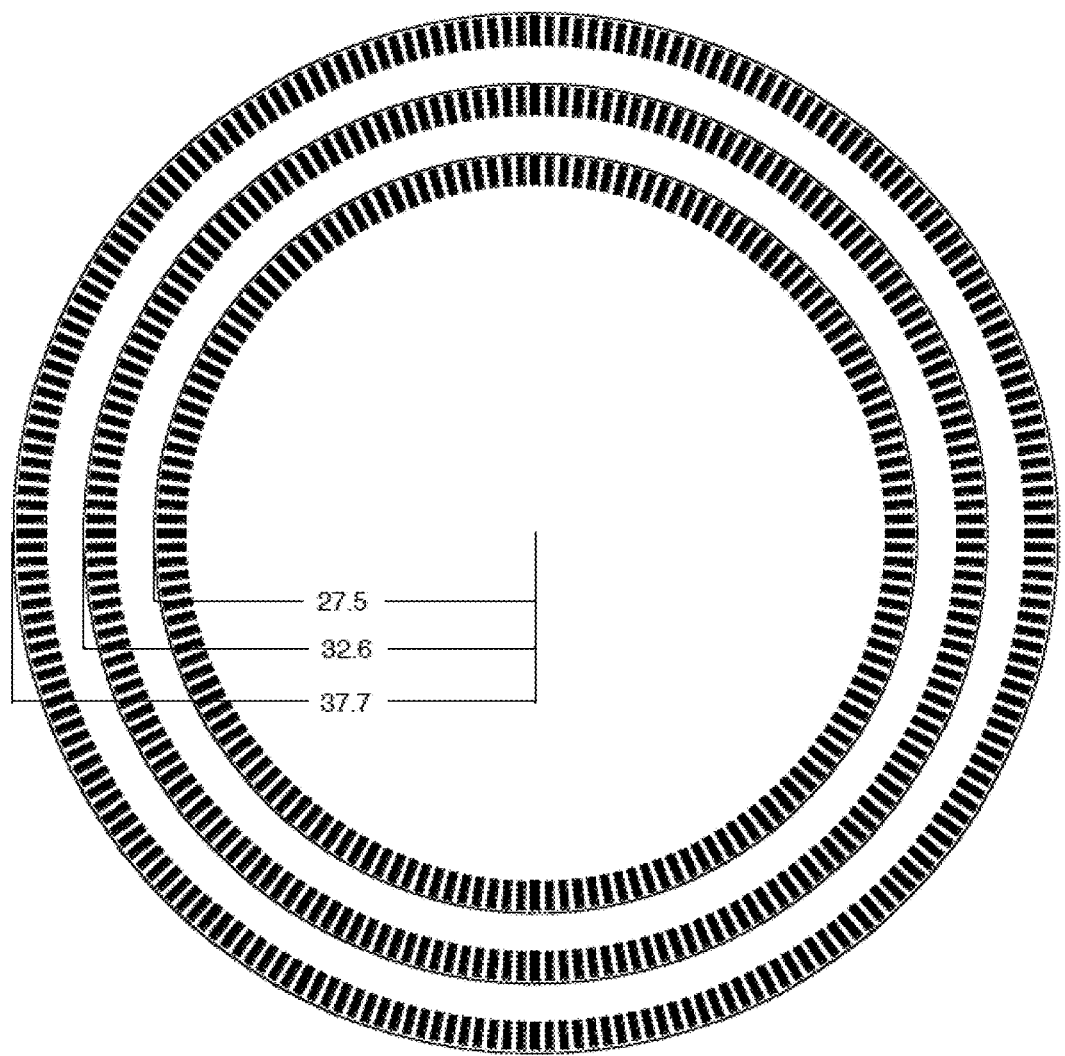
FIG. 2F shows a diagram of exemplary magnetic rotor expansion using identical magnets and pole pitch.

EiP wind machine optimizes the magnet and winding formula for one C core size, for a modular structure that can be replicated for a larger radius of magnetic rotor. The rotor is geometrically resized for more power, at certain increments that fit installed modules and wind swept area. For much larger wind rotors, or other applications, like an embedded motor vehicle wheel motor, or a powered propeller for a ship, the optimal magnet/inductor size may differ. Increasing the size of magnets and cores with machine radius is one way to increase electromagnetic power. But, losses from eddy currents in larger inductors present an upper limit to inductor size. Balancing all factors produces a set of components for a PMLSM with optimum power output. Smaller PMLSMs are replicated for radial expansion providing the most dramatic increase in total power. Once a PMLSM size has been chosen, simply using a longer magnetic track that fits more PMLSMs (e.g., minimum 4 means adding 32 magnets), expands the size and power of an EiP machine. This technique allows the creation of very large radius rotors. For the exemplary EiP wind machine shown in the exemplary figures, every integer multiple of 32 magnets expands the rotor radius by approximately five inches, accommodating four additional PMLSMs. The pole pitch remains constant for each configuration. Using this technique, EM torque matches mechanical torque as the radius expands, along with more magnetic poles to maintain synchronous operation at slower speed. FIG. 2F shows a diagram of exemplary magnetic rotor expansion using identical magnets and pole pitch, illustrating magnetic rotor expansion, for additional 32 magnets of the exemplary size.

2.3.5 Windzone Expansion

The wind swept area of the EiP windzone is a cylinder, of wind rotor radius and height. Increasing the radius provides the greater expansion of wind uptake and power generation vs. height increase, because the surface area of a cylinder expands exponentially with radius, and linearly with height. A larger radius windzone allows more room for electrical generation hardware, to balance the increase in mechanical torque. So, EiP wind machines tend to be wider than tall as size increases, which gives greater stability in turbulent winds.

Figure 2G:
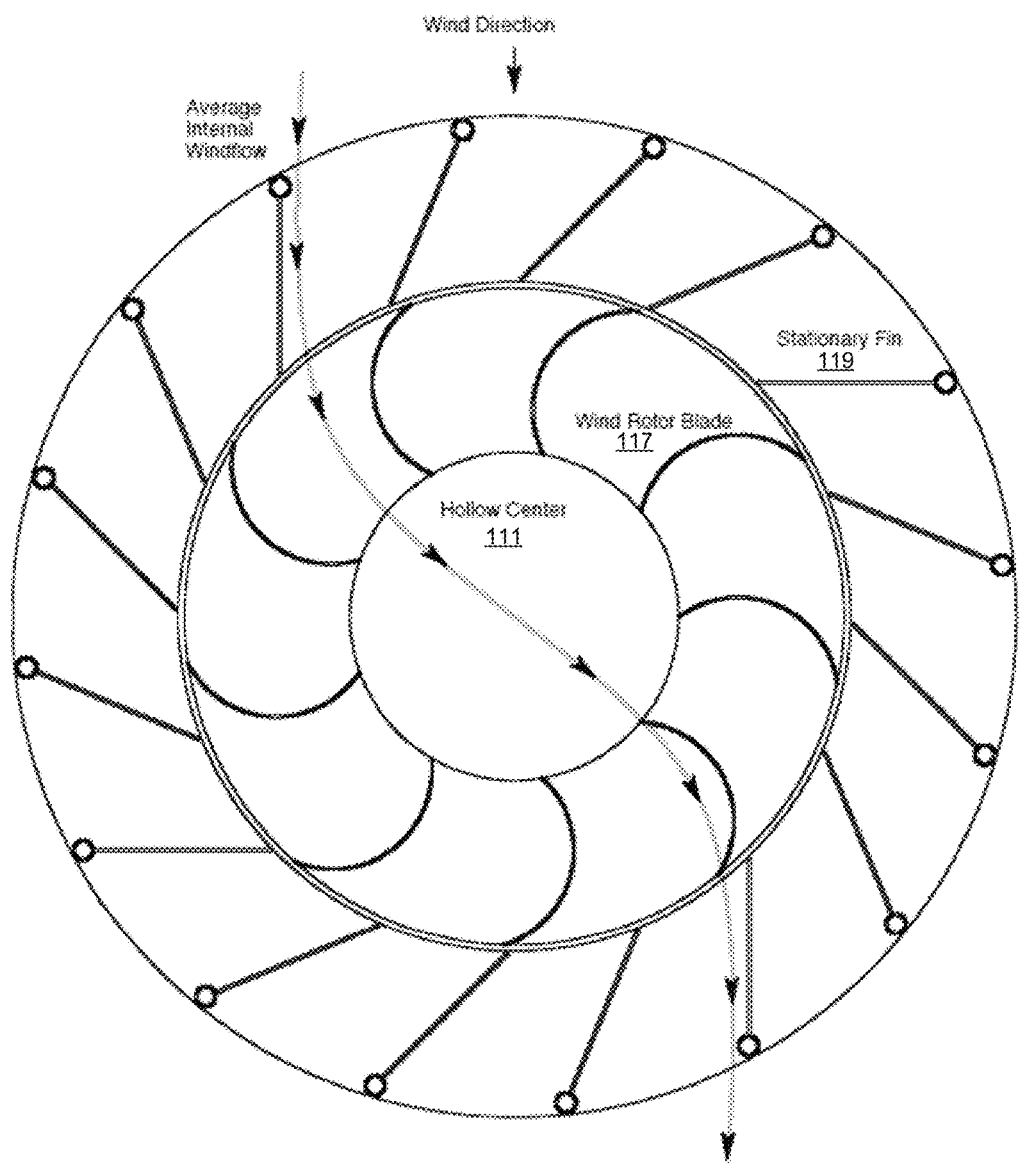
FIG. 2G shows a diagram of exemplary windzone blade, fin, and center proportions, and average internal windflow.

Some primary design rules can include the following: (1) support an even number of stationary fins on the outside, deflecting wind from all directions toward an odd number (slightly less than half) of wind blades on the rotor, (2) the radius is divided in thirds, ⅓rd stationary, ⅓rd rotating, ⅓rd hollow center. These relationships are maintained as the rotor radius expands, while the total number of blades increases. For example, even/odd stationary vs. rotating parts of the windzone is critical to prevent locking of the wind rotor in anisotropic flows. For example, the exemplary EiP wind machine has 16 stationary fins, and 9 rotor blades, with a 2 ft. wind rotor radius. This also enhances the uptake of energy from gusty and turbulent wind, by presenting a physical imbalance to chaotic conditions, which naturally creates smooth and steady rotor movement. For complete information about the windzone, including mechanical and aerodynamic operation, refer to Section 3. FIG. 2G shows a top view diagram of the exemplary windzone blade (e.g., wind rotor blade 117), fin (e.g., stationary fin 119), and center (e.g., the hollow center region 111), and an example of an average path of internal windflow in the EiP wind machine 100. As shown through the diagram of FIG. 2G, the proportional relationship between windblades, fins, and hollow center, which is maintained as the radius expands.

2.4 EiP Oscillation

The EiP oscillation is self-sustaining, representing all of combined electrical and kinetic energy in an EiP machine, where rotor speed and DC link voltage periodically rise and fall to maintain power balance. As rotor speed increases, either from reduced load or high wind, total energy potential increases. As the rotor decelerates under load, it is hypersensitized to sudden changes in wind speed that bolster energy uptake. When total energy is greater than load, rotor speed moves up and down under EiP oscillation, at fixed DC link voltage. EiP oscillation also applies to spontaneous networks of EiP wind machines, when storing and sharing power on the grid.

2.4.1 Van Der Pol Model

The EiP oscillation follows the Van Der Pol Model, where a parasitic oscillation draws in energy from the system in which it occurs. The Van Der Pol model is characterized by the following differential equation, Equation 2-2 which represents the Van Der Pol Differential Equation:

$$x''+x=\epsilon(1-x^2)x' \text{ for } \epsilon>0 \quad \text{(Eq. 2-2)}$$

Figure 2H:
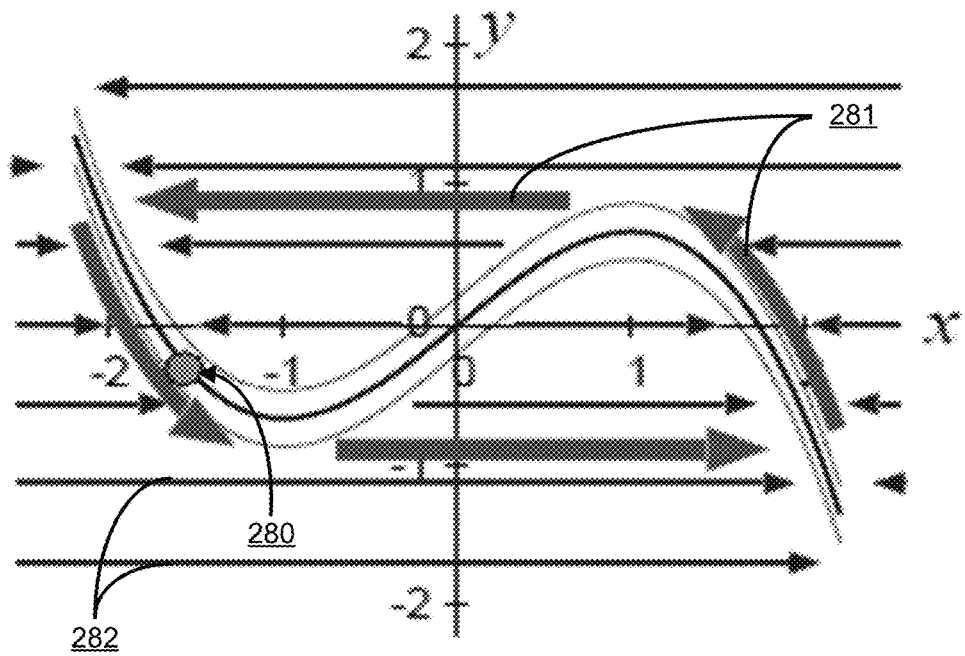
FIG. 2H shows a graphical diagram of exemplary Van Der Pol oscillation.

This equation produces one periodic solution: a relaxation oscillation with a stable limit cycle. In EiP technology, x represents a continuous function for EiP machine power, and $\epsilon$ corresponds to the period of oscillation. The period is locked to harmonics of rotor speed: at a dead stop, x equals zero and E is infinite. As rotor speed increases, x increases while $\epsilon$ decreases (but always >>one). When the non-linear term $\epsilon(1-x^2)$ x' reaches the singularity where the periodic solution to the equation is found (for a given $\epsilon$), an oscillation with a stable limit cycle occurs. The limit cycle is attracting toward the singularity, in this case drawing energy from the system in which it occurs. At rotor operating speeds (larger $\epsilon$) the single periodic solution to the Van Der Pol equation describes a relaxation oscillation that quickly jumps from a smooth curve to another and back again, as depicted in the following figure:

FIG. 2H shows a graphical diagram of exemplary Van Der Pol Oscillation. The figure shows the attractor for oscillation limit cycle, where the dot 280 follows the wide arrows 281 from the smooth curved part to the peak then quickly across to the start of a new half cycle. The thin arrows 282 indicate the proportions of energy drawn from the system in which the oscillation occurs.

2.4.2 Relaxation Oscillation Period

The Van Der Pol oscillation period T can be broken down into two parts: smooth and quick, as shown in the following equation, Equation 2-3 which represents the Van Der Pol Oscillation Period:

$$T=(3-2 \log 2)\epsilon+\eta(\epsilon^{-1/3})$$

Smooth+Quick  (Eq. 2-3)

In EiP technology, for example, the smooth part represents energy from wind and inertia, while the quick part represents power injected to maintain rotor speed. The period is locked to a harmonic of rotor magnetic transition speed. Since total energy is a function of time, the relative amount of injected power required is very small within a single cycle (e.g., linear log function vs. negative cubic exponential function). EiP technology maintains this relationship over the full range of rotor speeds (e.g., smaller $\epsilon$), where a greater portion of the oscillation period is powered by inertia as rotation speed increases.

2.4.3 Negative Resistance Oscillator

Figure 2I:
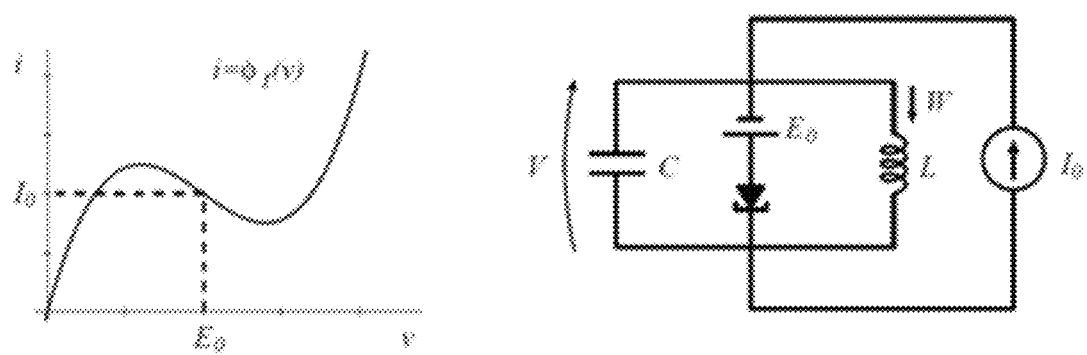
FIG. 2I shows a graph and a circuit diagram of an exemplary negative resistance oscillator.

For example, the Van Der Pol model was developed by observing the oscillations from an electronic circuit for the negative resistance oscillator, as shown in the FIG. 2I. FIG. 2I shows a graph and a circuit diagram of an exemplary negative resistance oscillator of the present technology. This circuit oscillates at a specific frequency based on L and C. At this frequency, the oscillation is self-sustaining and attracting. In the negative resistance oscillator, $E_0$ from the tunnel diode is drawn along with $I_0$ from the battery supply to power the oscillation. The capacitor and inductor store enough energy to power the quick part of the oscillation period.

2.4.4 EiP Oscillator

Figure 2J:
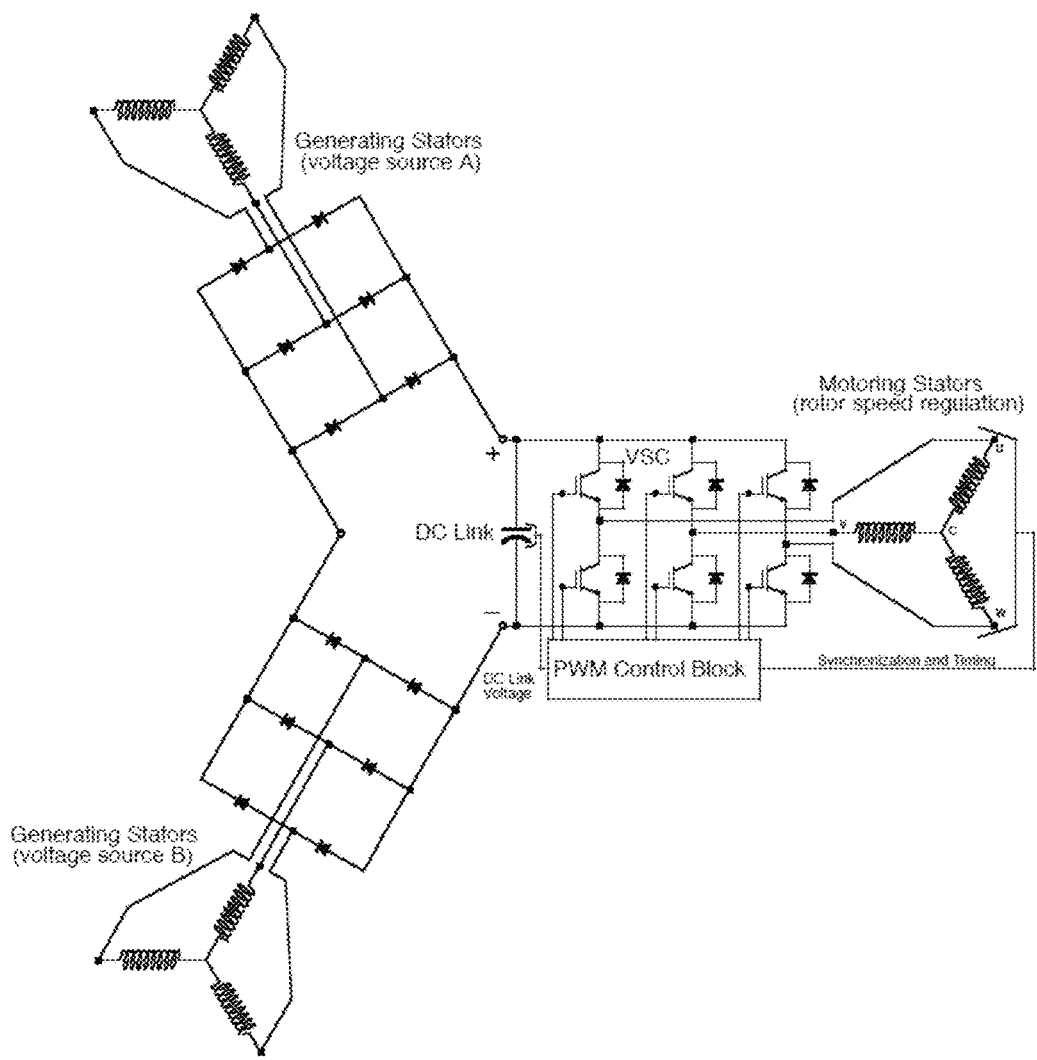
FIG. 2J shows a diagram of an exemplary minimal EiP oscillator.

The minimum amount of circuitry required for an EiP oscillator may be more complex, for example. FIG. 2J shows a diagram of an exemplary minimal EiP oscillator of the present technology.

Generating and motoring stator modules, operating around the magnetic track as three-phase PMLSMs, are combined in a certain configuration to create an EiP oscillator circuit. A minimum of two PMLSMs are configured in series with rectifiers on the DC link as a voltage source for a voltage sourced converter (VSC) in a motoring PMLSM, forcing the DC link capacitor to a voltage that is always higher than required by the motoring VSC when the rotor is spinning Rotor speed is reduced by loads on the DC link, offset by motoring to control speed and inertia. The EiP oscillation sustains the DC link, with net zero torque, along with a substantial amount of kinetic energy from accumulated rotor inertia as speed increases. Change in rotor speed represents energy potential equal to the electrical load offset by wind uptake. During EiP oscillation, periodic fluctuation in rotor speed at constant DC link voltage powers all connected loads along with the oscillation, drawing in energy from inertia, in a similar way to the Van Der Pol model. EiP oscillation continues indefinitely until rotor speed drops below a certain threshold. Section 4 of this patent document provides more information on the EiP oscillator and VSC architecture.

2.5 EiP Operating Modes

EiP technology includes three operating modes: coasting, motoring, or generating. Diode rectifier bridges attached to each stator produce a DC voltage that increases with rotor speed: with no load attached, the "coasting" operating mode. Parallel transistor switches control the rectifier as a VSC, to produce positive torque that speeds up the rotor: "motoring" mode. Negative electromagnetic torque from electrical loading slows the rotor: "generating" mode. A fourth operating mode is defined when parallel PMLSMs are motoring and generating: "oscillating" mode. EiP technology includes these operating modes to provide software a feedback mechanism for networking and fine-tuning of the system, as summarized in the following table.

TABLE 2-2

EiP PMLSM of Exemplary Operating Modes

| Mode | Definition | Indication |
| --- | --- | --- |
| 0 | Coasting | Voltage rises with rotor speed until motoring or generating. |
| 1 | Motoring | High instantaneous torque power for startup and speed regulation. |
| 2 | Generating | Power production when electrical loads produce negative torque. |
| 3 | Oscillating | One PMLSM motoring while two or more are generating, creating the conditions for EiP oscillation. |

2.5.1 EiP Mode Control

Each motoring PMLSM operates from a set of parameters, some for control, others for status. A central controller device globally initializes motor parameters on startup, then monitors status parameters to determine the operating mode. Running autonomously, and in parallel, PMLSM electronic control happens much faster than wind speed and load changes, so there is ample time to monitor operating modes and fine-tune parameters. Under heavy loading and higher rotor speed, for example, all PMLSMs are in generator mode, and slow the rotor. Under reduced load and absence of wind, for example, one PMLSM may switch to motoring to keep up rotor speed while another is generating. When an individual PMLSM controller encounters an exception to parameter settings, like rotor overspeed with no load, it will coast until normal limits are restored.

At a certain point, the balance of power lets EiP oscillation take control. The random interactions of all installed PMLSMs allow the EiP oscillation to naturally arise from chaotic and turbulent operating conditions, like any non-linear phenomenon. Once oscillating, the EiP machine has greater power potential, backed by the natural behaviors of parasitic oscillation described above.

To configure the EiP wind machine for greater power uptake, for example, more PMLSMs are dedicated to motoring. For installations with greater wind availability, only one PMLSM is used for motoring, while all others are dedicated to generating.

All motoring PMLSMs in an EiP wind machine can share a common network hardware connection, like RS485, for parameter configuration and monitoring. Remote monitoring software receives packets of data, with the operating mode as header along with other real-time information, e.g., voltage, current, temperature, etc. Over time, the configuration is fine tuned to obtain maximum energy from the installed location, using EiP operating mode packets.

2.5.2 Networked EiP Wind Machine Operating Modes

In an EiP wind machine spontaneous network, operating mode/status packets provide a way to synch up with other machines on a common grid segment. The EiP operating mode has a fractal quality, with self-similarity at the module, machine, and network levels. On the network, EiP modes indicate the following:

Mode 0—Coasting, or offline.
Mode 1—Motoring, accepting incoming grid power.
Mode 2—Generating, providing power for the grid.
Mode 3—Oscillating, indicating surplus stored power.

For more information refer to the "System Architecture" and "Programming" sections.

2.5.3 PMLSM Motor Parameters

Each PMLSM can be controlled like a rotary three-phase machine in a factory environment. For example, manufacturers of three-phase drives define a set of parameters for fine-tuning of machine operations. The first three parameters are determined from the size of inductors, with values calculated using coil formulas or by direct measurement. The motor nameplate frequency represents the nominal synchronous AC input frequency. PM pole pitch is the distance between pole pairs in the magnetic track. The motor force constant and PM flux linkage are calculated using the equations in the "Power Calculations" section (section 2.6) at the end of this section.

TABLE 2-3

Motor Parameters

| Symbol | Units | Parameter | Values |
|---|---|---|---|
| R | Ohm (Ω) | Phase resistance | 3.352 |
| $L_d$ | MilliHenry (mH) | d-axis inductance | |
| $L_q$ | mH | q-axis inductance | |
| F | Hz | Motor Nameplate Frequency | 60 Hz |
| V | AC Volts | Rated Voltage | 200 VAC |
| τ | Meter (m) | PM pole pitch | |
| K | No units | Motor force constant | |
| $\psi_{PM}$ | Weber (Wb) | PM flux linkage | |

Energy Balance Through Simple Speed and Voltage Regulation

Figure 2K:
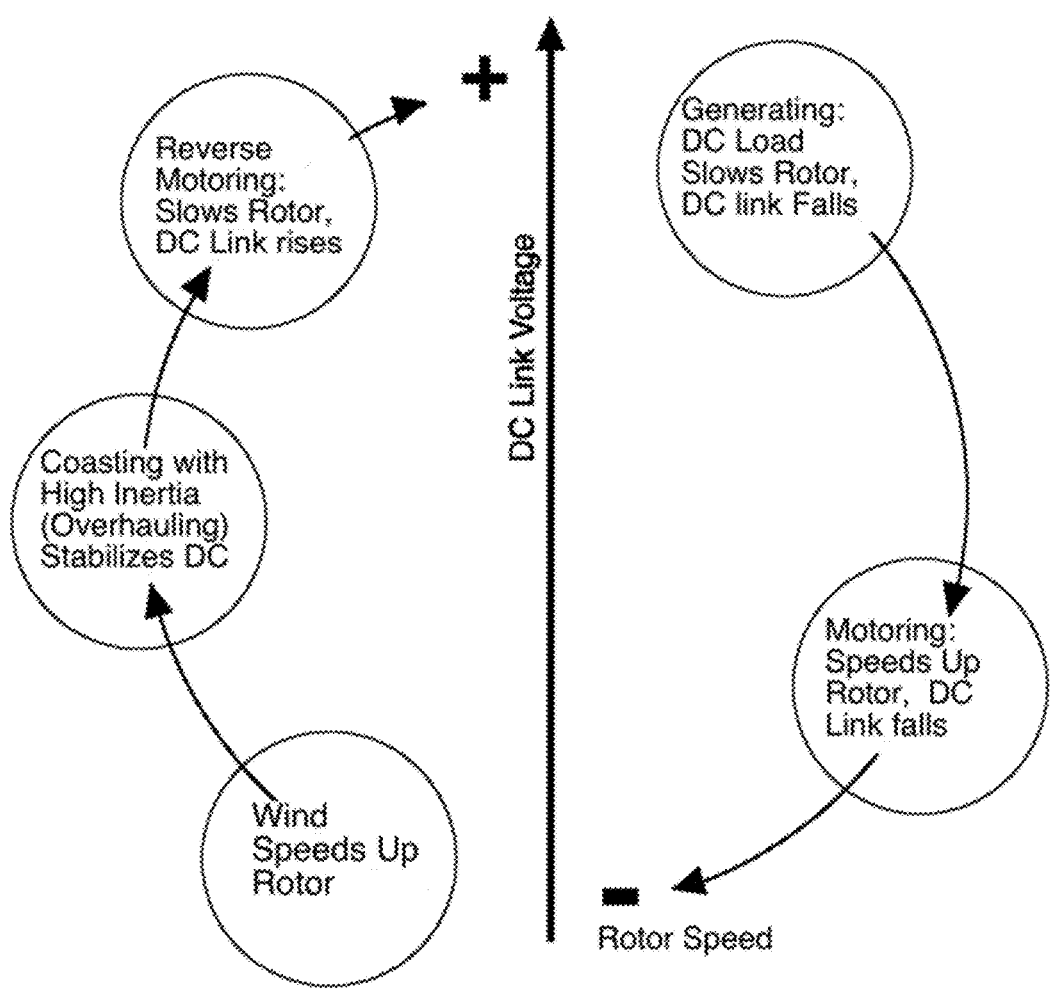
FIG. 2K shows a diagram of essential EiP energy imbalance.

Once up and spinning, the DC link voltage reaches a level where autonomous voltage and speed regulation in the motoring PMLSM takes hold. Rotor speed is regulated by the PMLSM, using forward and reverse motoring operations. Electrical loading of the DC link and wind uptake occurs at random moments, while motoring torque regulates rotor speed, to maintain the DC link voltage, as shown in FIG. 2K. FIG. 2K shows a diagram of essential EiP energy imbalance.

EiP technology actively manages the differential imbalance between wind energy uptake, excess inertia, and electrical load, through quick PMLSM motoring operations in response to changes in load and wind energy. As rotor speed increases from wind energy uptake and/or forward motoring, excess energy from "overhauling" builds up to a point where greater loading is required to lower the DC link voltage. In absence of load, PMLSM motoring maintains rotor speed (and inertia) while lowering the DC link voltage. Electrical loading on the DC link drops the voltage and decreases rotor speed, while nominal inertia tends to keep the rotor at speed. PMLSM regulation operations provide instant thrust force in both directions, managing rotor movement to keep the DC link at a constant level while delivering power to loads. When inertia plus wind energy is greater than electrical loading, DC link voltage can no longer be maintained, and the essential imbalance becomes chaotic, allowing the EiP oscillation to naturally manifest as periodic rotor speed and/or DC link voltage fluctuations through PMLSM motoring operations powered by overhaul.

Section 4: Exemplary Electronic Hardware Specification provides more information on the principles of operation for EiP electronics to regulate power and rotor speed.

2.6 Power Calculations

EiP technology generates power from rotational inertia; the entire weight of the rotor, plus wind force, is the energy source. This subsection provides equations for determining total power of an EiP wind machine: from inertial, electromagnetic, and wind sources.

2.6.1 Rotational Inertia

The EiP machine magnetic rotor is a flywheel where the stored energy equals the sum of kinetic energy of individual mass elements, which can be calculated using the following equation, Equation 2-4 (Magnetic Rotor Kinetic Energy Equation):

$$KE_R = \tfrac{1}{2} I_R \omega^2 \quad \text{(Eq. 2-4)}$$

where:

IR=Magnetic rotor moment of inertia, which is the ability to resist changes in rotational velocity, in this case, to maintain rotor speed under sudden changes in electrical loading.

ω=Rotational velocity (rpm) of the rotor.

The magnetic rotor element is basically a hollow cylinder of uniform density with thick walls, for which the moment of inertia can be calculated using the following equation, Equation 2-5 (Magnetic Rotor Moment of Inertia Equation):

$$I_R = \tfrac{1}{2} m (r_1^2 + r_1^2) \quad \text{(Eq. 2-5)}$$

where:

m=Rotor mass in Kg
$r_1$=Inner rotor radius
$r_2$=Outer rotor radius

However, the magnetic rotor element is actually formed in three layers, one of which is of different density. For a precise determination of the moment of inertia from the density of materials, use the following equation, Equation 2-6 (Magnetic Rotor Layer Moment of Inertia Equation):

$$I_L = \tfrac{1}{2} \pi \rho h (r_2^4 - r_1^4) \quad \text{(Eq. 2-6)}$$

where:

ρ=Rotor layer material density in Kg/m³
h=Rotor layer thickness in meters

The entire rotor inertia is the sum of the inertias for each layer, plus instantaneous wind force. Note that as the radius increases, inertia exponentially increases. Traditional flywheels for energy storage and production operate using a small radius with low moment of inertia that spins at extreme speeds. Unlike high-speed flywheels, the EiP machine leverages a large radius and high moment of inertia, which operates only at slow speed. In both cases, total energy storage increases with the square of angular velocity. In the EiP flywheel, high inertia means that even though it spins slowly, peak power output is naturally enhanced although storage time is less. EiP technology leverages instant power from high inertia for increased total energy storage through electronic oscillation.

2.6.2 Inertial Power in EiP Oscillation

Power from inertia builds up as rotor speed increases. The speed change represents a certain amount of power, as shown in the following equation, Equation 2-7 (Total Inertial Power Equation):

$$W = I_R (\Delta rpm \, 2\pi/60)^2 \quad \text{(Eq. 2-7)}$$

where:

W=Power in Watt-seconds $I_R$=Rotor inertia in Kgm$^2$

Δrpm=change in angular velocity, as the rotor slows down under load or increases with wind energy uptake.

The power recovered from inertia is equal to the downward change in rotor speed under electrical load. If the rotor is allowed to slow all the way down, the total power capacity in the rotor is recovered. In the EiP wind machine, the speed is allowed to oscillate up and down, constantly storing and withdrawing inertial power to maintain DC link voltage. As winds and electrical loads fluctuate wildly, the rotor slowly speeds up and slows down at a frequency determined by parameter settings for each installed PMLSM. The EiP oscillation amplitude (peak power) corresponds to twice Δrpm, representing the power in both directions.

2.6.3 Energy Stored in Magnetic Fields

Electromagnetic power in the EiP machine comes from rotor magnetic fields, concentrated by C cores through an air gap, which abruptly pass through copper windings, freeing electrons and inducing current in the coil. As the speed of flux transitions increases, the greater the current density. From the permanent magnets embedded in the rotor, the lines of flux do not weaken over time because of the large amount energy that creates them, as shown by the following equation, Equation 2-8 (Magnetic Field Power Equation):

$$W_v = B^2/2\mu \qquad (Eq. 2-8)$$

where:

$W_v$=Power stored in magnetic flux

μ=Permeability of the magnetic gap and C core

B=Flux density of one rotor magnet

For example, for each rotor magnet, the flux density of NdFeB and high permeability C core produce high energy magnetic fields. Multiplied by the number of magnets in the rotor, total flux reveals a tremendous amount of energy potential, which explains why motoring PMLSMs produce a large electromagnetic torque response from a relatively small input.

2.6.4 Electromagnetic Power and Torque

The mathematical model of each PMLSM is based on equations describing stator voltage, flux linkage, power, and thrust force (torque). Each PMLSM is treated like a rotating four-pole three-phase synchronous machine. The electromagnetic torque and flux linkage of each PMLSM adds up for total power. The model follows the direct-quadrature (d-q) axis convention, using rotor magnetic fields as the rotating frame of reference. When using the d-q frame, the model becomes much simpler, and standard DTC techniques for a rotating machine work perfectly with the linear implementation. Essentially the d-q frame represents the conversion of three phases to two, using only simple equations for flux linkage vs. magnetic frequency.

2.6.4.1 Stator Voltage Calculations

Total power from an EiP machine is the sum the power for each PMLSM. Unregulated stator voltage increases with rotor speed along with total power, calculated using the following equations, Equation 2-9 (d-q Frame Stator Voltage Equations):

$$u_d(t) = Ri_d + d\psi_d/dt - \omega\omega_q$$

$$u_q(t) = Ri_q + d\omega_q/dt - \omega\psi_d$$

$$P_{in} = 3/2(u_d i_d + u_q i_q) \qquad (Eq. 2-9)$$

where R is the wire resistance of stator windings, $i_n$ is the stator current vector, ω is the AC frequency, and $\psi_n$ is the flux linkage vector.

2.6.4.2 Flux Linkage Calculations

Power is transferred between mechanical and electrical domains by interlocked lines of magnetic flux from permanent magnets and copper inductors wrapped around magnetic steel. Flux linkage on d and q axes is calculated using the following equations, Equation 2-10 (d-q frame Flux Linkage Equation):

$$\psi_d = L_d i_d + \psi_{PM}$$

$$\psi_q = L_q i_q \qquad (Eq. 2-10)$$

where $L_n$ is the stator inductance and $\psi_{PM}$ is the permanent magnet flux linkage.

2.6.4.3 Electromagnetic Power and Thrust Force Calculations

EM power represents how much power the EiP machine can generate in response to mechanical power from the wind rotor. Thrust force is the linear equivalent of instantaneous torque in a rotating machine. From the flux linkage and stator voltage values, EM power and thrust force can be calculated for each PMLSM using the following equations, Equation 2-11 (Three-phase Power and Thrust Equations):

$$P_{EM} = 3/2\ \omega[\psi_{PM} + (L_d - L_q)i_d]i_q$$

$$F_{Thrust} = 3/2\ \pi/\tau[\psi_{PM} + (L_d - L_q)i_d]i_q \qquad (Eq. 2-11)$$

where τ is the PM pole pitch, which is the physical distance between pairs of axially polarized permanent magnets on the magnetic track. In the EiP machine PMLSMs operate in sync with each other around the rotor to form one large machine with the sum of power and thrust.

2.6.5 Wind Power Potential

Wind power potential for any wind machine is shown by the power curve, which indicates mechanical power over the range of wind speeds. Mechanical power (in Watts per square meter) is calculated using the following equation, Equation 2-12 (Mechanical Wind Power):

$$P_M = \frac{1}{2}\rho C_P A\ U^3 \qquad (Eq. 2-12)$$

where ρ is the density of air at altitude and temperature (1.225 Kg/m$^3$ typical), $C_P$ is the power coefficient (ratio of wind power potential to actual power produced), A is the total wind swept area, which in the EiP wind machine equals the surface area of a cylinder of radius and height equal to that of the wind rotor. U is the wind speed in meters per second. Mapping of $P_M$ over a range of wind speeds produces the power curve for the wind machine.

Mechanical power from a standard propeller-type wind rotor suffers under turbulent flow, not because of a lack of wind energy. Sudden wind gusts have massive power, which disrupts laminar windflow. Wind power is degraded because it is computed as energy over time. A strong gust can also dismember propeller blades. The EiP wind machine creates its own laminar flow to enhance energy uptake from sudden changes in wind speed. Also it directs windflow from all directions toward rotor motion, and the rotor has high solidity that tolerates wind gusts. Under direct control, thrust force from sudden wind gusts is converted to useful power, and directed toward regulation of rotor speed. Rotor speed represents total power potential, reflecting total inertia plus wind torque. EiP technology specifies the electronic control architecture for wind rotor speed, which enhances the uptake of instantaneous wind energy from wind gusts, storing energy temporarily as rotational inertia for maximum power utilization. In this way the EiP wind machine uses what would normally be categorized as useless turbulence. Using statistical methods for turbulence modeling with respect to aerodynamic design, a scaling factor effectively increases $C_P$ for the EiP wind machine beyond normal limits.

EiP technology drives the wind rotor as a regulation mechanism. When the rotor is spinning faster than laminar windflow, the EiP wind machine aerodynamic design leverages the Magnus effect (lift produced by rotating cylinder in free air) to improve the power coefficient. The Kutta-Joukowski theorem provides a way to quantify lift per unit length of the cylinder produced by the Magnus effect, as shown in the following equation, Equation 2-13 (Lift Produced By Rotating Cylinder (Magnus Effect)):

$$L = \rho 2\pi \omega r^2 V \qquad \text{(Eq. 2-13)}$$

where $\omega$ is the angular velocity of rotation, r is the wind rotor radius, and V is the speed of windflow around the cylinder.

In fast winds, the EiP wind machine rotor is self-limiting. As the wind speed in the forward direction approaches the wind drag in the opposite direction, acceleration slows to zero and the rotor stalls at a certain speed while delivering full power.

For more information on EiP wind machine aerodynamics, refer to the next section.

2.6.6 Mechanical vs. Electromagnetic Torque

On all other wind machines the central shaft restricts instantaneous torque applied to the generator; only a fraction of total torque is allowed before twisting or breaking the shaft. In the EiP wind machine, mechanical torque is unlimited by a central shaft, so the transformation to electromagnetic torque is one to one. This means that all rotor torque can be converted to electric power, where positive mechanical torque from wind thrust force is offset by negative electromagnetic torque from PMLSM thrust force. The following equations show the thrust force that can be generated by the wind rotor and PMLSM (Equation 2-14. Wind vs. Three-phase Thrust Force Equations):

$$F_{Wind\ Thrust} = 1/2\ \rho A\ V^2 \qquad \text{(Eq. 2-14, 1)}$$

where:
A=wind swept area=cylinder of wind rotor radius R
V=wind speed
$\rho$=density of air $$F_{3\text{-phase}\ Thrust} = 3/2\ \pi/\tau [\psi_{PM} + (L_d - L_q)i_d] i_q \qquad \text{(Eq. 2-14, 2)}$$

where:
$\tau$ is the PM pole pitch
$L_n$ is the stator inductance
$\omega_{PM}$ is permanent magnet flux linkage
$i_n$ is the stator current These forces, exerted on the wind rotor radius R, define the torque exerted and directly converted to power.

3 Mechanical and Aerodynamic Specification

This section provides mechanical specifications for example EiP wind machine components, and describes a new aerodynamics design for direct windpower generation made possible by the disclosed EiP technology. The mechanical design follows these principles:

Strength, fault tolerance, and reliability, in all types of weather and turbulence.

Buildable, using basic fabrication techniques and common raw materials.

Modular, expandable, supporting quick field service and upgrades.

The EiP wind machine is inspired by the ancient Persian gristmill, featuring a moving part and a stationary one, delivering wind power directly to the point of use. The moving part was a heavy slow moving grinding rotor, roughly an annulus with a central pivot, powered by a ring of sails rigged around the circumference (plus oxen for backup). The stationary part was an immovable grinding surface on the ground that matches rotor circumference. The rotor was kept in constant motion to maintain inertia, accepting grain and returning grist. This was an early example of a vertical axis wind machine with an impulse rotor and open center between the sails, where wind power is converted at the radius to useful purposes.

Half of the time the rotor moves in opposition to the wind, greatly reducing efficiency, so a wall was placed nearby to block opposing winds: creating the "Panemone" type of wind machine. Many since ancient times have been created, and EiP technology creates the first Panemone suitable for direct power generation.

The EiP wind machine generates electric power directly from wind, even turbulent and chaotic, near where power is consumed. The sails are made of sheet aluminum fabricated into a wind rotor. The wind rotor assembly sits atop an aluminum annulus with embedded magnets around the circumference: the magnetic rotor. Rather than erecting a wall, the wind rotor operates inside a sturdy exterior structure containing vertical fins, each oriented at equal angles with respect to the cylindrical wind rotor swept surface. Instead of oxen for backup, inertia plus a little grid power keeps the rotor in constant motion, even when wind is lacking. Rotor motion creates lift effects along each wind blade, and inertia increasing dramatically with small speed changes, conducting turbulent airflow toward the hollow center, for aerodynamic wind efficiency beyond conventional limits.

This section specifies the mechanical design for some example embodiments by providing detailed descriptions of each part. Then, windzone aerodynamics is analyzed, followed by a brief discussion of thermal issues. First, an overview of the mechanical design is presented.

The descriptions and diagrams are based on the exemplary specifications of the exemplary embodiment of the EiP wind machine shown in the figures and described herein, e.g., which represents a minimal size of an example EiP wind machine. EiP technology is readily expandable to much greater size and power.

3.1 Mechanical Overview

The exemplary EiP wind machine described in this section has two mechanical parts: one moving and one stationary.

The moving part is the wind rotor, with an odd number of third-cylindrical blades around a common radius sandwiched between two annular rings, atop a magnetic rotor containing multiple oppositely polarized magnets (e.g., NdFeB bar magnets), laid out as a magnetic track near the outer circumference.

The stationary part is a ring containing an even number of reinforced fins sandwiched between two annular rings, a protective structure that supports stators above and below the magnetic rotor, deflecting wind from all directions toward the wind rotor, with roller bearings for support.

For strength, the leading edge of each fin is welded to a section of aluminum pipe. Frame elements for inductor support rings made of stainless steel, insert into pipe ends. The combination of steel and aluminum provides a sturdy base for the EiP wind machine, which attaches to a mounting platform on the rooftop.

Figure 3A:
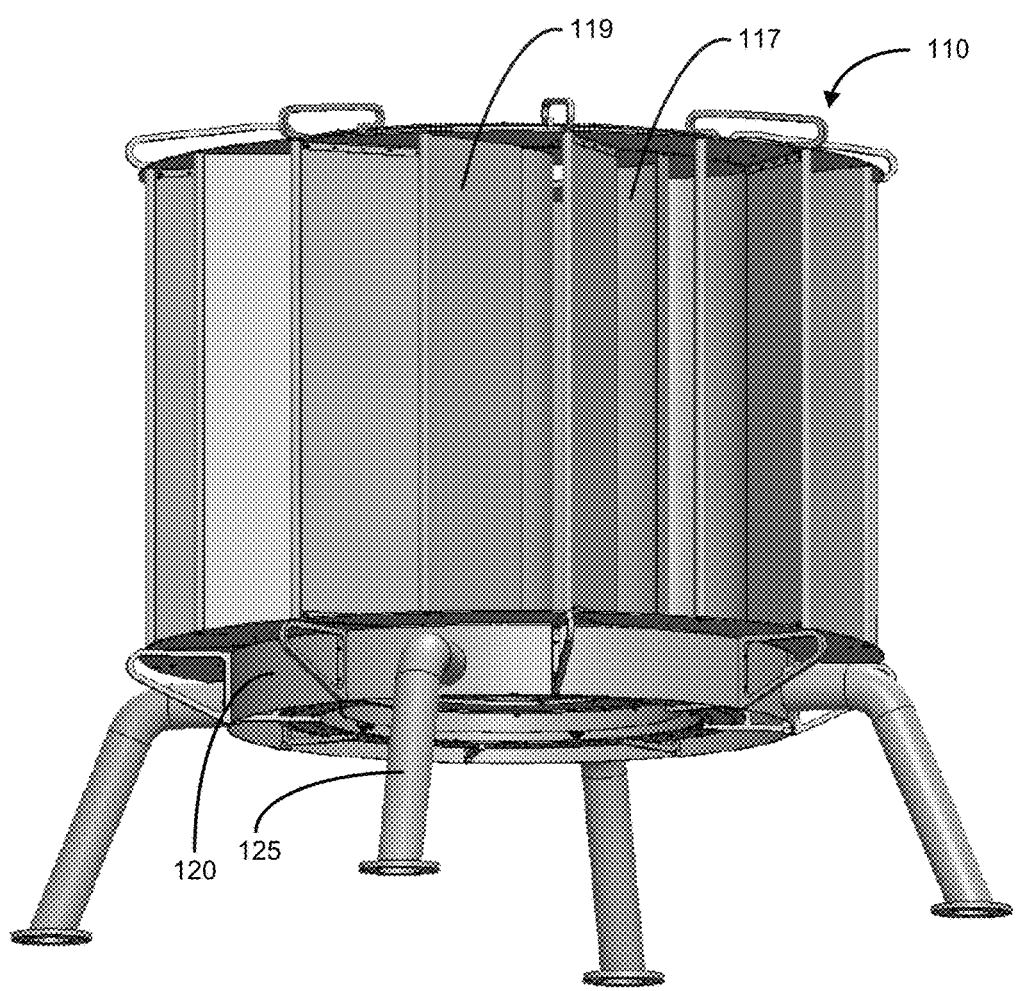
FIG. 3A shows a diagram providing the mechanical overview of an exemplary EiP wind machine.

FIG. 3A shows a diagram depicting an exemplary EiP wind machine device. The diagram of FIG. 3A shows the exemplary EiP machine including the electronic inertial power generation unit 110 supported on a base (e.g., support base 120) and multiple legs (e.g., four support legs 125). The exemplary EiP wind machine device includes an electronic inertial power generation unit with rotor mass enhancement, upon which the windzone is installed, as depicted in the diagram of FIG. 3B.

3.2 EiP Machine Mechanical Design

In the previous section, the principles of operation for the EiP machine was presented. This section defines the mechanical design, which integrates mechanical support for the rotating and stationary parts of the windzone with power generation. The wind rotor attaches to the magnetic rotor, while stainless steel struts and rings form a sturdy frame for inductors, magnetic rotor, and bearings, supported by the stationary part. Two large rings position stator pairs above and below the magnetic rotor. The center of the EiP wind machine is hollow, since the EiP machine has no drive shaft. The hollow center provides a clear path for wind to exit the turbine, for high wind power efficiency. The fault-tolerant mechanical design eliminates the centralized generator and main bearing, insuring continued power generation in stormy conditions, where grid power is likely to fail. The following figure shows a cross section of the EiP machine.

Figure 3B:
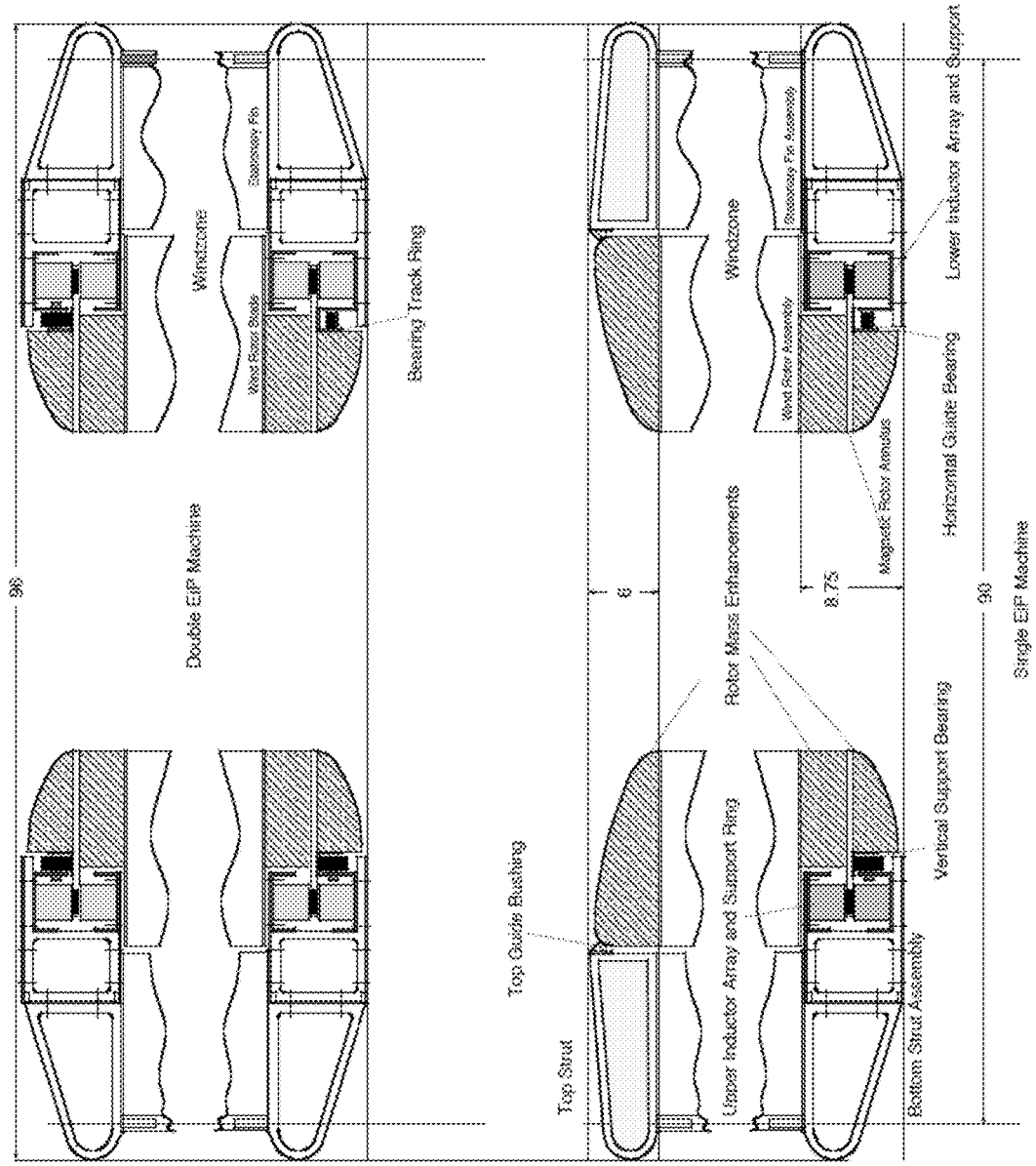
FIG. 3B shows a schematic diagram depicting the exemplary EiP machine cross section, showing single- and double-sided configurations, and rotor mass enhancements.

FIG. 3B shows a schematic cross section of two exemplary EiP machines. Single-sided is the standard implementation. Another EiP machine on top delivers twice the power, which is appropriate for locations with very high winds requiring high voltage DC operation (like an offshore array).

The diagram of FIG. 3B shows exemplary components of the exemplary EiP wind machine, including: rotor blades, stationary fins, magnetic rotor annulus, support bearings (vertical and side), inductor support rings (upper and lower), and frame struts. The blades and fins represent the modular windzone, struts and bearings maintain the magnetic gap between the magnetic rotor and upper/lower inductors, and provide frame elements that strengthen the windzone by inserting into fin pipes. Also shown are areas where rotor mass can be enhanced by adding rings of cast material (e.g., acrylic resin), with the layer between magnetic rotor annulus and wind rotor providing a large bushing for rotor clearance over the machine base.

As shown in the diagram by the example two EiP wind machine system, two large rings, pre-drilled with mounting hole patterns for inductors, hold installed stator pairs in perfect alignment above and below the magnetic rotor. The upper ring bolts to the windzone and struts, the lower ring bolts to struts bolted to the windzone. The base of each ring can be laser cut from a sheet of stainless steel, with evenly spaced sites for inductors all the way round. A bent steel plate welded around the circumference supports the ring edges. The inner edge is pre-cut with holes for roller bearings, e.g., cam followers or bracketed rollers. For example, struts can be laser cut from ¾" stainless stock for added strength, to maintain the magnetic gap.

The exemplary EiP machine attaches to the bottom of the windzone, using the large aluminum structure as a heat sink and for protection. As wind speed increases, electrical power increases along with the cooling effect of airflow. This allows the EiP wind machine to maintain high power operation in high winds, with a linear power curve.

Additional description in this section provides mechanical details for example parts of the exemplary EiP machine, and how they fit together.

3.2.1 Inductor and Bearing Support Ring

Figure 3C:
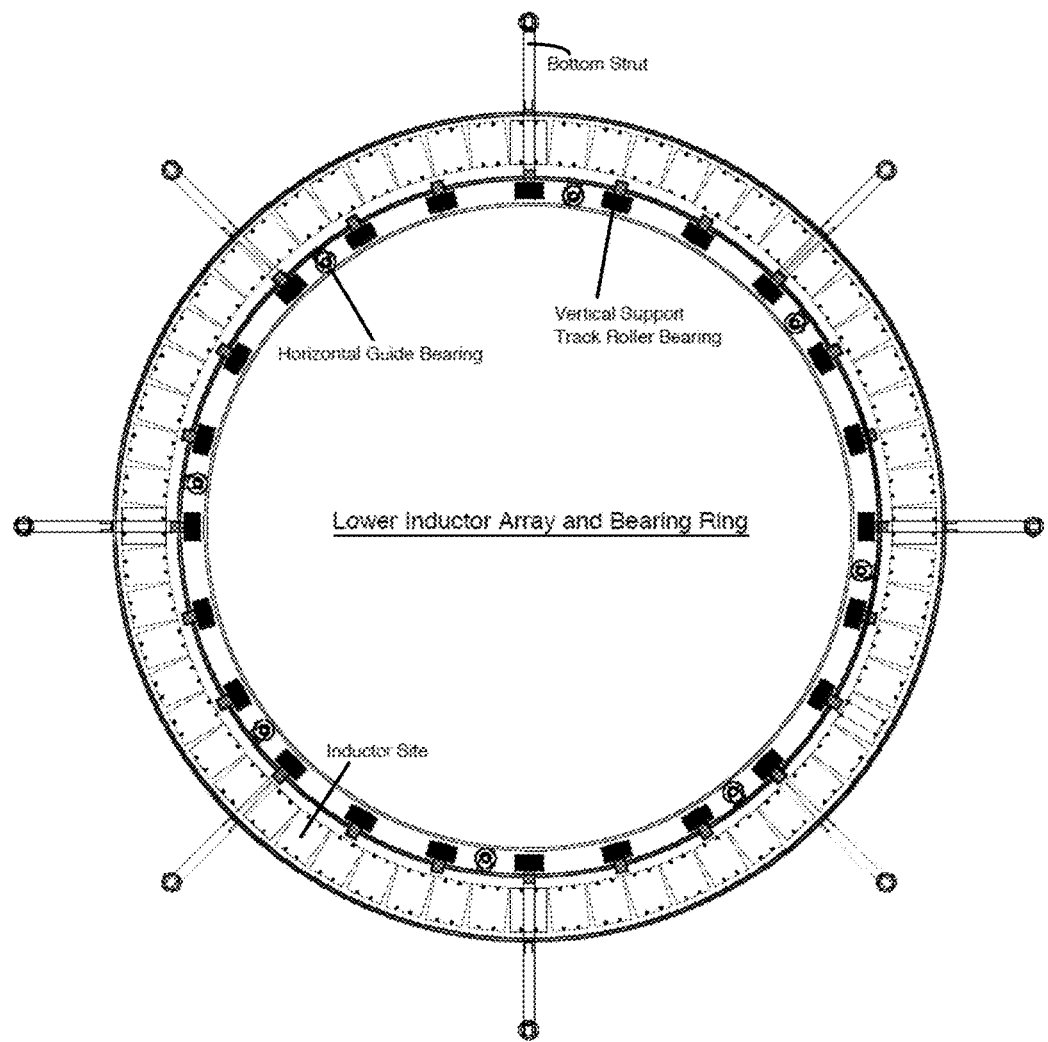
FIG. 3C shows a diagram depicting the exemplary EiP machine inductor and bearing support ring.

The lower inductor ring also supports rollers for rotor guidance. Vertical support rollers (e.g., 24 in exemplary machine) maintain the lower magnetic gap. Several rollers are conductive for grounding of rotor harmonics. The maintenance-free urethane rollers provide quiet operation. The number of bearings is redundant so that in case of failure continued operation is possible until scheduled maintenance where field replacement is possible. A minimum of four additional rollers control side-to-side movement. For example, it is noted that once the rotor is spinning in high winds, the viscosity of airflow between stationary and rotating parts takes over rotor support, while magnetic attraction between magnets and steel cores guides side-to-side motion. This eliminates vibration and wear on rollers, extending useful life and eliminating the possibility of catastrophic failure in high winds. FIG. 3C shows a diagram depicting the exemplary EiP machine inductor and bearing support ring.

3.2.2 Bearing Track Ring

Figure 3D:
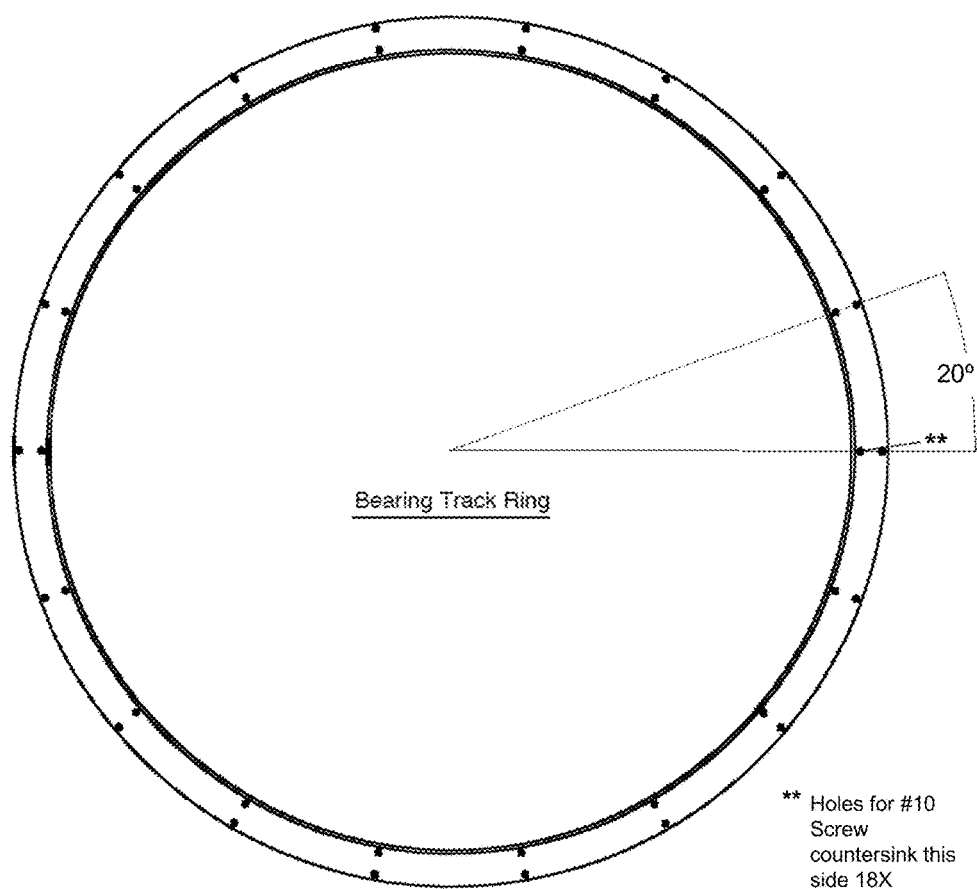
FIG. 3D shows a diagram depicting the exemplary EiP machine bearing track ring.

On the bottom side of the magnetic rotor is a ring that provides vertical and horizontal guidance for roller bearings. Since the magnetic rotor is of annular shape, it can warp when exposed to cross-quadrant magnetic forces. So, this ring also acts as a stiffener for the rotor with respect to magnetic steel stator core attraction. Holes for bolting the track below and wind rotor above are provided, in a pattern that does not collide with windblade ends. FIG. 3D shows a diagram depicting the exemplary EiP machine bearing track ring, e.g., the rotor underside view of the track ring.

3.2.3 Ring, Bearing, and Strut Details

Figure 3E:
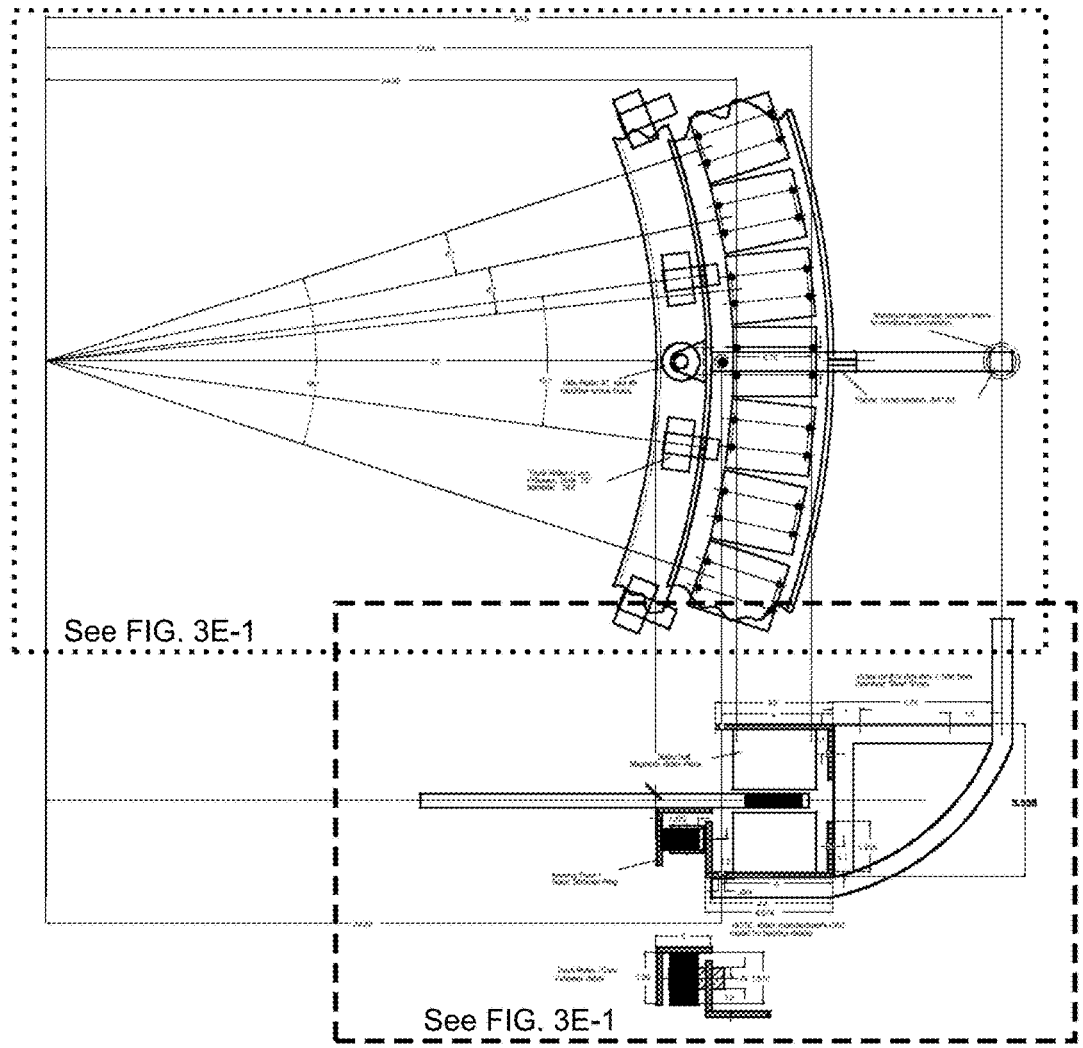
FIG. 3E shows a diagram further depicting the exemplary EiP machine inductor/bearing ring and strut details.
Figure 3F:
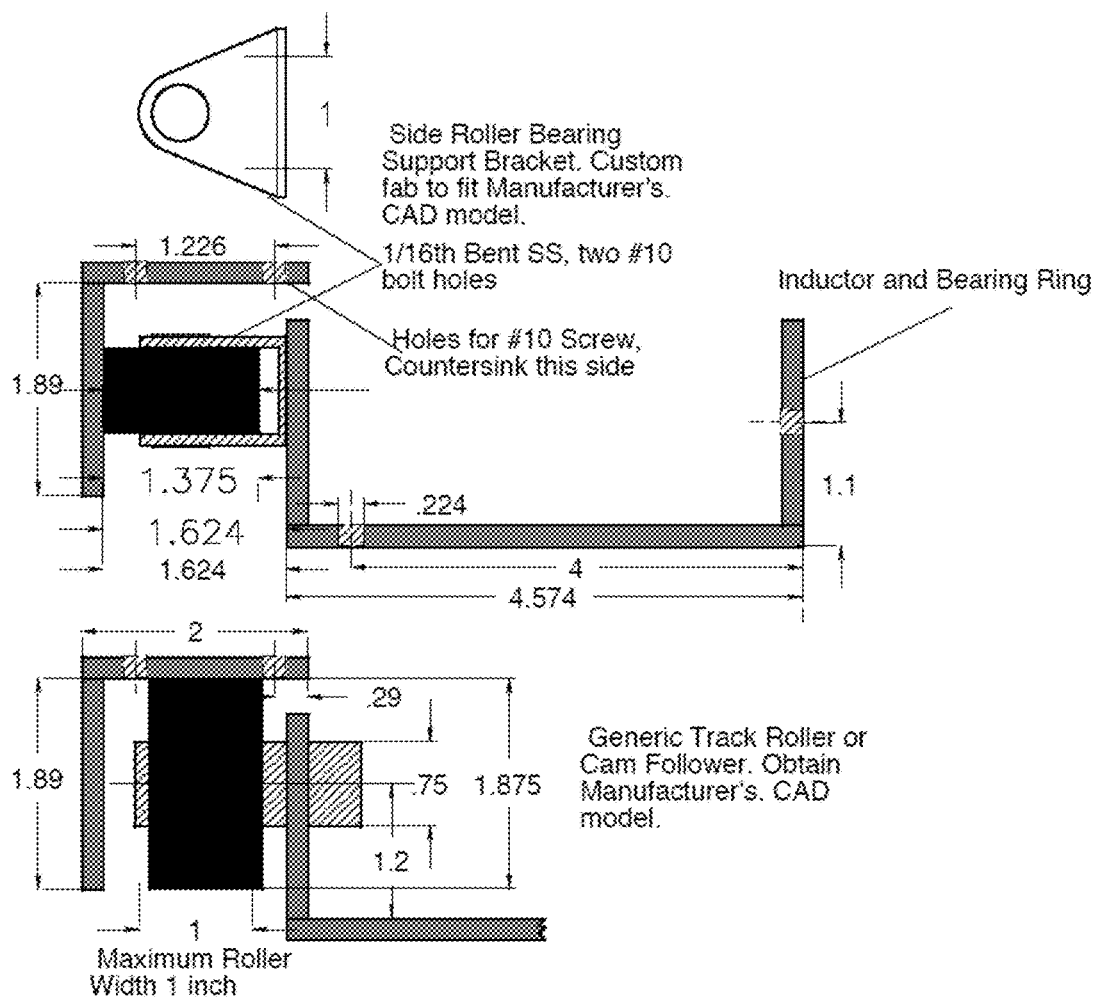
FIG. 3F shows a diagram further depicting the exemplary bearing details.

On the windzone side of the rotor is a ring that reflects the bearing ring, e.g., supporting only inductors. This ring attaches to the frame struts which attach to the windzone. In combination with the bearing ring and struts, the full EiP magnetic circuit and gaps is maintained. The rings, struts, bearings and rotor are assembled as shown in the detailed diagram below. FIG. 3E shows a schematic diagram depicting the exemplary EiP machine inductor/bearing ring and strut details. The upper portion of FIG. 3E, shown in FIG. 3E-1, shows a top down view of the ring, bearing, and strut features, including example dimension sizes of these features for an exemplary embodiment of the EiP wind machine. The lower portion of FIG. 3E, shown in FIG. 3E-2, shows a side view of the support base features and the ring and bearings features, including example dimension sizes of these features for an exemplary embodiment of the EiP wind machine. From this design, OEM roller bearings can be selected to fit the specifications shown in the following figure. FIG. 3F shows a schematic diagram depicting the exemplary bearing details, e.g., containing detailed cross sections of rings and bearings and including dimension sizes.

3.2.4 Magnetic Rotor Assembly

Figure 3G:
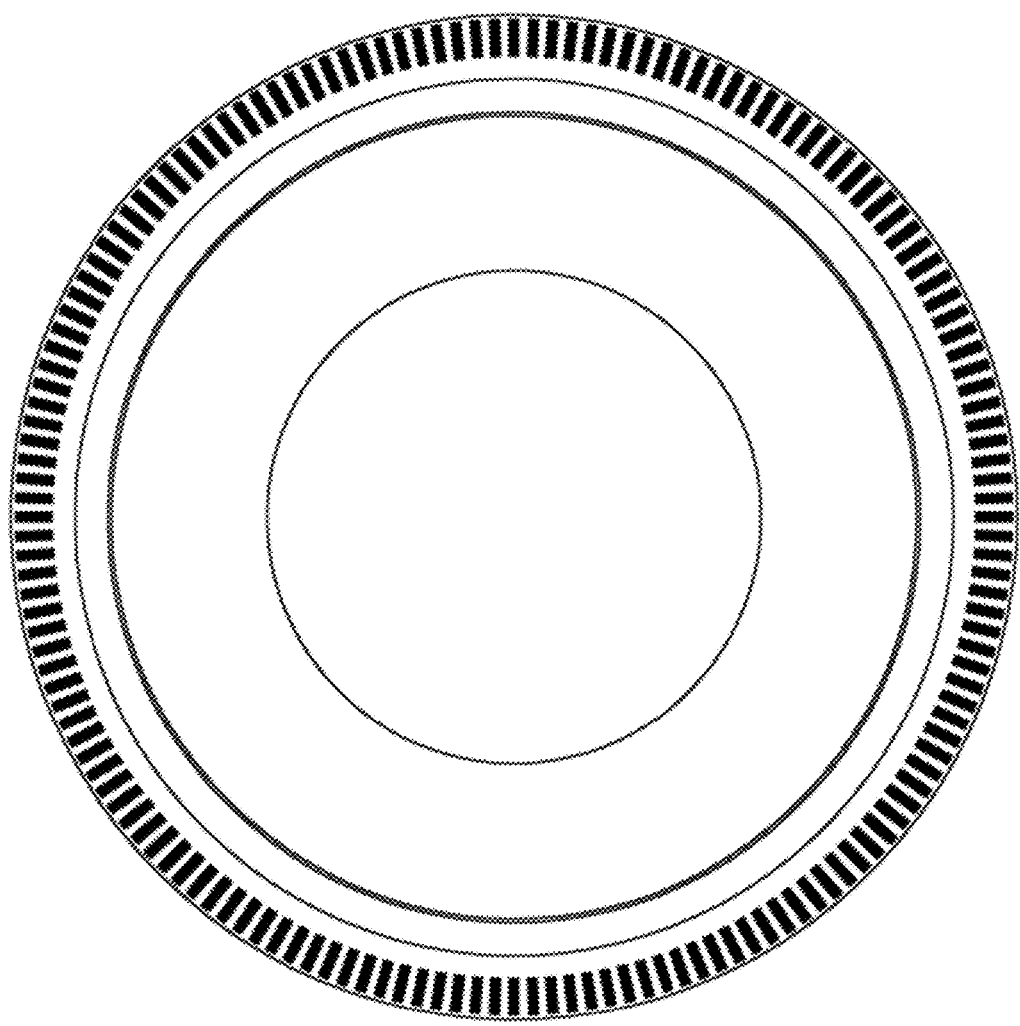
FIG. 3G shows a diagram depicting the exemplary EiP machine magnetic rotor.
Figure 3H:
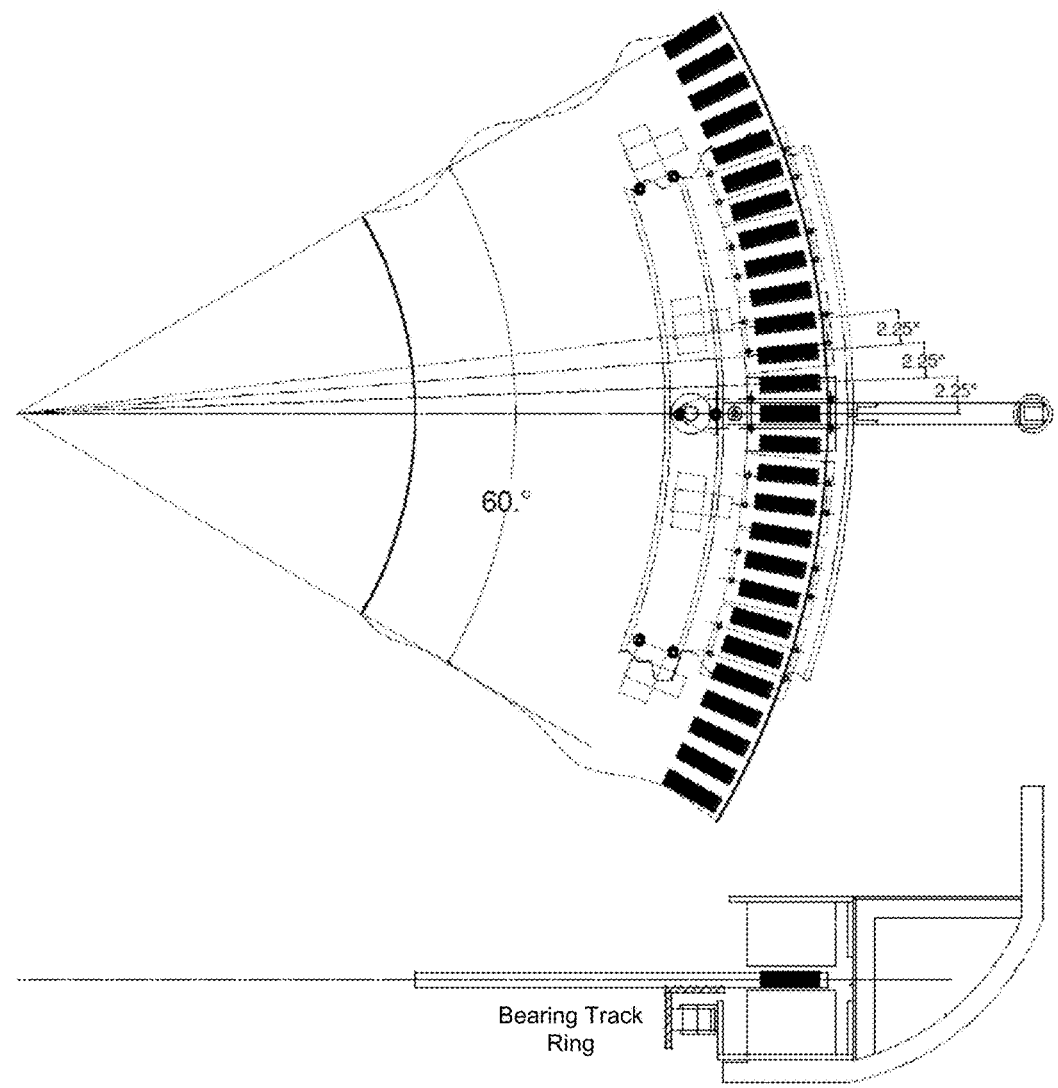
FIG. 3H shows a diagram further depicting the exemplary magnetic rotor details.

In some embodiments, for example, the magnetic rotor can be configured as a laser cut aluminum annulus of magnet thickness. Holes for magnets are laser cut around the outer circumference. Neodymium iron boron magnets, of alternating axial polarity, are glued in place around the rotor using high peel strength epoxy. Mounted to these specifications, oppositely polarized magnets with respect to rotor thickness concentrate axial magnetic flux above and below the rotor, while producing minimal radial flux. FIGS. 3G and 3H show a general view of the magnetic rotor from the underside, and a detailed view specifying the layout of magnets and bearing track, respectively. FIG. 3G shows a diagram depicting the exemplary EiP machine magnetic rotor. FIG. 3H shows a diagram depicting the exemplary magnetic rotor, e.g., including the layout of magnets and the bearing track details.

As the rotor spins, for example, lines of flux rotate like a spinning motor armature, which produces alternating current on stator coils, each half above and below. Voltage increases with flux transition speed, and the AC waveform is sinusoidal, hallmarks of a synchronous machine. Multiple stator pairs instantly derive excitation from rotating magnetic fields in parallel, while thrust force is applied to the entire radius for maximum torque.

3.2.5 Inductor Mechanical Specification

Figure 3I:
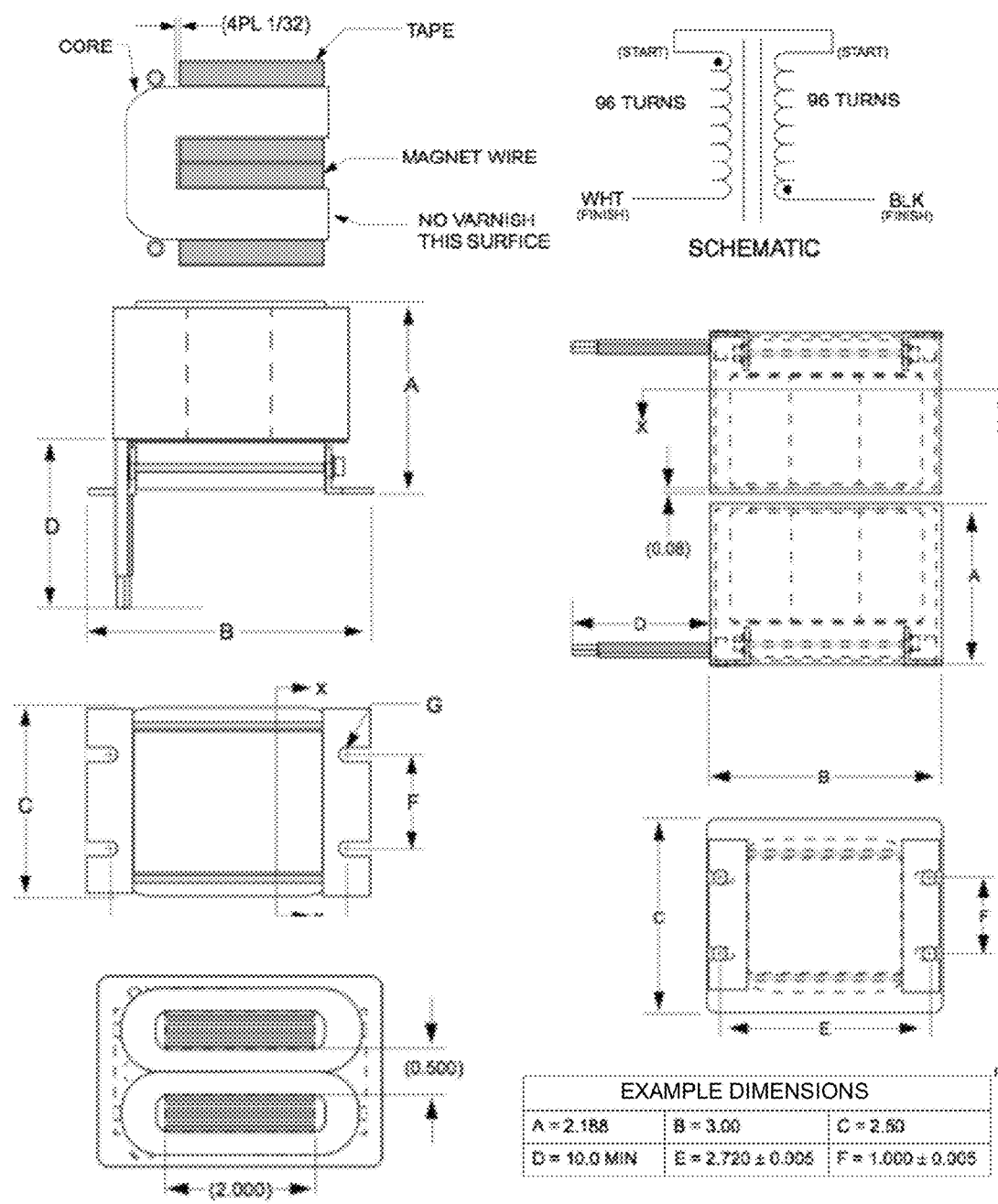
FIG. 3I shows a diagram depicting the exemplary EiP machine inductor specifications.

In the exemplary embodiment described in this section, each inductor in the EiP machine is encapsulated in epoxy, for example, to hold the C core in place under strong magnetic forces, and protect windings from harsh environmental conditions. Four threaded inserts supported by "L" brackets in epoxy provide mounting hardware. The EiP magnetic circuit is described in Section 2. FIG. 3I shows a diagram showing inductor specifications for the exemplary EiP machine embodiment, and how it is constructed.

For example, epoxy encapsulation protects the C core and windings from harsh environmental conditions. The EiP machine frame, supporting bearings and inductors, provides drain holes and open vents allow water to quickly enter and exit the inductor operating environment. High-density axial flux lines quickly saturate the C core when pole faces line up, so the magnetic rotor gap need not be too tight. Wiring for the inductors passes through a hole into a sealed compartment all the way around the outside, that contains electronics and wiring. All electrical connections are sealed from the elements in accordance with codes and standards for outdoor use. An aircraft style skin covers exposed areas where guideways, bearings, and wiring connections reside.

3.3 Windzone Design

The EiP windzone is the aeromotor for the EiP wind machine, where wind power is converted to rotating mechanical energy. The windzone has a stationary part (wind stator assembly) that directs the wind toward a rotating part (wind rotor assembly). The windzone handles any wind conditions, from high winds to light turbulence without adjustment, resulting in a wind curve that is linear, increasing with average wind speed. Exemplary embodiments of the EiP windzone are described.

The overall height and radius of the windzone defines the windswept area in the shape of the rotating wind rotor, e.g., a cylinder. Power potential increases linearly with rotor height and exponentially with radius. The stationary outer part of the windzone has an even number of vertical fins of fixed pitch (45 degrees with respect to inner rotor) that create a laminar windflow pattern internally, which is perfectly suited for the wind rotor. When viewed from the top with respect to current wind direction, windflow enters the rotor area from the upper left quadrant (Q1), crosses the center at maximum speed, and exits the lower right quadrant (Q3). In the lower left quadrant (Q2) windflow is forced to turn at a sharp angle where impulse force (positive drag) is greatest. In the upper right quadrant (Q4), windflow opposing rotor motion is blocked, and the still air provides drag opposing rotor motion as rotor speed increases. The laminar internal windflow created by stator fins eliminates the need to place the EiP wind machine on a tall tower. Fins are positioned at a forty-five degree angle relative to the rotor axis, with less than two to one ratio of stator fins to windblades. The outer edge of each fin is welded to a pipe for added strength and enhanced aerodynamics. Fin pipes accommodate EiP machine frame elements, adding top to bottom structural support.

The wind rotor is of windzone height, with an odd number of windblades welded to annular base and top plates. Each blade has a symmetrical ⅓ cylindrical curved profile, which produces maximum lift in parallel with windflow in either direction. Blade width is approximately the same as a stator fin. Blade pitch is −22.5 degrees below horizontal axis with respect to the inner tangent. So, maximum lift occurs where incoming windflow is parallel with the blade profile. As the rotor spins, varying proportions of lift and drag from all blades add up to positive rotor torque. The blade profile enhances wind shear and wake vortex, where wind direction undergoes a quick reversal as power is generated from it. Inflow wake vortices propagate from the interior exiting top and bottom of the hollow center, enhancing internal laminar flow. On outflow, vortices are carried away along with the exit flow. The net effect is smooth and quiet rotor motion regardless of wind speed, direction, or turbulence.

Standard three-bladed wind machines require placement on a tower, above obstructions that cause turbulence, where windflow is laminar and steady. If the wind speed is too great, or suddenly changes direction, instantaneous force can knock down the wind machine and tower. So, standard wind machines must reduce power to the point of total shutdown under high wind conditions. The wind curve (relationship between wind speed and power output) levels off in high winds. In the EiP wind machine, the windzone is designed to operate on rooftops or exposed surfaces where wind gusts of any magnitude can occur in any direction. The windzone is sturdy enough to operate in high winds and strong gusts that would normally destroy a more delicate apparatus.

The following figures show the mechanical shapes of windzone assemblies and fin/blade details; followed by a discussion of windzone aerodynamics.

3.3.1 Wind Rotor Assembly

Figure 3K:
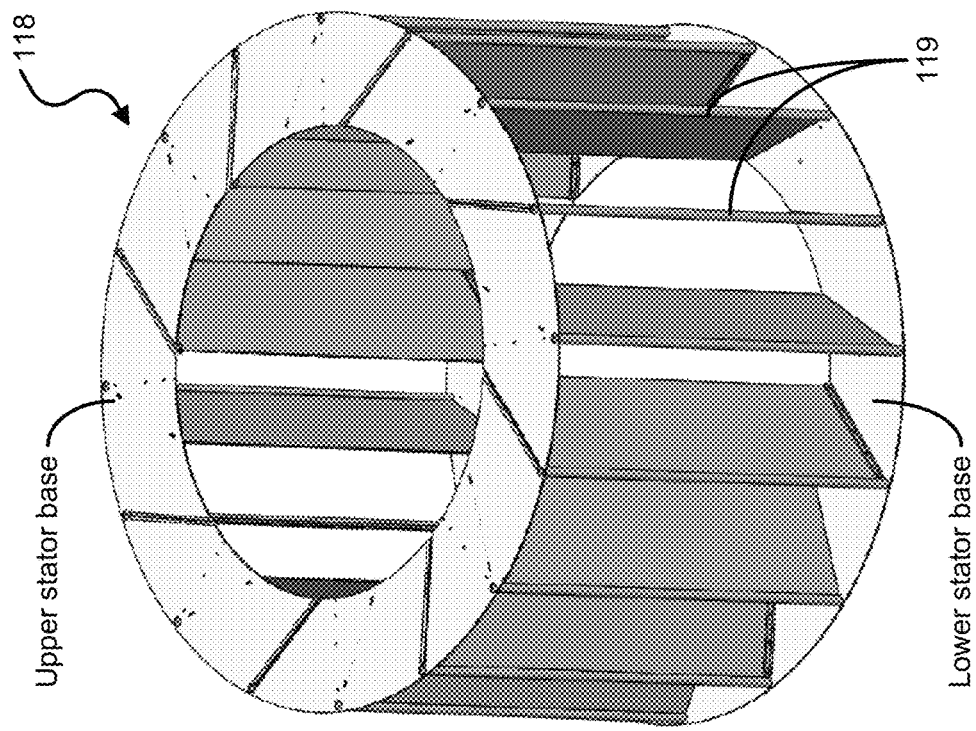
FIG. 3K shows a schematic diagram of an exemplary wind stator assembly.
Figure 3J:
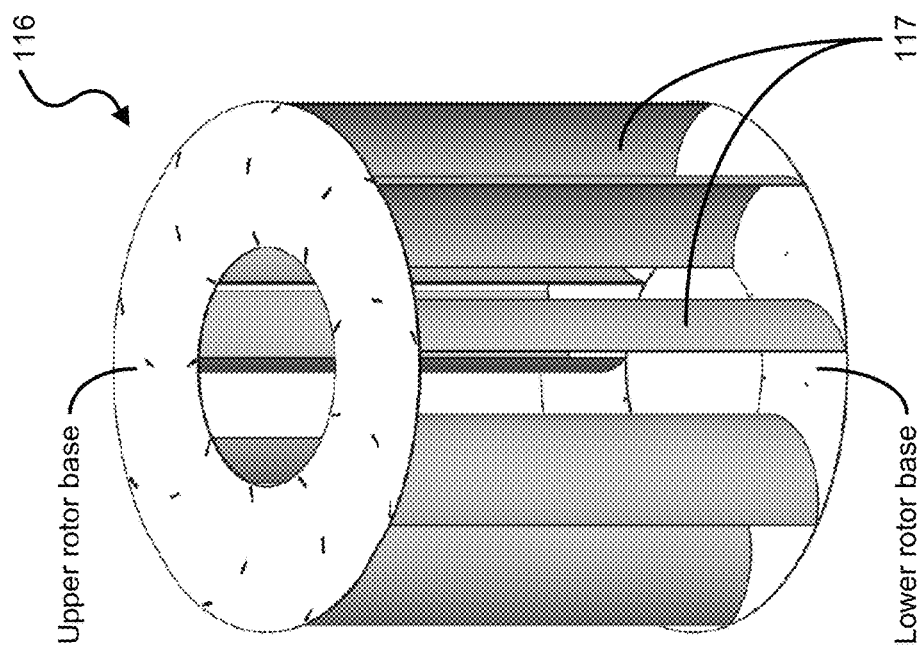
FIG. 3J shows a schematic diagram of an exemplary wind rotor assembly.

FIG. 3J shows a schematic diagram of an exemplary wind rotor assembly, such as the wind rotor assembly 116. The wind rotor assembly 116 includes the wind rotor blades 117 (e.g., wind-deflecting blades) arranged between an upper and lower rotor base plate (or track) with a hollow center to form the hollow central cylindrical interior space. The wind rotor can be fabricated by a welded aluminum assembly with an odd number of vertical blades sandwiched between two annuli, to form the structure shown in FIG. 3J.

3.3.2 Stationary Wind Deflector Assembly (Wind Stator)

FIG. 3K shows a schematic diagram of an exemplary wind stator assembly such as the wind stator assembly 118. The wind stator assembly 118 includes the wind receiving fins 119 arranged between an upper and a lower stator base plate (or track) with a hollow center to contain the wind rotor assembly 116 and the hollow center of the EiP wind machine. The wind stator assembly can be built in sections containing two stator fin blades sandwiched between top and bottom plates. The sections attach to the EiP wind machine base struts to form a sturdy exterior structure. The modular structure makes it easier to install the EiP wind machine, and if damaged by flying debris, easier to repair onsite.

3.3.3 Vertical Fin and Windblade Design

Figure 3L:
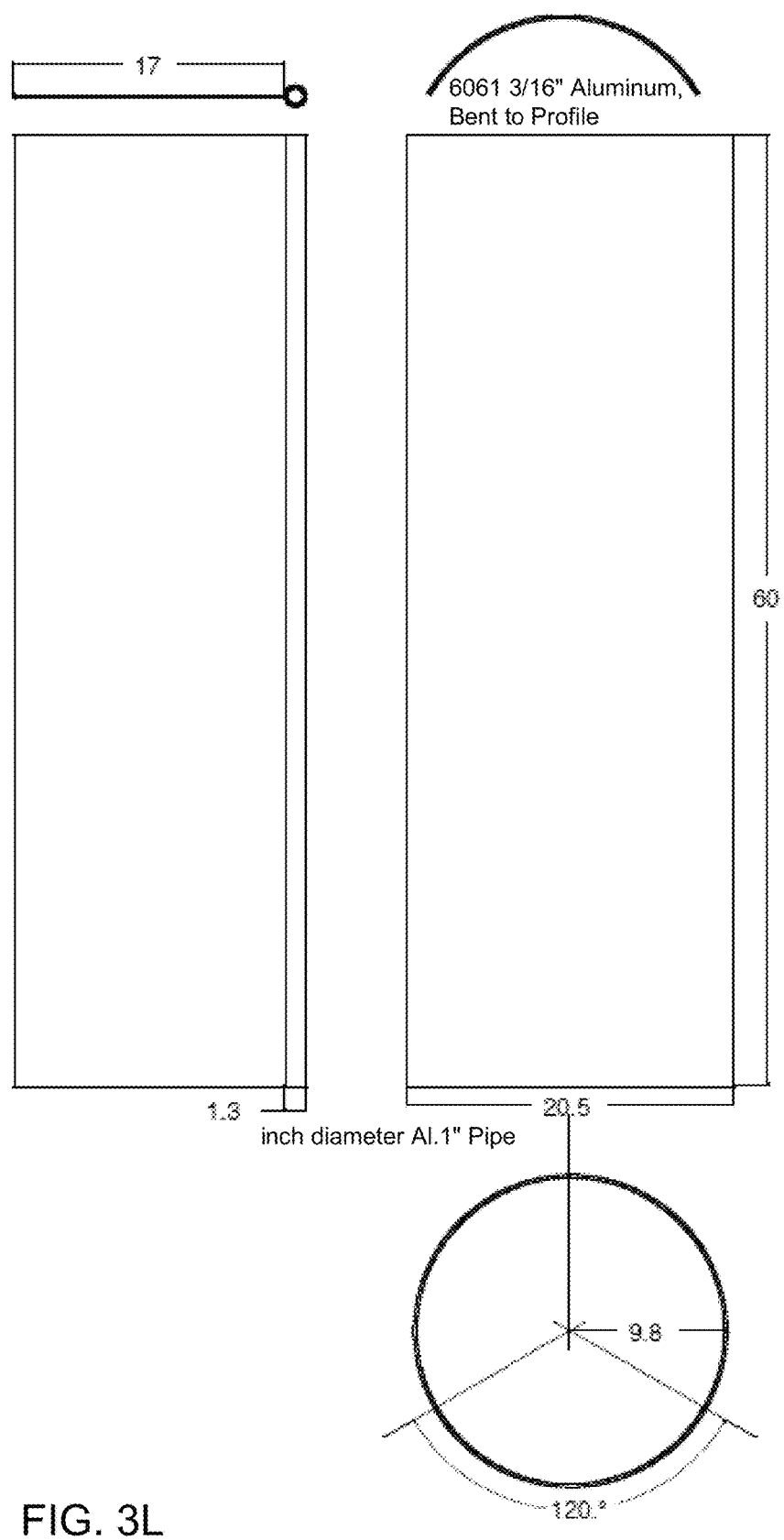
FIG. 3L shows a diagram of the exemplary vertical fins and wind blade details.

For example, the stator fin blade can be configured of a sheet of aluminum plate with an aluminum pipe welded along the leading edge. The pipe provides reinforcement and creates a simple airfoil with a curved blunt face, which interacts with air viscosity to bend flow lines around the curve. The windblade is bent from flat aluminum plate to a ⅓rd cylinder profile. FIG. 3L shows a diagram of exemplary vertical fins and wind blade details.

In some examples, the $⅓^{rd}$ cylinder windblade cross section is chosen to provide both lift and impulse operations, with maximum strength and high rigidity in the presence of turbulence. Unlike conventional airfoils for flight, the EiP wind machine blade design enhances the wing outflow vortex when operating at low attack angle producing lift.

3.4 EiP Wind Machine Aerodynamics

Generally, winds near the surface of the earth, especially in an urban setting, are turbulent and chaotic, deemed useless for power generation by conventional wind machine designers. EiP wind machine aerodynamics employ a high-solidity design, merged with EiP technology to create a wind machine that quickly converts turbulent windflow to useful power. The mechanical design is sturdy enough to handle turbulence, and EiP technology is fault tolerant. EiP technology combined with a new type of aerodynamic design makes the EiP wind machine capable of continuous operation withstanding forces that normally cause catastrophic failure.

EiP wind machine aerodynamics promote rapid uptake of wind energy, turbulent or laminar, over a wide range of wind speed in any direction. In this way, by utilizing a wind resource normally considered spurious or too energetic, the wind power efficiency coefficient is increased. Combined with active EiP technology, direct power production from wind is taken beyond aerodynamic limits, through superfine electronic rotor speed control, and high-speed conversion of mechanical torque to electric power.

Integrated with EiP technology, the windzone (aeromotor) delivers unprecedented efficiency in direct wind generation, deriving power from the pressure difference (gradient) between free air outside and the hollow core. The pressure gradient is enhanced by rotor motion, with internal circulation converting turbulence on the outside to laminar flow on the inside. Electrical power is extracted from differential rotor torque, while windflow circulation is compelled by a central wake vortex back to free air above and below the EiP wind machine.

Inflow wake vortices exit the hollow center, concentrating windflow in the center for wind blades in the outflow. A rotor blade profile in parallel with windflow (inflow and outflow) produces greatest lift. As it rotates to perpendicular, positive drag (impulse response) is greatest. Negative drag increases with rotor speed, occurring mostly where windflow is blocked and no positive torque is produced.

Since windflow is directed toward rotor motion all the way around, the windswept area is a cylinder of rotor radius and height, not a disk. Winds striking the windzone in all directions contribute to power production, and the rotor is hyper-sensitized to sudden changes in wind speed.

Figure 3M:
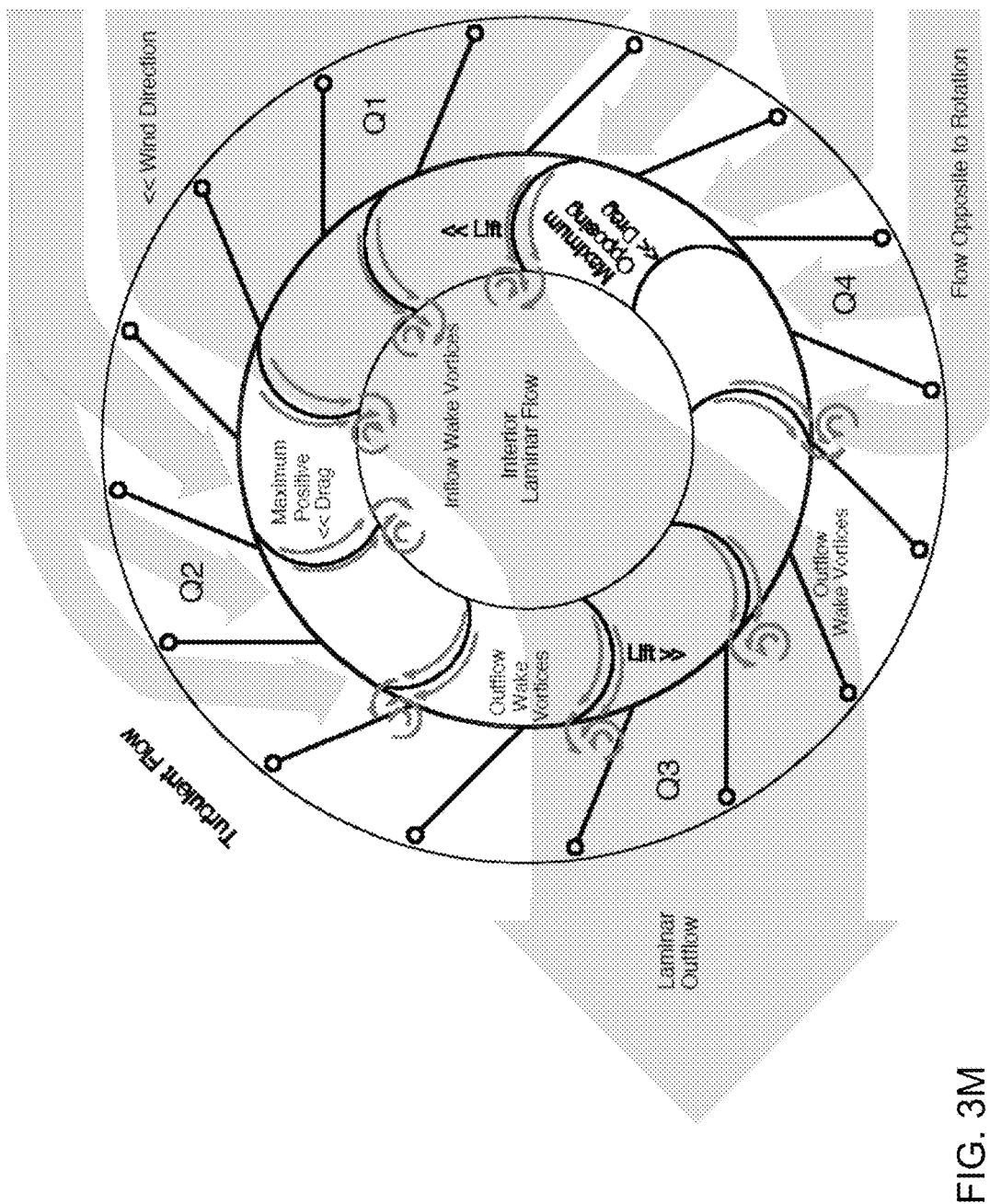
FIG. 3M shows a diagram depicting exemplary EiP windzone aerodynamics.

FIG. 3M shows a diagram depicting exemplary EiP windzone aerodynamics. EiP wind machine aerodynamics specifies a solid and heavy rotor that responds instantly to changes in wind speed and direction to produce useful power. The diagram of FIG. 3M shows the drag and lift effects on each windblade with respect to wind direction, which combine to instantly create net positive rotor torque in four quadrants (Q1, Q2, Q3, Q4). The ratio of lift vs. drag varies as each blade rotates around the center. Wind energy is directed by wind stator blades to enter and concentrate in Q1 where wind blades generate maximum lift. As a blade enters Q2, it produces maximum positive drag. The symmetrical profile "flips" as it enters Q3, producing maximum lift on the outflow. Wind opposing rotor motion is blocked in Q4 where no net lift is produced, the still air colliding with a moving windblade generates more negative drag as rotor speed increases. At a certain wind speed, when negative drag equals net positive drag and lift, the rotor spins to faster than wind speed (cruising speed). Wake vortices produced by power generation exit top and bottom of the hollow center in Q1, and in the turbulent flows surrounding the exit windflow in Q3. The rapid outflow of vortices enhances laminar windflow internally, greatly improving efficiency.

3.4.1 Lift Plus Drag Effect

For example, greatest power from the wind rotor occurs in Q1 where lift plus positive drag effects combine, as shown in the following figure. This is why the EiP wind machine responds so rapidly to wind speed changes (gusts).

Figure 3N:
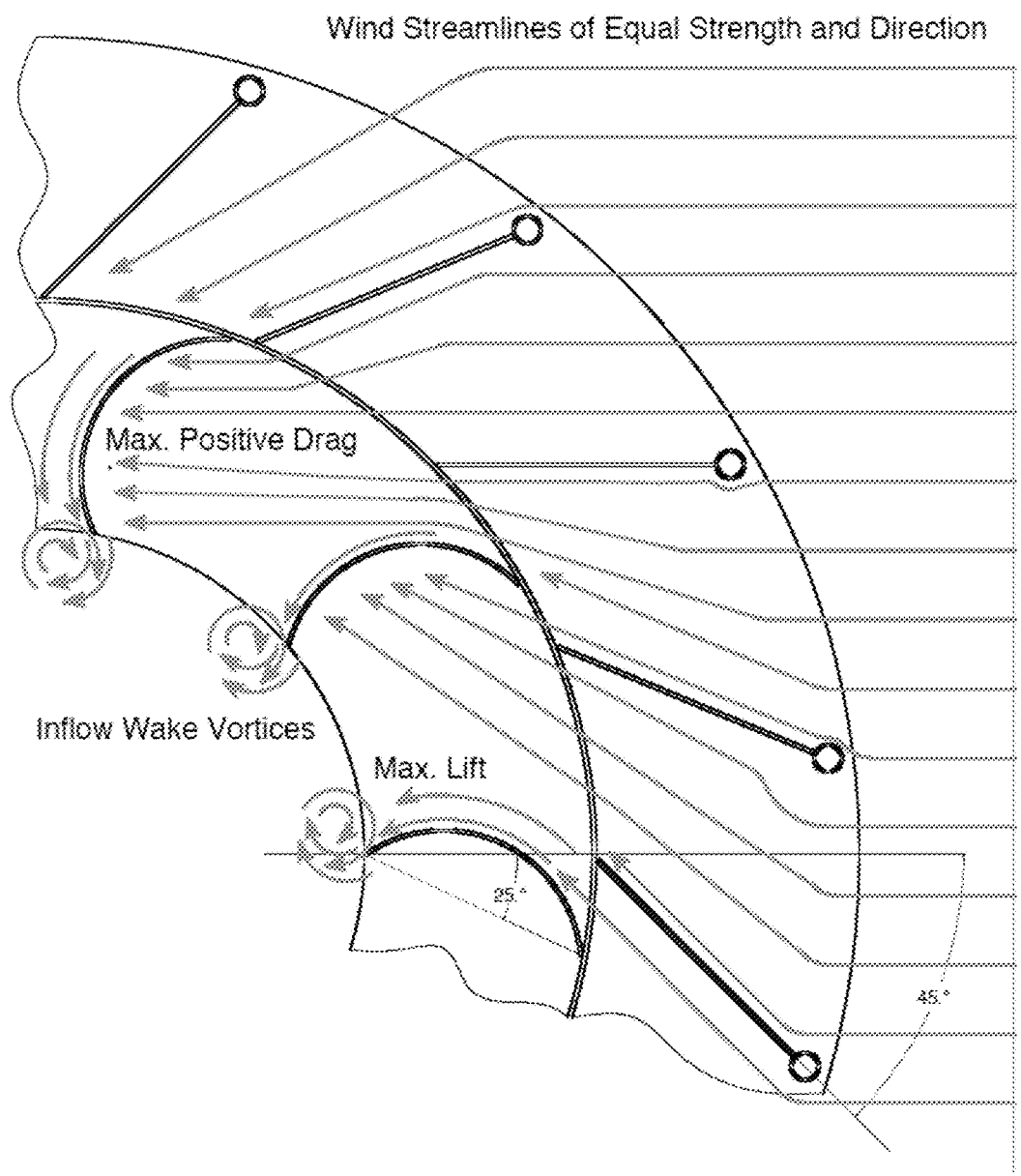
FIG. 3N shows a diagram depicting the exemplary EiP windzone aerodynamic details.

FIG. 3N shows a diagram depicting the exemplary EiP windzone aerodynamic details, e.g., showing the first quadrant (Q1) of FIG. 3M. In the first quadrant (Q1), when a rotor blade operates in parallel with incoming windflow, it produces maximum lift. When perpendicular to windflow, maximum positive drag occurs. As the attack angle shifts when the rotor moves, lift and drag are proportional. Positive drag enhances the impulse response to sudden changes in wind speed (gusts). When wind energy is converted to power, it undergoes a sudden change in wind direction that creates inflow wake vortices that exit the hollow center top and bottom.

3.4.2 Central Wake Vortex

A "wake vortex" is left in the windflow downstream of all wind machines, once energy has been extracted and released to free air. The vortex slides off airfoil surfaces and rotates in the opposite direction of the wind rotor. For power production, the wake vortex must be allowed to persist in the air column downwind while energy is extracted. Most vertical axis wind turbines must operate in their own wake vortex, which limits efficiency. Propeller type wind machines are more efficient because they exhibit a trailing wake vortex, but any turbulence causes a loss of power because the vortex is cut off in anisotropic flows.

In the EiP wind machine, all wake vortices rapidly exit top and bottom, while reinforcing internal laminar windflow. The rapid reversal of wind direction in each wake vortex energizes and concentrates wind energy in the central core while intensifying inflow. On outflow, wake vortices expand and pull windflow out of the machine with great force. All of these effects combine to improve aeromotor efficiency, and create a linear wind power curve.

3.4.3 Rotor Speed Balance Self Regulation

The EiP wind machine rotor is a unique aerodynamic device with mechanical self-regulation in balance and speed. Since there is no central shaft, the rotor is essentially an annular cylinder, which is the shape that produces more inertial mass than any other spinning body. Instead of fine blade tips attached to a shaft, wide wings with a high drag coefficient "fly" around the hollow center within its stationary containment. Spinning no faster that wind speed (TSR 1:1), the rotor maintains balance with no central shaft rather than vibration. The annular cylinder is a rotating body that follows the "right hand rule", where angular momentum in the direction of the fingers (multiplied by the radius), and a torque vector in the direction of the thumb increase exponentially with speed. The torque vector becomes a virtual shaft around which rotor mass instantly balances in powerful wind gusts. Combined with strong magnetic forces between rotor magnets and stationary iron core inductors, the high viscosity of windflow between stationary and moving parts stabilizes and cushions the rotor for smoother and quieter operation in high winds. Passive mechanical self-regulation is a key feature of the EiP wind machine, where conventional wind turbines must be shut down or face certain destruction. In these conditions, the EiP wind machine operates normally.

For example, at a certain speed, depending on rotor size (height and radius), the rotor can spin no faster when negative drag equals positive drag plus lift, referred to as "cruising speed". EiP electronic control continues to extract more power from wind speeds above cruising, maintaining a linear power curve with constant rotor speed.

3.4.4 Adaptive Torque Control

Adaptive torque control has been used as a strategy for large wind farms to generate maximum steady power from highly variable winds for easy grid integration. However, since the TSR of a propeller is much greater than unity, most of the time this practice consumes excess power that reduces overall efficiency. Because of high TSR, a powered propeller merely cancels wind uptake, creating turbulence and disrupting the wake vortex. No power from turbulence is possible, because the propeller's trailing vortex is wiped out by non-laminar anisotropic flow, cutting off mechanical torque.

In the EiP wind machine rotor the natural 1:1 TSR allows direct torque control to maintain rotor speed very quickly, to sustain the wake vortex inside the machine regardless of ambient wind conditions, allowing energy production from gusty winds, until now considered to be impossible. This greatly improves the wind power efficiency, linearizing the power curve. Since power is delivered through an electronic inverter, rotor speed can fluctuate, which supports EiP oscillation between several EiP wind machines, where excess energy is shared through adaptive torque control.

3.4.5 Windzone Thermodynamics

Generally, all of the semiconductors and inductors produce heat. Fortunately, for semiconductors and inductors inside the EiP wind machine, maximum heating occurs when the windflow is high. Each PMLSM module is attached to the windzone, which acts as a heatsink. Airflow through the wind machine cools these devices as they deliver power. This allows maximum power output from the minimum amount of copper and iron electromagnetic components.

4 Exemplary Electronics Hardware Specification

The disclosed EiP technology is modular at the electrical machine level by breaking down a large array of rectifier electronics into three-phase groups, embedded in each PMLSM. Each PMLSM has an integrated three-phase rectifier module, which converts AC to a DC voltage. Stators connect in a wye configuration, with each leg electrically isolated from a shared DC interface, post rectifier. Three or more PMLSMs can be combined as building blocks to create certain configurations of EiP machine. One PMLSM provides a Voltage Sourced Converter (VSC) circuit for motoring and generating, while all others provide simple three-phase diode rectifiers for generating only. EiP oscillator circuits containing one VSC and two or more three-phase rectifiers are stacked on the DC interface, as building blocks for an EiP machine configured to any size and power.

4.1 Three Phase Diode Bridge Rectifier

Figure 4A:
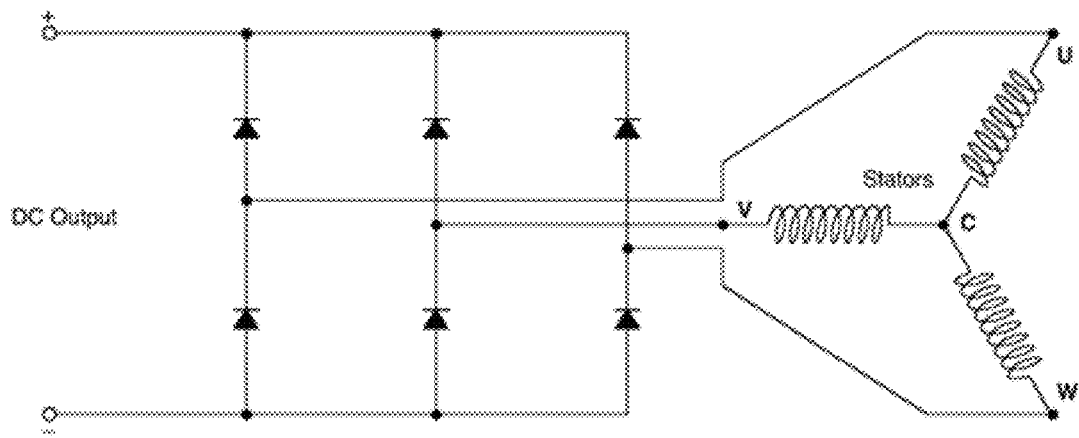
FIG. 4A shows a schematic diagram of an exemplary PMLSM diode bridge.

The primary linear electronic circuit for a generating PMLSM is a simple six-segment three-phase diode bridge rectifier, as shown in the example of FIG. 4A. FIG. 4A shows a schematic diagram of an exemplary PMLSM diode bridge. Diode bridges are stacked in series or parallel for a certain voltage/current configuration on the DC link. Each leg of the wye is an EiP synchronous magnetic circuit, designed to work with industry-standard three-phase rectifier modules.

Stator AC is only allowed to flow in one direction, so when the three AC waveforms are superimposed, it results in roughly a DC voltage that equals peak AC voltage. A capacitor is added to the DC link bus, to filter out ripple and add time before DC voltage drops.

4.2 Voltage Sourced Converter (VSC)

Figure 4B:
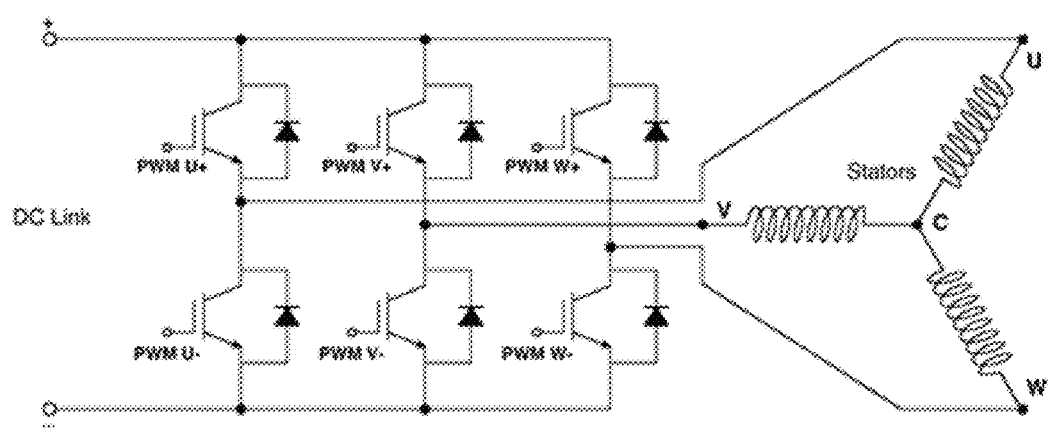
FIG. 4B shows a schematic diagram of an exemplary PMLSM with voltage sourced converter (VSC).
Figures 1, 4C:
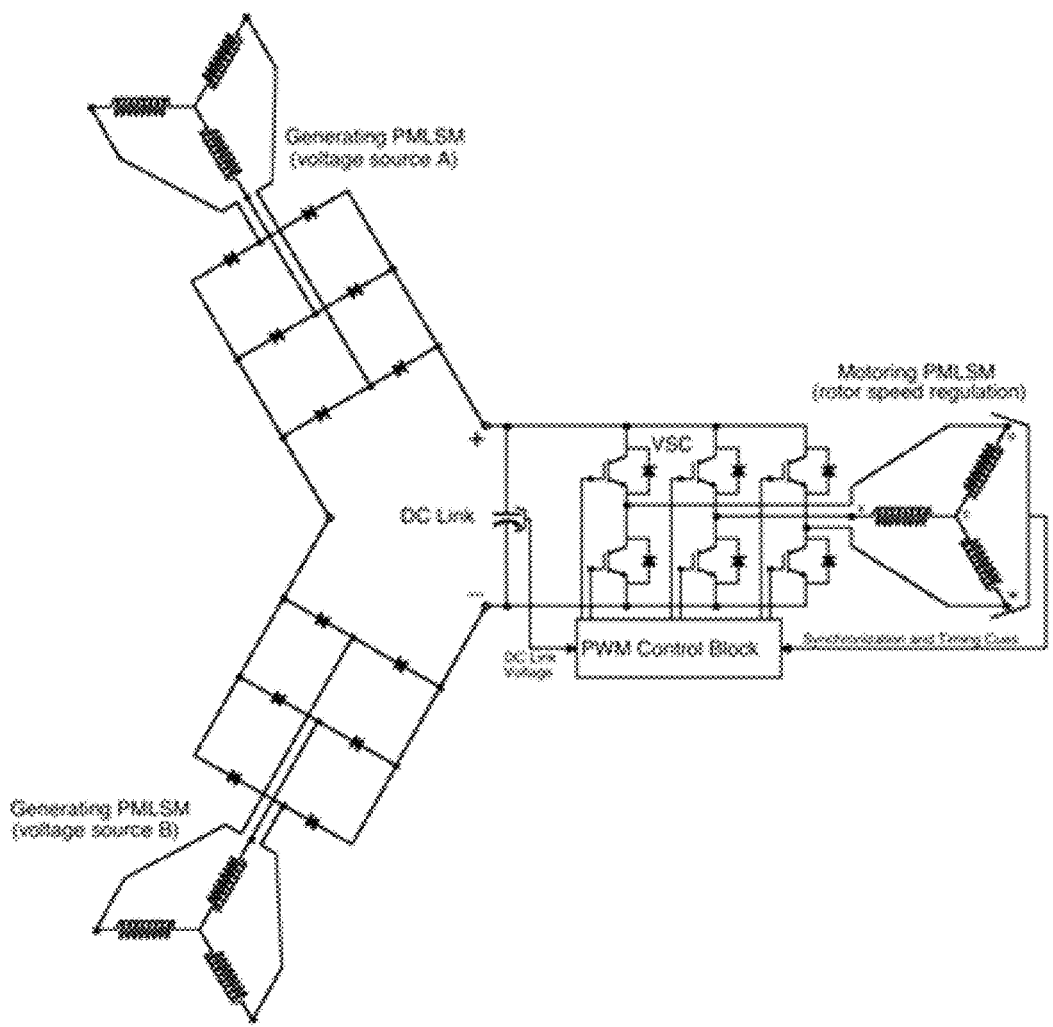
FIGS. 4C-1 and 4C-2 show schematic diagrams of exemplary three and five PMLSM EiP oscillators, respectively.
Figures 2, 4C:
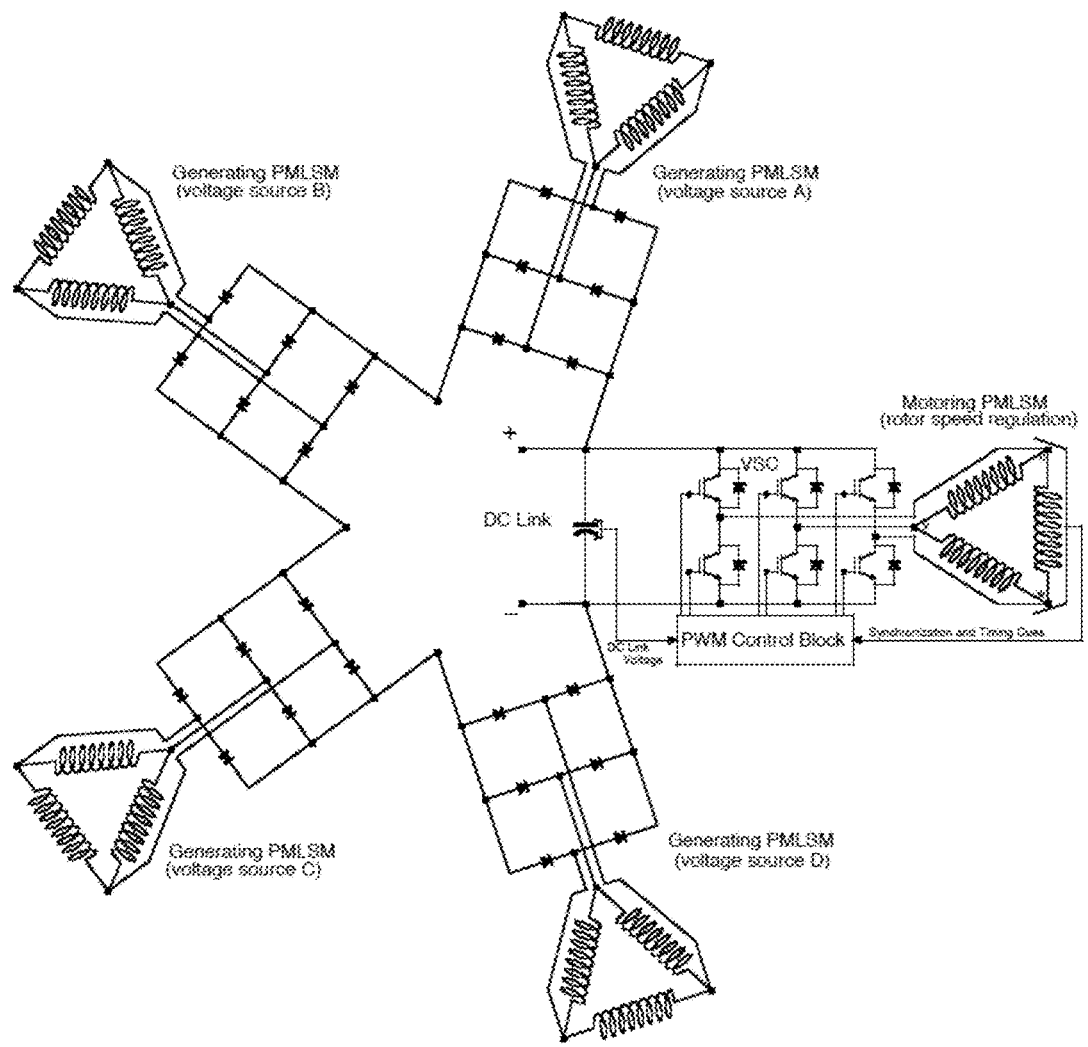

For motoring operations, an industry-standard three-phase module called a voltage sourced converter (VSC) is required. The VSC circuit places semiconductor valves like the insulated gate bipolar transistor (IGBT) in parallel with each diode in a three-phase rectifier, to become a controlled rectifier/inverter. In a three-phase group, packaged for industrial use, the circuit is commonly called a variable frequency drive (VFD). IGBTs are controlled by pulse width modulation (PWM) of gate signals for motoring and generating operating modes, turning variable voltage and frequency three-phase AC power into a fixed DC link voltage when generating, or inverting DC link power to three-phase AC power of variable voltage and frequency for motoring. When the IGBTs are inactive, the rotor simply coasts and the circuit reverts to a three-phase rectifier. The following figure shows the VSC and PMLSM stators. FIG. 4B shows a schematic diagram of an exemplary PMLSM VSC.

PWM-controlled IGBTs provide power factor and phase control for each stator leg. PWMs are provided by an intelligent controller part, which generates waveforms on the IGBT gates that regulate the flow of current through IGBTs. Software control of the rectifier uses rotor flux estimation techniques based on real-time analysis of stator currents by a digital signal processor. All timing and feedback is derived from rotor flux/stator interactions, e.g., eliminating outboard speed sensors.

VSC controller electronics are powered by a separate low-voltage supply, which is easily battery-backed. When the supply is removed, all IGBTs go to a high impedance state, and the circuit becomes a simple passive rectifier. Diodes completely isolate stators in the reverse direction from the DC link voltage. This removes the threat of cascading breakdown if a fault occurs, where a diode becomes an open circuit if current is too high, and the stator leg is completely cut out of the circuit.

4.2.1 Power Factor Control

PWM control of IGBT gates adjusts the power angle between reactive and resistive parts of stator interactions with the magnetic rotor, providing power factor control. The PWM controller monitors AC frequency using sensorless techniques, for rotor speed indication. Rotor speed corresponds to total power potential speed regulation defines power limits.

4.2.2 Power Regulation Through Motoring

Wind energy uptake accelerates the rotor, which raises the DC link voltage. Electrical loading on the DC link decelerates the rotor and lowers DC link voltage. Each PMLSM with VSC regulates speed by forward and reverse motoring using integrated PWM control. When rotor inertia is high, braking by reverse motoring (generating) causes DC link to rise. Forward motoring causes DC link to drop (by loading) while rotor accelerates. When motoring and generating, the rotor speeds up and slows down while DC voltage remains constant. At maximum rotor speed, the DC voltage is allowed to fluctuate.

4.2.3 High Frequency PWM Support

The PWM carrier frequency is thousands of times greater than generator frequency. In the EiP machine, for example, smaller silicon steel C cores allow maximization of PWM frequency, for high speed and higher resolution control. If a high frequency is chosen, for example 16 KHz, switching harmonics can produce eddy current losses in large monolithic cores. Discrete core segments, built with 3% silicon steel laminates, naturally operate at higher frequencies with low losses, so PWM frequency is maximized.

4.2.4 Off-the-Shelf Industry Standard Variable Frequency Drive Compatibility VSC technology is fairly mature, where a variety of modular industrial VFDs are available from various manufacturers off-the-shelf, and programmed to fit PMLSM motor parameters. EiP technology can use the standard VFD as the electronics hardware platform. In some embodiments of exemplary EiP wind machine, for faster time-to-market, the machine contains one off-the-shelf VSC for a motoring PMLSM, while all others use diode bridges. A grid-tie inverter connected to the DC link creates an EiP wind machine grid interface that conforms to standards.

In some embodiments of exemplary EiP wind machine, custom VSCs are integrated into every PMLSM in the wind machine frame, with built in cycloconversion for direct grid-compatible AC.

4.2.5 Electronic Mechanical Compensation

High-speed electronic control of instantaneous PMLSM thrust force allows tight control of large and loose mechanical systems. The EiP wind machine is subject to random mechanical forces from wind and magnetics that cause undesirable vibrations. With electronic control that is stronger and faster than mechanics, precise regulation compensates for periodic vibrations like torque ripple, maintaining smooth and quiet rotor motion.

For example, torque ripple is an artifact of the EiP modular magnetic design, where the linearization of a rotary machine lacks the mechanical stabilization of a central shaft. A smoothing algorithm in the VSC simulates control from the central shaft by cancelling and neutralizing torque ripple in real-time.

4.3 EiP Oscillator Architecture

In various embodiments, the inductors in the exemplary EiP machine are the same size, so two or more generating PMLSMs with a diode bridge must be connected in series for enough voltage. The resulting circuit is the EiP oscillator, where the output of two or more PMLSMs in series, drive one PMLSM with a VSC. In combination with the magnetic rotor, this circuit produces the EiP oscillation. This defines the primary electronic module for EiP machine configuration. EiP technology breaks down a complex array of stators and electronics into EiP oscillator configurations, which can be duplicated around the DC link and magnetic rotor to form a synchronous generator of any size. On the grid, at startup one PMLSM motors the rotor to minimum speed, until generating PMLSMs create enough voltage to sustain the DC link. At this point the motoring PMLSM only maintains minimum speed then coasts and supports the DC link when wind and inertia take over. The following figure shows the virtual circuit for an EiP oscillator, e.g., using three or five PMLSMs.

FIGS. 4C-1 and 4C-2 show schematic diagrams of exemplary three and five PMLSM EiP oscillators. Each generating PMLSM contains rectifiers that produce a DC voltage equal to the peak AC voltage produced by rotor motion. The exemplary three PMLSM version shown in FIG. 4C-1 is a minimal theoretical configuration, but a higher DC link voltage is produced when more generating PMLSMs are connected in series. The exemplary five PMLSM version shown in FIG. 4C-2 is more appropriate to the exemplary inductor design. Notably, it is possible to create a higher voltage DC link by stacking more series connected PMLSMs, depending on the requirements of the VSC part of the circuit. The flexible architecture of the disclosed EiP technology allows configuration of the EiP wind machine to match the wind resource at the installed location.

4.3.1 EiP Oscillator Circuit Selection for EiP Machine Configurations

In some embodiments, for example, a three-PMLSM EiP oscillator is the minimal configuration. But, many more levels of generating vs. motoring PMLSMs are possible. If a greater amount of energy uptake from electrical sources is required, the proportion of motoring PMLSMs should be greater. If wind energy production is key, the total number of generators should be maximized. The exemplary EiP wind machine supports combinations of identical of EiP oscillator(s), to populate the stator slots in combinations shown in the following figure.

Figure 4D:
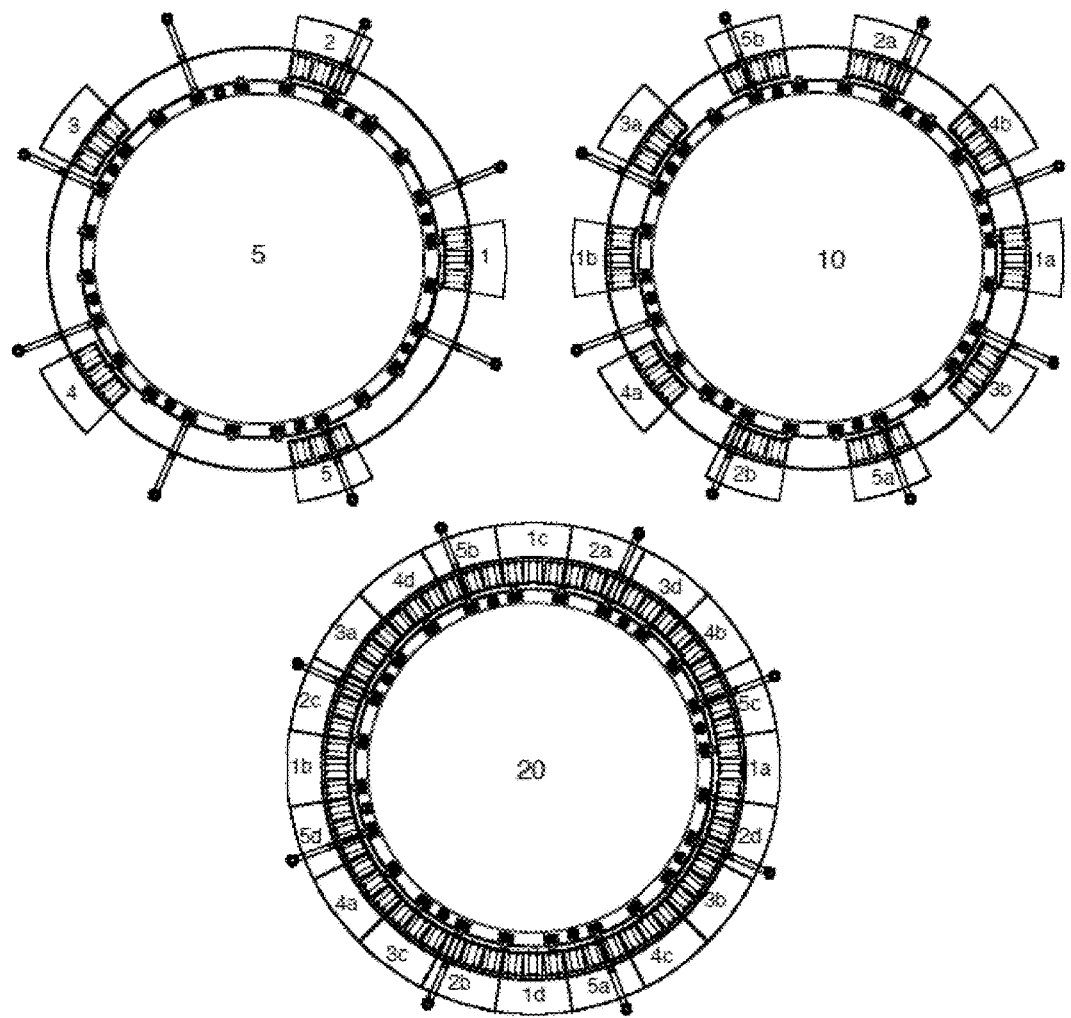
FIG. 4D shows a diagram of exemplary five PMLSM EiP oscillator combinations for the exemplary EiP machine radius.

FIG. 4D shows a diagram of exemplary five PMLSM modular combinations for the exemplary EiP machine radius. The diagram of FIG. 4D shows three exemplary combinations of five PMLSM EiP oscillators. The five PMLSM implementation is effective, e.g., because the nominal voltage matches the VFD DC link. The first example shows five PMLSMs with one acting as a motoring module. The second example shows ten PMLSMs with the oppositely arranged PMLSMs (1a and 1b) for motoring, under a master/follower drive control model. The third example shows 20 PMLSMs, with 1a as the mater and 1b, 1c, and 1d as followers. The DC link of each oscillator grouping can be wired in parallel or series, which determines the output voltage of the EiP wind machine. The DC links can also each drive separate inverters for separate AC services at lower voltage.

4.3.2 Networked Control and Monitoring Interface

VSCs in the EiP wind machine can be configured to connect on the DC link with a local control interface for DC voltage regulation. For example, for external control, an RS-485 control network interface provides a way to organize motoring PMLSMs in the EiP wind machine, and facilitate control and status exchanges with a central controller device. In some implementations, for example, EiP wind machines interact on the shared local grid through exchanges of parameters on the network. Parameter definitions and protocol depend on the VSC in use.

5 System Architecture

EiP technology is fractal by design. For example, in some embodiments, at all levels, from PMLSM modules to clusters of EiP wind machines, there is self-similarity in basic structures and relationships. For example, each PMLSM includes four magnetic poles interacting with three-phase stator groups on one side, and a shared DC network on the other. Groups of PMLSMs are combined as EiP oscillators in groups of three to five, and EiP oscillators are combined in groups operating on the DC link with a common control interface. Clusters of EiP wind machines form spontaneous networks in groups of three or more, sharing common grid attachments from different locations, and a common high-speed local area network connection. Groups of clusters form clusters over a wide area. The fractal expansion of modular structures presents no limits to the size and scope of a power generating and distribution system.

This section describes how each level of EiP technology fits into the system architecture for an exemplary EiP wind machine.

The system architecture can include, for example, configurations of PMLSMs for an exemplary EiP wind machine (e.g., DC link network), then network cluster structure (Spontaneous Network, power sharing), then cluster of clusters structure (network data sharing only, no local grid connection); DC network local to EiP wind machine; EiP Spontaneous Networking between wind machines; Synchronous Power Web between spontaneous networks; and/or EiP Distributed Generation Station.

5.1 PMLSM DC Link Network

A low latency network interface provides the hookup for control and monitoring of the EiP wind machine through motoring PMLSMs. Using a standard industrial networking interface, a controller device is attached to the EiP wind machine. The controller executes a set of commands, for starting and stopping the machine, configuration, and runtime control. The EiP wind machine issues status in response to commands continuously, until another command is given. The low latency control path supports a simple PI controller architecture, for rotor speed and power regulation.

Inside the EiP machine, PMLSMs that perform regulation functions are grouped as EiP oscillator circuits to form a specific configuration on the DC link. These groups operate on a DC network, controlled by the shared remote control and monitoring interface. The DC network voltage is supported by generating PMLSMs and regulated by motoring ones.

5.1.1 Remote Control and Monitoring

The EiP remote controller device provides a keypad and screen, for setup and monitoring. The device has a wired, wireless, or fiber optic interface to the EiP wind machine. A port is provided to attach a laptop for more elaborate software control functionality for EiP machines and network.

For more information on EiP wind machine commands and status, refer to the "Programming Specification" section.

5.2 EiP Spontaneous Networking

In some examples of EiP spontaneous networking, for example, a minimum of four EiP wind machines, sharing their remote control and monitoring interfaces over a wireless connection with low latency, self-organize to form an EiP spontaneous network on the shared grid connection. Since EiP machines use soft-switched power semiconductor technology rather than transformers, they can link in parallel at lower voltage over short power lines. The combined current and inertial storage of many EiP wind machines increases local grid capacity and stability, through instant sharing of power with maximum efficiency in an EiP spontaneous network. The EiP spontaneous networking topology can include a local grid segment: showing nodes, clusters, and 3D terrain.

5.2.1 EiP Network Nodes and Clusters

In the example, an EiP spontaneous network requires at least four EiP wind machines to form a network. Each EiP wind machine is a network "node". Groups of four nodes form "clusters" on the network, organized in direct association with the local terrain. Net connections are tetrahedral, with three network paths from node to node. Clusters form groups of clusters, encompassing a wider geographical area.

5.2.2 Hardware Cache Line-Based Network Protocol

EiP network protocol operates like a hardware cache, where the structuring of data in the bit stream controls packet switching, at the node level. The stream is synchronous with embedded timestamp. All participating nodes follow the protocol, enforced by hardware. Any non-conforming transactions are ignored like background noise on a voice phone.

Each EiP wind machine broadcasts its current status to the network, then listens for others who share the same grid connection. Each EiP wind machine is calibrated to its location, through common natural references from a geographic information system (GIS), from which a unique identifier on the network is created. Like any self-organizing system in nature, groups of nearby EiP wind machines form a spontaneous network, from which all derive control signals for local power management. This ad hoc power web operates without centralized addressing, providing a live picture of real-time renewable power conditions across a wide area, and instantaneous local power protection from network-wide disruptions. The power web eliminates grid lossiness, caused by transformers and long transmission lines, backfilling the waste with renewable energy from local rooftops.

The network can be configured to always operating at maximum speed and data throughput. While idle, the network data contains a diagnostic test pattern, indicating current network status and power conditions. Once running the network can be configured to be always fully loaded with real-time data. Each node waits for the correct time slot for sending commands and status, overwriting existing data without disrupting others.

5.2.3 Private Channel for Power Providers

Owners of each EiP wind machine have access to a slot for encrypted private transactions on the network between other machines using the same private channel. The private channel service can be used by power companies that lease EiP wind machines to customers and use power company EiP machines for energy uptake and net metering. All EiP machines group in a spontaneous way for maximum energy production, while private monitoring and billing systems manage monetary and statistical operations.

5.3 EiP Synchronous Power Web

In combination with solar panels and fuel cells, for example, a rooftop wind farm using EiP wind machines can produce 100% renewable energy in any atmospheric conditions, day or night. This is accomplished by a slow buildup of inertia, which is quickly released for brief moments as needed to help build up inertia in other EiP wind machines in the cluster. Over time, enough inertia accumulates to power necessary loads indefinitely, as excess inertia is shared by a "ping pong" effect.

5.3.1 Linking EiP Spontaneous Networks for Wide Area Energy Sharing

EiP spontaneous networks that share a data connection while operating on separate grid segments link up to create a synchronous power web over a large landscape is created. This solves the problem where the wind is blowing during off peak times, and excess energy must be stored for peak times, even during calm. Through each spontaneous network, EiP wind machines share excess energy in a grid segment wide EiP oscillation, which provides a vast storehouse of energy.

When EiP spontaneous networks link up to form a power web, distant transmission lines between can be allowed to operate wildly, as disturbances are relayed by high speed data links and compensated for in advance. The synchronous power web acts like a power filter, stabilizer, and battery for distant power generation from random renewable sources, without the need for flexible cogeneration, for maximum wind power in the energy mix.

5.4 Oscillations and Distributed Generation

Whenever multiple sources of electrical generation are interconnected, oscillations are commonplace. Generators speed up and slow down under changes in load, feeding back power surges and sags on one another to create parasitic oscillations. As a primary design feature, for example, EiP technology converts oscillation into a resource that enhances capture, storage, and delivery of renewable energy.

EiP machines can decouple the generator rotor angle from power delivery, allowing rotor speed to fluctuate in "transient stability", where the rotor operates at variable speed, which is allowed to oscillate, normally a catastrophic failure mode when multiple generators connect out of step. Changes in load and resource can naturally occur without dumping excess power. An electronic inverter delivers the power providing instantaneous power factor control and correction, which determines how much power is actually consumed (resistive or active power) vs. power for magnetic fields required to transmit and distribute it (reactive power).

6 Exemplary Programming Considerations

This section specifies information related to programming of EiP machine networks, including PMLSM parameters and EiP spontaneous network data structure. The exemplary EiP programming environment can consider DC network and parameters, spontaneous network and cache line structure, and power web cache line.

6.1 PMLSM Parameter Programming

Programming depends on manufacturer specifications; the exemplary EiP wind machine can utilize an Allen Bradley Powerflex 40 3-phase motor controllers.

6.2 EiP Spontaneous Networking Data Structure

EiP spontaneous networking data structure, which is applied to networking tools and techniques for three-phase industrial motor networks, represents a cache line on the EiP spontaneous network that each EiP wind machine constantly updates with current operating data. The EiP data structure (e.g., EiP Spontaneous Networking Data Structure) can include a time stamp, machine identifier, and operating mode.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

EXAMPLES

The following examples are illustrative of several embodiments of the present technology. Other exemplary embodiments of the present technology may be presented prior to the following listed examples, or after the following listed examples.

In one example of the present technology (example 1), a wind power generator for converting wind power into electricity includes a support base; inductor coils fixed in position over the support base in a circular array; an annulus ring track fixed to the base support and configured to provide a circular track around which the circular array of inductor coils is located; rollers placed in the circular track of the annulus ring track to roll in the circular track to move around the annulus ring track; an annulus ring rotor placed on the annulus ring track and engaged to the rollers in the circular track of the annulus ring track so that the annulus ring rotor can rotate relative to the an annulus ring track by operation of rolling motion of the rollers in the circular track without having a rotary shaft in the center of the annulus ring rotor for rotating the annulus ring rotor, the annulus ring rotor structured to include separate magnets evenly spaced from one another on an outer peripheral of the annulus ring rotor to move through the circular array of inductor coils as the annulus ring rotor rotates with respect to the annulus ring track so that the relative motion between the magnets and the inductor coils causes generation of electric currents in the inductor coils; and a cylindrical wind rotor assembly located above and fixed to the annulus ring rotor to form a unified assembly to rotate with the annulus ring rotor relative to the annulus ring track, the cylindrical wind rotor assembly structured to include wind-deflecting blades that are spaced from one another and arranged in a circle around the cylindrical wind rotor assembly to form a hollow central cylindrical interior space for containing a wind vortex formed from deflecting of the received wind by the wind-deflecting blades, to convert received wind from any direction into a rotation of the unified assembly relative to the annulus ring track, thus causing conversion of the wind energy into the electric currents in the inductor coils.

Example 2 includes the wind power generator as in example 1, further including a cylindrical wind stator assembly fixed in position relative to the support base and the annulus ring track, the cylindrical wind stator assembly including stator wind-receiving fins arranged in a circle that is outside of and encloses the cylindrical wind rotor assembly and the stator wind-receiving fins structured to direct received wind from any direction inwards and towards the wind-deflecting blades of the cylindrical wind rotor assembly, in which the stator wind-receiving fins and the wind-deflecting blades are structured to collectively and efficiently convert the received wind into a rotation of the cylindrical wind rotor assembly.

Example 3 includes the wind power generator as in example 2, in which each stator wind-receiving fin includes a pipe or rod having a curved outer edge as a first interface of the wind power generator with the received wind.

Example 4 includes the wind power generator as in example 2, in which each stator wind-receiving fin includes a fin portion that is slanted in orientation with respect to a radial direction of the cylindrical wind stator assembly and is configured to receive and direct wind into the wind-deflecting blades of the cylindrical wind rotor assembly.

Example 5 includes the wind power generator as in example 4, in which the fin portion is slanted in orientation with respect to a radial direction of the cylindrical wind stator assembly at 45 degrees.

Example 6 includes the wind power generator as in example 2, in which each stator wind-receiving fin includes a fin portion formed of a metal or metallic alloy.

Example 7 includes the wind power generator as in example 2, in which each stator wind-receiving fin includes an aluminum fin portion.

Example 8 includes the wind power generator as in example 2, in which the stator wind-receiving fins of the cylindrical wind stator assembly and the wind-deflecting blades of the cylindrical wind rotor assembly are configured so that a radial dimension of the cylindrical wind stator assembly, a radial dimension of the cylindrical wind rotor assembly, and a radius of the hollow central cylindrical interior space in the center of the cylindrical wind rotor assembly are substantially the same.

Example 9 includes the wind power generator as in example 2, in which the cylindrical wind stator assembly has an outer diameter greater than a length of the cylindrical wind stator assembly along a cylindrical axis of the cylindrical wind stator assembly.

Example 10 includes the wind power generator as in example 2, in which a number of the stator wind-receiving fins of the cylindrical wind stator assembly is greater than a number of the wind-deflecting blades of the cylindrical wind rotor assembly.

Example 11 includes the wind power generator as in example 2, in which each wind-deflecting blade of the cylindrical wind rotor assembly includes a curved blade portion; and the stator wind-receiving fins of the cylindrical wind stator assembly are slanted in orientation with respect to respective radial directions of the cylindrical wind stator assembly to direct received wind towards a concave side of the curved blade portion of each wind-deflecting blade.

Example 12 includes the wind power generator as in example 1, in which each wind-deflecting blade includes a curved blade portion to deflect the received wind into a wind vortex inside a hollow central region of the cylindrical wind rotor assembly.

Example 13 includes the wind power generator as in example 12, in which the curved blade portion in each wind-deflecting blade has a geometry of a portion of a cylinder.

Example 14 includes the wind power generator as in example 12, in which the curved blade portion in each wind-deflecting blade includes a geometry of one third of a cylinder.

Example 15 includes the wind power generator as in example 1, in which the inductor coils in the circular array of inductor coils are independent from one another to independently produce respective currents caused by a relative motion of the magnets on the outer peripheral of the annulus ring rotor relative to the inductor coils of the circular array of inductor coils so that a failure in one inductor coil is not disruptive to current generation in another inductor coil.

Example 16 includes the wind power generator as in example 1, in which the inductor coils in the circular array of inductor coils are configured into independent inductor modules that operate independently from one module to another, and each inductor module includes (1) three adjacent inductor coils that are connected to one another to form a 3-phase inductor module to so that the phases of the three adjacent inductor coils are separated by one third of a cycle to collectively produce an AC output current from three currents respectively generated by the three adjacent inductor coils, and (2) a rectifier circuit coupled to receive the AC output current and to produce a DC output voltage.

Example 17 includes the wind power generator as in example 16, in which the rectifier circuit of an inductor module includes a three-phase diode bridge rectifier circuit formed of six diodes.

Example 18 includes the wind power generator as in example 1, in which the inductor coils in the circular array of inductor coils are configured as independent inductor modules that operate independently from one module to another, each inductor module includes (1) three adjacent inductor coils that are connected to one another to form a 3-phase inductor module to so that the phases of the three adjacent inductor coils are separated by one third of a cycle to collectively produce an AC output current from three currents respectively generated by the three adjacent inductor coils, and (2) a rectifier circuit coupled to receive the AC output current and to produce a DC output voltage, and the inductor modules are configured as independent inductor module groups where each inductor module group includes 3 or more inductor modules, the inductor modules within each inductor module group are coupled to produce an inductor module group output, and different inductor module groups are separated and operate independently from one to another.

Example 19 includes the wind power generator as in example 18, in which each inductor module group includes: a mode-switching circuit in a selected inductor module in the inductor module group and coupled to a rectifier circuit of the selected inductor module to inactivate the rectifier circuit to allow the selected inductor module to operate in an AC mode for producing an AC output or to activate the rectifier circuit to allow the select inductor module to operate in an DC mode for producing an DC output, and a control circuit coupled to the mode-switching circuit to control the operation the mode-switching circuit in switching the selected inductor module between the AC mode and the DC mode.

Example 20 includes the wind power generator as in example 19, in which each inductor module group further includes a sensing circuit coupled in the selected inductor module in the inductor module group that senses a rotation condition of the cylindrical wind rotor assembly based on timing and magnitudes of currents in the inductor coils within the selected inductor module and, based on the sensed rotation condition, the control circuit is configured to control the AC mode operation of the selected inductor module in response to the received wind condition to accelerate or decelerate the rotation of the cylindrical wind rotor assembly so that the rotation of the cylindrical wind rotor assembly varies dynamically with received wind condition to maximize an efficiency in converting the received wind power into electricity.

Example 21 includes the wind power generator as in example 20, in which the control circuit includes a digital signal processor that is programmed with software to control, based on the sensed rotation condition from the sensing circuit, the AC and DC modes of operation of the selected inductor module in the inductor module group.

Example 22 includes the wind power generator as in example 20, in which the control circuit is configured to control the inductor coils within the selected inductor module to cause the rotation of the cylindrical wind rotor assembly to be in a coasting mode which maintains a constant speed of the rotation of the cylindrical wind rotor assembly at a given received wind condition and produces a DC output of the wind power generator, a motoring mode which speeds up the rotation of the cylindrical wind rotor assembly while reducing a DC output of the wind power generator, or a generating mode which slows down the rotation of the cylindrical wind rotor assembly while increasing the a DC output of the wind power generator.

Example 23 includes the wind power generator as in example 20, in which the control circuit is configured to control, based on the sensed rotation condition from the sensing circuit, the selected inductor module to operate in or switch to one of the coasting mode, the motoring mode, or the generating mode to dynamically synchronize operation of the wind power generator to the received wind condition and a load condition that draws power from the wind power generator.

Example 24 includes the wind power generator as in example 20, in which each inductor coil includes a first half inductor coil part that includes a first magnetic core and a first conductor wire coil that winds around the first magnetic core and a second half inductor coil part that includes a second magnetic core and a second conductor wire coil that winds around the second magnetic core, and the first and second half inductor coil parts are positioned at opposite sides of a plane in which the magnets in the outer peripheral of the annulus ring rotor rotate to position the magnets between the first and second half inductor coil parts.

Example 25 includes the wind power generator as in example 24, in which each of the first and second half inductor coil parts includes a C shaped magnetic core having two terminal ends that interface with the magnets in the outer peripheral of the annulus ring rotor, and two adjacent magnets in the outer peripheral of the annulus ring rotor are placed in opposite magnetic orientations with respect to each other.

Example 26 includes the wind power generator as in example 25, in which the C shaped magnetic core is configured to have the two terminal ends spaced from each other by a spacing of two adjacent magnets in the outer peripheral of the annulus ring rotor.

In one example of the present technology (example 27), a wind power generator for converting wind power into electricity includes a support base; an inductor stator assembly that is fixed to the support base and includes inductor coils fixed in position to form a circular array, each inductor coil including a first half inductor coil part that includes a first magnetic core and a first conductor wire coil that winds around the first magnetic core and a second half inductor coil part that includes a second magnetic core and a second conductor wire coil that winds around the second magnetic core, in which the first and second half inductor coil parts are positioned adjacent to each other to form a gap there between; an inductor rotor assembly that includes an annulus ring and separate magnets evenly spaced from one another to form a magnet ring on an outer peripheral of the annulus ring and is configured to position the magnets between the gaps of the circular array of inductor coils, the inductor rotor assembly being structured to rotate relative to the inductor stator assembly so that the relative motion between the magnets and the inductor coils causes generation of electric currents in the inductor coils; a cylindrical wind stator assembly fixed in position relative to the inductor stator assembly and including stator wind-receiving fins arranged in a circle to form a hollow cylindrical interior in which the inductor stator assembly and the inductor rotor assembly are located, the stator wind-receiving fins being structured to direct receive and direct wind from any direction into the hollow cylindrical interior at a slanted direction from a radial direction of the cylindrical wind stator assembly; and a cylindrical wind rotor assembly enclosed inside the hollow cylindrical interior of the cylindrical wind stator assembly and fixed in position to the inductor rotor assembly as a unified assembly to rotate together with the magnet ring on the annulus ring relative to the cylindrical wind stator assembly, the cylindrical wind rotor assembly structured to include wind-deflecting blades that are spaced from one another and arranged in a circle to form a hollow central cylindrical interior space for containing a wind vortex formed from deflecting of the received wind by the wind-deflecting blades, in which the stator wind-receiving fins and the wind-deflecting blades are structured to collectively and efficiently direct the received wind to cause rotation of the cylindrical wind rotor assembly for conversion of the wind energy into the electric currents in the inductor coils.

Example 28 includes the wind power generator as in example 27, in which each stator wind-receiving fin includes a pipe or rod having a curved outer edge as a first interface of the wind power generator with the received wind.

Example 29 includes the wind power generator as in example 27, in which each stator wind-receiving fin includes a fin portion that is slanted in orientation with respect to a radial direction of the cylindrical wind stator assembly and is configured to receive and direct wind into the wind-deflecting blades of the cylindrical wind rotor assembly.

Example 30 includes the wind power generator as in example 29, in which the fin portion is slanted in orientation with respect to a radial direction of the cylindrical wind stator assembly at 45 degrees.

Example 31 includes the wind power generator as in example 27, in which each stator wind-receiving fin includes a fin portion formed of a metal or metallic alloy.

Example 32 includes the wind power generator as in example 27, in which each stator wind-receiving fin includes an aluminum fin portion.

Example 33 includes the wind power generator as in example 27, in which the stator wind-receiving fins of the cylindrical wind stator assembly and the wind-deflecting blades of the cylindrical wind rotor assembly are configured so that a radial dimension of the cylindrical wind stator assembly, a radial dimension of the cylindrical wind rotor assembly, and a radius of the hollow central cylindrical interior space in the center of the cylindrical wind rotor assembly are substantially the same.

Example 34 includes the wind power generator as in example 27, in which the cylindrical wind stator assembly has an outer diameter greater than a length of the cylindrical wind stator assembly along a cylindrical axis of the cylindrical wind stator assembly.

Example 35 includes the wind power generator as in example 27, in which a number of the stator wind-receiving fins of the cylindrical wind stator assembly is greater than a number of the wind-deflecting blades of the cylindrical wind rotor assembly.

Example 36 includes the wind power generator as in example 27, in which each wind-deflecting blade of the cylindrical wind rotor assembly includes a curved blade portion; and the stator wind-receiving fins of the cylindrical wind stator assembly are slanted in orientation with respect to respective radial directions of the cylindrical wind stator assembly to direct received wind towards a concave side of the curved blade portion of each wind-deflecting blade.

Example 37 includes the wind power generator as in example 27, in which each wind-deflecting blade includes a curved blade portion to deflect the received wind into a wind vortex inside a hollow central region of the cylindrical wind rotor assembly.

Example 38 includes the wind power generator as in example 37, in which the curved blade portion in each wind-deflecting blade has a geometry of a portion of a cylinder.

Example 39 includes the wind power generator as in example 37, in which the curved blade portion in each wind-deflecting blade includes a geometry of one third of a cylinder.

Example 40 includes the wind power generator as in example 37, in which the inductor coils in the circular array of inductor coils are independent from one another to independently produce respective currents caused by a relative motion of the magnets on the outer peripheral of the annulus ring relative to the inductor coils of the circular array of inductor coils so that a failure in one inductor coil is not disruptive to current generation in another inductor coil.

Example 41 includes the wind power generator as in example 37, in which the inductor coils in the circular array of inductor coils are configured into independent inductor modules that operate independently from one module to another, and each inductor module includes (1) three adjacent inductor coils that are connected to one another to form a 3-phase inductor module to so that the phases of the three adjacent inductor coils are separated by one third of a cycle to collectively produce an AC output current from three currents respectively generated by the three adjacent inductor coils, and (2) a rectifier circuit coupled to receive the AC output current and to produce a DC output voltage.

Example 42 includes the wind power generator as in example 41, in which the rectifier circuit of an inductor module includes a three-phase diode bridge rectifier circuit formed of six diodes.

Example 43 includes the wind power generator as in example 27, in which the inductor coils in the circular array of inductor coils are configured as independent inductor modules that operate independently from one module to another, each inductor module includes (1) three adjacent inductor coils that are connected to one another to form a 3-phase inductor module to so that the phases of the three adjacent inductor coils are separated by one third of a cycle to collectively produce an AC output current from three currents respectively generated by the three adjacent inductor coils, and (2) a rectifier circuit coupled to receive the AC output current and to produce a DC output voltage, and the inductor modules are configured as independent inductor module groups where each inductor module group includes 3 or more inductor modules, the inductor modules within each inductor module group are coupled to produce an inductor module group output, and different inductor module groups are separated and operate independently from one to another.

Example 44 includes the wind power generator as in example 43, in which each inductor module group includes: a mode-switching circuit in a selected inductor module in the inductor module group and coupled to a rectifier circuit of the selected inductor module to inactivate the rectifier circuit to allow the selected inductor module to operate in an AC mode for producing an AC output or to activate the rectifier circuit to allow the select inductor module to operate in an DC mode for producing an DC output, and a control circuit coupled to the mode-switching circuit to control the operation the mode-switching circuit in switching the selected inductor module between the AC mode and the DC mode.

Example 45 includes the wind power generator as in example 44, in which each inductor module group further includes a sensing circuit coupled in the selected inductor module in the inductor module group that senses a rotation condition of the cylindrical wind rotor assembly based on timing and magnitudes of currents in the inductor coils within the selected inductor module and, based on the sensed rotation condition, the control circuit is configured to control the AC mode operation of the selected inductor module in response to the received wind condition to accelerate or decelerate the rotation of the cylindrical wind rotor assembly so that the rotation of the cylindrical wind rotor assembly varies dynamically with received wind condition to maximize an efficiency in converting the received wind power into electricity.

Example 46 includes the wind power generator as in example 45, in which the control circuit includes a digital signal processor that is programmed with software to control, based on the sensed rotation condition from the sensing circuit, the AC and DC modes of operation of the selected inductor module in the inductor module group.

Example 47 includes the wind power generator as in example 45, in which the control circuit is configured to control the inductor coils within the selected inductor module to cause the rotation of the cylindrical wind rotor assembly to be in a coasting mode which maintains a constant speed of the rotation of the cylindrical wind rotor assembly at a given received wind condition and produces a DC output of the wind power generator, a motoring mode which speeds up the rotation of the cylindrical wind rotor assembly while reducing a DC output of the wind power generator, or a generating mode which slows down the rotation of the cylindrical wind rotor assembly while increasing a DC output of the wind power generator.

Example 48 includes the wind power generator as in example 45, in which the control circuit is configured to control, based on the sensed rotation condition from the sensing circuit, the selected inductor module to operate in or switch to one of the coasting mode, the motoring mode, or the generating mode to dynamically synchronize operation of the wind power generator to the received wind condition and a load condition that draws power from the wind power generator.

Example 49 includes the wind power generator as in example 45, in which each inductor coil includes a first half inductor coil part that includes a first magnetic core and a first conductor wire coil that winds around the first magnetic core and a second half inductor coil part that includes a second magnetic core and a second conductor wire coil that winds around the second magnetic core, and the first and second half inductor coil parts are positioned at opposite sides of a plane in which the magnets in the outer peripheral of the annulus ring rotate to position the magnets between the first and second half inductor coil parts.

Example 50 includes the wind power generator as in example 49, in which each of the first and second half inductor coil parts includes a C shaped magnetic core having two terminal ends that interface with the magnets in the outer peripheral of the annulus ring, and two adjacent magnets in the outer peripheral of the annulus ring are placed in opposite magnetic orientations with respect to each other.

Example 51 includes the wind power generator as in example 50, in which the C shaped magnetic core is configured to have the two terminal ends spaced from each other by a spacing of two adjacent magnets in the outer peripheral of the annulus ring.

In one example of the present technology (example 52), a method for generating electricity from wind includes placing a wind power generator as in the example 1 or the example 27 on a roof top of a building to receive wind to cause the cylindrical wind rotor assembly to rotate so that the rotation of the cylindrical wind rotor assembly causes the inductor rotor assembly to rotate to generate electric currents in the inductor coils.

Example 53 includes the wind power generator as in example 52, further including placing multiple wind power generators as in example 27 closely relative to one another in a spatial pattern to use interaction of air flows from the wind power generators and a local wind on the roof top to operate the multiple wind power generators as a wind power generator network for producing electricity.

Example 54 includes the wind power generator as in example 53, further including operating the multiple wind power generators to further utilize air flows on the roof top caused by heat convection on the roof top to generate electricity.

Example 55 includes the wind power generator as in example 53, further including providing one or more solar panels on the roof top to convert light into electricity; coupling the one or more solar panels to the multiple wind power generators to allow for the electricity from the one or more solar panels to be used by the multiple wind power generators when the local wind on the roof top is clam to maintain a low-speed rotation of the cylindrical wind rotor assemblies of the multiple wind power generators and to store solar-generated electricity in form of a rotation of the wind rotor assembly without using one or more batteries for energy storage; and operating the multiple wind power generators and the one or more solar panels to convert local light and wind on the roof top into electricity.

Example 56 includes the wind power generator as in example 55, further including monitoring a local wind condition at each wind power generator; and based on the monitored local wind condition, controlling each wind power generator to operate the rotation of the cylindrical wind rotor assembly to be in a coasting mode which maintains a constant speed of the rotation of the cylindrical wind rotor assembly at a given received wind condition and produces a DC output of the wind power generator, a motoring mode which speeds up the rotation of the cylindrical wind rotor assembly while reducing a DC output of the wind power generator, or a generating mode which slows down the rotation of the cylindrical wind rotor assembly while increasing a DC output of the wind power generator.

Example 57 includes the wind power generator as in example 52, including placing a circuit element that generates heat in each wind power generator in a path of an air flow directed by the wind stator assembly and the wind rotor assembly to cool off the circuit element.

Example 58 includes the wind power generator as in example 52, including using an annulus track and rollers inside the annulus track to support the cylindrical wind rotor assembly and the inductor rotor assembly to rotate the cylindrical wind rotor assembly and the inductor rotor assembly without having a rotation drive shaft.

Example 59 includes the wind power generator as in example 52, including linking the multiple wind power generators to one another to enable electricity generated from one wind power generator to be transferred to another wind power generator for storage in form of a rotation of the receiving wind power generator to enable energy storage.

Example 60 includes the wind power generator as in example 52, including operating the inductor coils in the circular array of inductor coils to be independent from one another to independently produce respective currents caused by a relative motion of the magnets on the outer peripheral of the annulus ring relative to the inductor coils of the circular array of inductor coils so that a failure in one inductor coil is not disruptive to current generation in another inductor coil.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A wind power generator for converting wind power into electricity, comprising:
a support base;
inductor coils fixed in position over the support base in a circular array;
an annulus ring track fixed to the base support and configured to provide a circular track around which the circular array of inductor coils is located;
rollers placed in the circular track of the annulus ring track to roll in the circular track to move around the annulus ring track;
an annulus ring rotor placed on the annulus ring track and engaged to the rollers in the circular track of the annulus ring track so that the annulus ring rotor can rotate relative to the annulus ring track by operation of rolling motion of the rollers in the circular track without having a rotary shaft in the center of the annulus ring rotor for rotating the annulus ring rotor, the annulus ring rotor structured to include separate magnets evenly spaced from one another on an outer peripheral of the annulus ring rotor to move through the circular array of inductor coils as the annulus ring rotor rotates with respect to the annulus ring track so that the relative motion between the magnets and the inductor coils causes generation of electric currents in the inductor coils; and
a cylindrical wind rotor assembly located above and fixed to the annulus ring rotor to form a unified assembly to rotate with the annulus ring rotor relative to the annulus ring track, the cylindrical wind rotor assembly structured to include wind-deflecting blades that are spaced from one another and arranged in a circle around the cylindrical wind rotor assembly to form a hollow central cylindrical interior space for containing a wind vortex formed from deflecting of the received wind by the wind-deflecting blades, to convert received wind from any direction into a rotation of the unified assembly relative to the annulus ring track, thus causing conversion of the wind energy into the electric currents in the inductor coils.

2. The wind power generator as in claim 1, wherein:
each wind-deflecting blade includes a curved blade portion to deflect the received wind into a wind vortex inside a hollow central region of the cylindrical wind rotor assembly.

3. The wind power generator as in claim 1, wherein:
the inductor coils in the circular array of inductor coils are independent from one another to independently produce respective currents caused by a relative motion of the magnets on the outer peripheral of the annulus ring rotor relative to the inductor coils of the circular array of inductor coils so that a failure in one inductor coil is not disruptive to current generation in another inductor coil.

4. The wind power generator as in claim 1, wherein:
the inductor coils in the circular array of inductor coils are configured as independent inductor modules that operate independently from one module to another,
each inductor module includes (1) three adjacent inductor coils that are connected to one another to form a 3-phase inductor module to so that the phases of the three adjacent inductor coils are separated by one third of a cycle to collectively produce an AC output current from three currents respectively generated by the three adjacent inductor coils, and (2) a rectifier circuit coupled to receive the AC output current and to produce a DC output voltage, and
the inductor modules are configured as independent inductor module groups where each inductor module group includes 3 or more inductor modules, the inductor modules within each inductor module group are coupled to produce an inductor module group output, and different inductor module groups are separated and operate independently from one to another.

5. The wind power generator as in claim 4, wherein:
each inductor module group includes:
a mode-switching circuit in a selected inductor module in the inductor module group and coupled to a rectifier circuit of the selected inductor module to inactivate the rectifier circuit to allow the selected inductor module to operate in an AC mode for producing an AC output or to activate the rectifier circuit to allow the select inductor module to operate in a DC mode for producing a DC output, and
a control circuit coupled to the mode-switching circuit to control the operation the mode-switching circuit in switching the selected inductor module between the AC mode and the DC mode.

6. The wind power generator as in claim 5, wherein:
each inductor module group further includes a sensing circuit coupled in the selected inductor module in the inductor module group that senses a rotation condition of the cylindrical wind rotor assembly based on timing and magnitudes of currents in the inductor coils within the selected inductor module and, based on the sensed rotation condition, the control circuit is configured to control the AC mode operation of the selected inductor module in response to the received wind condition to accelerate or decelerate the rotation of the cylindrical wind rotor assembly so that the rotation of the cylindrical wind rotor assembly varies dynamically with received wind condition to maximize an efficiency in converting the received wind power into electricity.

7. The wind power generator as in claim 6, wherein:
the control circuit includes a digital signal processor that is programmed with software to control, based on the sensed rotation condition from the sensing circuit, the AC and DC modes of operation of the selected inductor module in the inductor module group.

8. The wind power generator as in claim 6, wherein:
the control circuit is configured to control the inductor coils within the selected inductor module to cause the rotation of the cylindrical wind rotor assembly to be in a coasting mode which maintains a constant speed of the rotation of the cylindrical wind rotor assembly at a given received wind condition and produces a DC output of the wind power generator, a motoring mode which speeds up the rotation of the cylindrical wind rotor assembly while reducing a DC output of the wind power generator, or a generating mode which slows down the rotation of the cylindrical wind rotor assembly while increasing the a DC output of the wind power generator.

9. The wind power generator as in claim 6, wherein:
the control circuit is configured to control, based on the sensed rotation condition from the sensing circuit, the selected inductor module to operate in or switch to one of the coasting mode, the motoring mode, or the generating mode to dynamically synchronize operation of the wind power generator to the received wind condition and a load condition that draws power from the wind power generator.

10. The wind power generator as in claim 6, wherein:
each inductor coil includes a first half inductor coil part that includes a first magnetic core and a first conductor wire coil that winds around the first magnetic core and a second half inductor coil part that includes a second magnetic core and a second conductor wire coil that winds around the second magnetic core, and
the first and second half inductor coil parts are positioned at opposite sides of a plane in which the magnets in the outer peripheral of the annulus ring rotor rotate to position the magnets between the first and second half inductor coil parts.

11. A wind power generator for converting wind power into electricity, comprising:
a support base;
an inductor stator assembly that is fixed to the support base and includes inductor coils fixed in position to form a circular array, each inductor coil including a first half inductor coil part that includes a first magnetic core and a first conductor wire coil that winds around the first magnetic core and a second half inductor coil part that includes a second magnetic core and a second conductor wire coil that winds around the second magnetic core, wherein the first and second half inductor coil parts are positioned adjacent to each other to form a gap there between;
an inductor rotor assembly that includes an annulus ring and separate magnets evenly spaced from one another to form a magnet ring on an outer peripheral of the annulus ring and is configured to position the magnets between the gaps of the circular array of inductor coils, the inductor rotor assembly being structured to rotate relative to the inductor stator assembly so that the relative motion between the magnets and the inductor coils causes generation of electric currents in the inductor coils;
a cylindrical wind stator assembly fixed in position relative to the inductor stator assembly and including stator wind-receiving fins arranged in a circle to form a hollow cylindrical interior in which the inductor stator assembly and the inductor rotor assembly are located, the stator wind-receiving fins being structured to direct receive and direct wind from any direction into the hollow cylindrical interior at a slanted direction from a radial direction of the cylindrical wind stator assembly; and
a cylindrical wind rotor assembly enclosed inside the hollow cylindrical interior of the cylindrical wind stator assembly and fixed in position to the inductor rotor assembly as a unified assembly to rotate together with the magnet ring on the annulus ring relative to the cylindrical wind stator assembly, the cylindrical wind rotor assembly structured to include wind-deflecting blades that are spaced from one another and arranged in a circle to form a hollow central cylindrical interior space for containing a wind vortex formed from deflecting of the received wind by the wind-deflecting blades,
wherein the stator wind-receiving fins and the wind-deflecting blades are structured to collectively and efficiently direct the received wind to cause rotation of the cylindrical wind rotor assembly for conversion of the wind energy into the electric currents in the inductor coils.

12. The wind power generator as in claim 11, wherein:
each stator wind-receiving fin includes a pipe or rod having a curved outer edge as a first interface of the wind power generator with the received wind.

13. The wind power generator as in claim 11, wherein:
each stator wind-receiving fin includes a fin portion that is slanted in orientation with respect to a radial direction of the cylindrical wind stator assembly and is configured to receive and direct wind into the wind-deflecting blades of the cylindrical wind rotor assembly.

14. The wind power generator as in claim 11, wherein:
the stator wind-receiving fins of the cylindrical wind stator assembly and the wind-deflecting blades of the cylindrical wind rotor assembly are configured so that a radial dimension of the cylindrical wind stator assembly, a radial dimension of the cylindrical wind rotor assembly, and a radius of the hollow central cylindrical interior space in the center of the cylindrical wind rotor assembly are substantially the same.

15. The wind power generator as in claim 11, wherein:
the cylindrical wind stator assembly has an outer diameter greater than a length of the cylindrical wind stator assembly along a cylindrical axis of the cylindrical wind stator assembly.

16. The wind power generator as in claim 11, wherein:
each wind-deflecting blade of the cylindrical wind rotor assembly includes a curved blade portion; and
the stator wind-receiving fins of the cylindrical wind stator assembly are slanted in orientation with respect to respective radial directions of the cylindrical wind stator assembly to direct received wind towards a concave side of the curved blade portion of each wind-deflecting blade.

17. The wind power generator as in claim 11, wherein:
each wind-deflecting blade includes a curved blade portion to deflect the received wind into a wind vortex inside a hollow central region of the cylindrical wind rotor assembly.

18. A method for generating electricity from wind, comprising:
placing a wind power generator as in claim 11 on a roof top of a building to receive wind to cause the cylindrical wind rotor assembly to rotate so that the rotation of the cylindrical wind rotor assembly causes the inductor rotor assembly to rotate to generate electric currents in the inductor coils.

19. The method as in claim 18, further comprising:
placing multiple wind power generators as in claim 11 closely relative to one another in a spatial pattern to use interaction of air flows from the wind power generators and a local wind on the roof top to operate the multiple wind power generators as a wind power generator network for producing electricity.

20. The method as in claim 19, further comprising:
operating the multiple wind power generators to further utilize air flows on the roof top caused by heat convection on the roof top to generate electricity.

21. The method as in claim 19, further comprising:
providing one or more solar panels on the roof top to convert light into electricity;
coupling the one or more solar panels to the multiple wind power generators to allow for the electricity from the one or more solar panels to be used by the multiple wind power generators when the local wind on the roof top is clam to maintain a low-speed rotation of the cylindrical wind rotor assemblies of the multiple wind power generators and to store solar-generated electricity in form of a rotation of the wind rotor assembly without using one or more batteries for energy storage; and operating the multiple wind power generators and the one or more solar panels to convert local light and wind on the roof top into electricity.

22. The method as in claim 21, further comprising:

monitoring a local wind condition at each wind power generator; and based on the monitored local wind condition, controlling each wind power generator to operate the rotation of the cylindrical wind rotor assembly to be in a coasting mode which maintains a constant speed of the rotation of the cylindrical wind rotor assembly at a given received wind condition and produces a DC output of the wind power generator, a motoring mode which speeds up the rotation of the cylindrical wind rotor assembly while reducing a DC output of the wind power generator, or a generating mode which slows down the rotation of the cylindrical wind rotor assembly while increasing a DC output of the wind power generator.

23. The method as in claim 18, comprising:

placing a circuit element that generates heat in each wind power generator in a path of an air flow directed by the wind stator assembly and the wind rotor assembly to cool off the circuit element.

24. The method as in claim 18, comprising:

linking the multiple wind power generators to one another to enable electricity generated from one wind power generator to be transferred to another wind power generator for storage in form of a rotation of the receiving wind power generator to enable energy storage.

* * * * *